US010186962B2

(12) United States Patent
Matsuura et al.

(10) Patent No.: US 10,186,962 B2
(45) Date of Patent: Jan. 22, 2019

(54) CONTROL CIRCUIT AND SWITCHING POWER SUPPLY

(71) Applicant: TDK CORPORATION, Tokyo (JP)

(72) Inventors: Ken Matsuura, Tokyo (JP); Min Lin, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/936,947

(22) Filed: Mar. 27, 2018

(65) Prior Publication Data

US 2018/0241308 A1    Aug. 23, 2018

Related U.S. Application Data

(63) Continuation of application No. 15/042,965, filed on Feb. 12, 2016, now Pat. No. 9,960,673.

(30) Foreign Application Priority Data

Feb. 16, 2015 (JP) .................................. 2015-027366
Feb. 18, 2015 (JP) .................................. 2015-029525
(Continued)

(51) Int. Cl.
*H02M 3/156* (2006.01)
*H02M 3/158* (2006.01)
(Continued)

(52) U.S. Cl.
CPC ............. *H02M 3/156* (2013.01); *H02M 1/14* (2013.01); *H02M 3/158* (2013.01);
(Continued)

(58) Field of Classification Search
CPC ..... H02M 3/156; H02M 3/158; H02M 3/1588
See application file for complete search history.

(56) References Cited

U.S. PATENT DOCUMENTS

| 5,811,999 A | 9/1998 | Hall et al. |
| 6,147,478 A | 11/2000 | Skelton et al. |
| (Continued) | | |

FOREIGN PATENT DOCUMENTS

| JP | S50-001836 U | 1/1975 |
| JP | H03-293965 A | 12/1991 |
| (Continued) | | |

OTHER PUBLICATIONS

Jul. 3, 2017 Office Action Issued in U.S. Appl. No. 15/042,965.
Dec. 28, 2017 Notice of Allowance issued in U.S. Appl. No. 15/042,965.

*Primary Examiner* — Timothy J Dole
*Assistant Examiner* — Ishrat Jamali
(74) *Attorney, Agent, or Firm* — Oliff PLC

(57) ABSTRACT

A control circuit according to an embodiment of the present invention is configured to control a switching element of a switching power supply. The control circuit includes a comparator having a first input terminal configured to receive an output voltage of the switching power supply. The comparator has a second input terminal that is connectable to a positive terminal of a reference voltage source. The comparator has an output. The output brings the reference voltage to a first voltage while the output signal takes a first voltage level. The output brings the reference voltage to a second voltage while the output signal takes a second voltage level. The constant voltage source has a positive terminal connected to a negative terminal of the reference voltage source and a ground of the comparator.

18 Claims, 29 Drawing Sheets

(30) Foreign Application Priority Data

Feb. 18, 2015 (JP) ................................ 2015-029954
Aug. 28, 2015 (JP) ................................ 2015/169595

(51) Int. Cl.
*H02M 3/335* (2006.01)
*H02M 1/14* (2006.01)
*H02M 1/00* (2006.01)

(52) U.S. Cl.
CPC ....... *H02M 3/1563* (2013.01); *H02M 3/1588* (2013.01); *H02M 3/335* (2013.01); *H02M 2001/0025* (2013.01); *H02M 2001/0032* (2013.01); *H02M 2001/0058* (2013.01); *Y02B 70/1491* (2013.01); *Y02B 70/16* (2013.01)

(56) References Cited

U.S. PATENT DOCUMENTS

| | | | |
|---|---|---|---|
| 6,426,612 B1 * | 7/2002 | Rozsypal | H02M 3/1588 323/282 |
| 6,737,847 B2 * | 5/2004 | Watanabe | H02J 7/345 307/109 |
| 2006/0113973 A1 | 6/2006 | Fukumoto et al. | |
| 2006/0164871 A1 | 7/2006 | Takahashi et al. | |
| 2008/0088292 A1 | 4/2008 | Stoichita et al. | |
| 2011/0254527 A1 * | 10/2011 | Saito | G05F 1/56 323/284 |
| 2013/0043854 A1 * | 2/2013 | Tran | H02M 3/155 323/284 |
| 2013/0063105 A1 * | 3/2013 | Nishida | H02M 3/156 323/271 |
| 2014/0167661 A1 | 6/2014 | van der Merwe | |
| 2015/0131329 A1 | 5/2015 | Chen et al. | |
| 2016/0006354 A1 | 1/2016 | Yamaguchi et al. | |

FOREIGN PATENT DOCUMENTS

| | | |
|---|---|---|
| JP | 2007-181389 A | 7/2007 |
| JP | 2009-148155 A | 7/2009 |
| JP | 2013-240159 A | 11/2013 |
| JP | 2014-057476 A | 3/2014 |
| WO | 2005/101629 A1 | 10/2005 |

* cited by examiner

CONTROL CIRCUIT AND SWITCHING POWER SUPPLY

CROSS REFERENCE TO RELATED APPLICATION

This application is a continuation of U.S. application Ser. No. 15/042,965, filed Feb. 12, 2016, the contents of which are incorporated herein by reference, and claims priorities on Japanese Patent Application No. 2015-027366, filed Feb. 16, 2015, Japanese Patent Application No. 2015-029525, filed Feb. 18, 2015, Japanese Patent Application No. 2015-029954, filed Feb. 18, 2015, and Japanese Patent Application No. 2015-169595, filed Aug. 28, 2015, the contents of which are incorporated herein by reference.

BACKGROUND OF THE INVENTION

Field of the Invention

Embodiments of the present invention are related to a control circuit which controls an output voltage, and a switching power supply.

Description of Related Art

As a method of controlling a switching power supply, hysteresis control using a hysteresis comparator is known (see JPH03-293965A and JP2014-57476A). In the hysteresis control, a reference voltage which is input to a non-inverting input of a comparator takes a first high voltage when the output of the comparator takes a high level (H level) and a second low voltage when the output of the comparator takes a low level (L level). The difference between the first voltage and the second voltage is a hysteresis width. When a voltage in which an output voltage is resistance-divided is brought to be lower than the reference voltage of the second voltage, the output of the comparator is brought to be at the high level (H level) to start a drive period, causing the reference voltage to be brought to the first voltage. When a current which is larger than a load current is supplied from the switching power supply to an output capacitor to raise the output voltage during the drive period to bring the voltage in which the output voltage is resistance-divided to be higher than the reference voltage of the first voltage, the output of the comparator is brought to the low level (L level) to complete the drive period, transitioning to a stop period. At this time, the reference voltage is brought to be the second voltage. In the stop period, no current is supplied from the switching power supply and a load current is supplied from the output capacitor, so that the output voltage decreases. JP2014-05476A discloses that a phase-compensating capacitor C2 which is connected in parallel with a resistance which voltage-divides an output voltage is further added to make more stable control possible.

Moreover, burst control in which switching is performed a plurality of times during a period in which a hysteresis comparator takes a high level (H level) is known as a control method in which the hysteresis comparator is used. JP2007-181389A discloses that a hysteresis comparator which compares an output voltage and a reference voltage and a circuit which turns off a gate voltage during a period when a current of a switch element reaches a value are provided. As a process is repeated in which, during the period in which the hysteresis comparator is at the high level (H level), the gate voltage is turned on to cause the current to reach the value and turn off the gate voltage, the gate voltage is again turned on as the period in which the hysteresis comparator is at the high level (H level) continues, and the current again reaches the value to turn off the gate voltage, switching is performed a plurality of times during the period in which the hysteresis comparator is at the high level (H level). When the hysteresis comparator is at the low level (L level), the gate voltage does not turn on, so that switching stops. During the period in which the hysteresis comparator is at the high level (H level), switching is repeated, so that supplying a current which is larger than a load current from the switching power supply to the output capacitor raises the output voltage. During the period in which the hysteresis comparator is at the low level (L level), switching is stopped, so that no current is supplied from the switching power supply and the load current is supplied from the output capacitor, decreasing the output voltage.

Problems of the above-described control methods include that, when the output voltage is quite high compared to the reference voltage and a voltage-dividing ratio when the output voltage is divided by resistance dividing to around the reference voltage is large, an output voltage ripple is brought to the product of the voltage-dividing ratio and the hysteresis width, which is the difference between the first voltage and the second voltage. To prevent erroneous operation due to noise, the hysteresis width may not be decreased unlimitedly. Moreover, in the phase-compensating capacitor C2, which is disclosed in JP2014-057576A, it is difficult to control output voltage fluctuations to the hysteresis width. It is desirable for the output voltage ripple to fall within the hysteresis width.

Moreover, a soft start function for slowly raising the output voltage for preventing an inrush current at the time of activating the switching power supply is known.

For example, WO2005/101629A discloses that a capacitor voltage for soft start is instantaneously charged to the same level as a triangular wave for PWM from a beginning of activation to shorten the period from the beginning of the activation to a beginning of a rise of an output voltage.

Moreover, JP2013-240159A discloses that a soft start voltage is increased rapidly from a beginning of activation to detecting a PWM pulse signal to shorten a period from the beginning of the activation to a beginning of a rise of the output voltage.

Problems of the above-described control methods include that, when a capacitor with a large static capacitance is used for the control circuit of the switching power supply, it takes time for a voltage of the capacitor to be charged from 0V at the time of activation to a steady state value, so that it takes time for the output voltage to reach a target value at the time of activation.

SUMMARY OF THE INVENTION

In view of problems of the related-art, one object of aspects of the present invention is to provide a control circuit and a switching power supply that make it possible to control an output voltage ripple of the switching power supply to within a desired range.

To achieve the above-described object, a control circuit according to one aspect of the present invention is configured to control a switching element of a switching power supply, the control circuit including: a comparator having a first input terminal configured to receive an output voltage of the switching power supply, the comparator having a second input terminal that is connectable to a positive terminal of a reference voltage source, the comparator having an output, the output brings the reference voltage to a first voltage while the output signal takes a first voltage level, the output brings the reference voltage to a second voltage while the output signal takes a second voltage level; and a constant voltage source having a positive terminal connected to a negative terminal of the reference voltage source and a ground of the comparator.

To achieve the above-described object, a control circuit according to another aspect of the present invention is configured to control a switching element of a switching power supply having an output terminal connected to a positive terminal of a constant voltage source, the control circuit including: a comparator having a first input terminal that is connectable to a negative terminal of the constant voltage source and the comparator having a second input terminal that is connectable to a reference voltage source, the comparator having an output, the output brings the reference voltage to a first voltage while the output signal takes a first voltage level, the output brings the reference voltage to a second voltage while the output signal takes a second voltage level; and a controller configured to control the switching element based on the output of the comparator.

In view of problems of the related-art, one object of aspects of the present invention is to provide a control circuit and a switching power supply that make it possible to control output voltage fluctuations such as an output voltage ripple, a static load fluctuation, a dynamic load fluctuation, a static input fluctuation, a dynamic input fluctuation, etc., to fall within a desired range.

To achieve the above-described object, a control circuit according to another aspect of the present invention is configured to control a switching transistor of a switching power supply, the control circuit including: a third resistor and a fourth resistor that are connected to each other to voltage-divide an output voltage of the switching power supply; a comparator having a first input terminal configured to receive the output voltage voltage-divided by the third resistor and the fourth resistor, the comparator having a second input terminal configured to receive a reference voltage; and a controller configured to control the switching transistor based on an output signal of the comparator, wherein the control circuit is configured to bring the reference voltage to a first voltage while the output signal of the comparator takes a first voltage level, and the control circuit is configured to bring the reference voltage to a second voltage while the output signal of the comparator takes a second voltage level, and the third resistor is connectable between a positive terminal of an output terminal of the switching power supply and the first input terminal of the comparator; the control circuit further including: a capacitive element that is connectable to the third resistor in parallel with each other, wherein, where a resistance value of the third resistor is R1, a resistance value of the fourth resistor is R2, a minimum switching frequency of the switching transistor is Fmin, and a static capacitance of the capacitive element is C1, Equation (1)

$$C1 \geq \frac{R1+R2}{2\pi F_{min} R2^2} \qquad (1)$$

is met

To achieve the above-described object, a control circuit according to a further embodiment is configured to control a switching transistor of a switching power supply, the control circuit including: a third resistor and a fourth resistor that are connected to voltage-divide an output voltage of the switching power supply; a comparator having a first input terminal configured to receive the output voltage voltage-divided by the third resistor and the fourth resistor, the comparator having a second input terminal configured to receive a reference voltage; and a controller configured to control the switching transistor based on an output signal of the comparator, wherein the control circuit is configured to bring the reference voltage to a first voltage while the output signal of the comparator takes a first voltage level and the control circuit is configured to bring the reference voltage to a second voltage while the output signal of the comparator takes a second voltage level, and the third resistor is connectable between a positive terminal of an output terminal of the switching power supply and the first input terminal of the comparator; the control circuit further including: a capacitive element and a switch element that are connected in parallel with the third resistor and are mutually connected in series; and an OFF period detection circuit configured to detect that the output of the comparator continually takes the second voltage level in a period which is longer than a predetermined period, wherein the OFF period detection circuit is configured to open the switch element and bring the reference voltage to a third voltage when the OFF period detection circuit detects that the output of the comparator continually takes the second voltage level in the period which is longer than the predetermined period.

In view of problems of the related-art, one object of aspects of the present invention is to provide a control circuit and a switching power supply that make it possible to cause an output voltage to reach a target value in a short time at the time of activation.

To achieve the above-described object, a control circuit according to one aspect of the present invention is a control circuit of a switching power supply, the control circuit including: a capacitive element; a switch element that is connectable to the capacitive element; and an output voltage detection circuit configured to compare an output voltage of the switching power supply with a predetermined value, close the switch element to charge the capacitive element when the output voltage is lower than the value, and open the switch element when the output voltage is higher than the predetermined value.

To achieve the above-described object, a control circuit according to one aspect of the present invention is a control circuit of a switching power supply, the control circuit including: a capacitive element; a switch element that is connectable to the capacitive element; and an output voltage detection circuit configured to close the switch element to charge the capacitive element when the switching power supply is activated, and compare an output voltage of the switching power supply with a value to open the switch element when the output voltage is higher than the predetermined value.

DETAILED DESCRIPTION OF THE INVENTION

Below, preferred embodiments of the present invention will be described. The preferred embodiments of the present invention are not to be limited to the below-described embodiments. Moreover, the below-described elements may include what a skilled person may easily arrive at, and what may be substantially the same, and those elements may be combined appropriately.

Embodiments of the present invention will be described in detail with reference to the drawings. In the description of the drawings, the same letters are given to the same elements, so that repeated explanations are omitted.

First Embodiment

Figure 1:
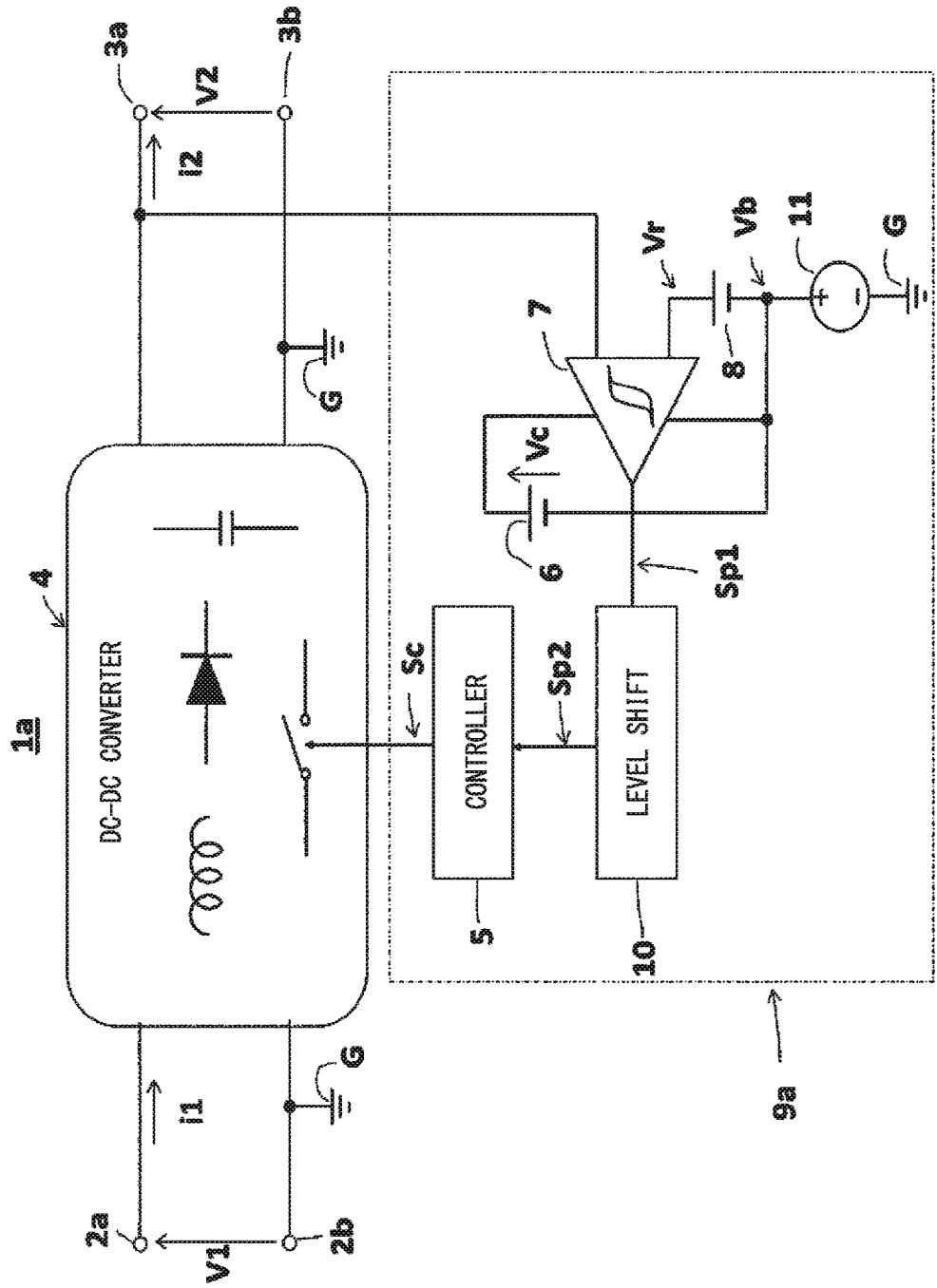
FIG. 1 is a diagram for explaining a circuit configuration related to a switching power supply which controls an output voltage by hysteresis control according to a first embodiment of the present invention.

FIG. 1 is a diagram for explaining a circuit configuration related to a switching power supply which controls an output voltage by hysteresis control according to a first embodiment of the present invention. A switching power supply 1a shown in FIG. 1 includes a main circuit 4 and a control circuit 9a.

Moreover, the switching power supply 1a includes a pair of input terminals 2a and 2b (also called "an input terminal 2" when not specifically distinguishing therebetween); and a pair of output terminals 3a and 3b (also called "an output terminal 3" when not specifically distinguishing between);

More specifically, in between the pair of input terminals 2a and 2b, an input voltage (DC voltage) V1 is input with the input terminal 2b which is connected to the reference potential (the common ground G in the present embodiment) as the low potential side. In between the pair of output terminals 3a and 3b, an output voltage (DC component voltage+output voltage ripple) V2 is output with the output terminal 3b which is connected to the reference potential (the common ground G in the present example) as the low potential side.

The main circuit 4 is a voltage conversion circuit and is configured with a switching device including a switching element which is controlled by the controller 5, an input capacitor, a rectification device including a diode and an FET, a smoothing device including a choke coil, a capacitor, etc., for example. The main circuit 4 converts an input voltage V1 input from the input terminal 2 to an output voltage V2 to output the converted result to the output terminal 3.

The control circuit 9a includes a controller 5; a level shift circuit 10, a comparator 7, an operating power supply 6 for the comparator 7, a reference voltage source 8, and a constant voltage source 11, and controls a switch operation of the main circuit 4. The comparator 7 includes a first input terminal and a second input terminal. The first input terminal of the comparator 7 is connected to an output terminal 3a, while the second input terminal is connected to the positive terminal of the reference voltage source 8. The output terminal of the comparator 7 is connected to the level shift circuit 10 via an output line which outputs an output control pulse Sp1.

Moreover, the comparator 7 includes a negative power supply terminal and a positive power supply terminal. The negative power supply terminal is connected to the negative terminal of the reference voltage source 8; the positive terminal of the constant voltage source 11; and the negative terminal of the operating power supply 6. The positive power supply terminal is connected to the positive terminal of the operating power supply 6. In this way, a power supply which operates the comparator 7 is provided. The negative terminal of the constant power source 11 and the output terminal 3b are connected to the common ground G.

As an example of control of the switch element operation, when the output Sc of the controller takes an H level, the output voltage V2 of the power supply rises. When the output of the controller takes an L level, the output voltage V2 of the power supply drops. Below, an operation of the control circuit 9a is described in detail with reference to FIGS. 1 and 2.

First, FIG. 1 is described. The output voltage V2 from the output terminal 3 is input to the first input terminal of the comparator 7. The input voltage V2 is the DC output voltage V2, which includes an output voltage ripple component. The switching power supply 1a is configured in which this output voltage ripple may be regarded as a voltage having the same phase as the voltage across the ESR of the output capacitor, or the converter may be regarded as a constant current source, and the AC component voltage (below also called "an output voltage ripple" when not distinguishing therebetween) of the voltage across the output capacitor is a triangular wave, or has a waveform which is similar to the triangular wave. When the output of the comparator 7 is brought to a first level, the voltage level of an output control pulse Sp1 of the comparator 7 causes a voltage level Vb of the constant voltage source 11 to be output in an approximate manner for the output voltage V2 (see FIG. 2). This voltage level Vb is input to the level shift circuit 10, which is provided between the comparator 7 and the input of the controller 5. Based on the control pulse Sp1, which is output by the comparator 7, the level shift circuit 10 subtracts the voltage level Vb of the constant voltage source 11 therefrom to shift it to the zero level to output an L-level output control pulse Sp2. When this L level is input to the controller 5, based on the output control pulse Sp2 of the level shift circuit 10, the controller 5 stops or turns off a switch operation of the power supply. Thus, the output voltage V2 of the switching power supply 1a drops.

Next, when the output voltage V2 drops to bring the output of the comparator 7 to the second level, the voltage level of the output control pulse Sp1 of the comparator 7 causes the voltage level of the sum of the voltage level Vb of the constant voltage source 11 and the voltage level Vc of the operating power supply 6 (Vb+Vc) to be output in an approximate manner. When this voltage level (Vb+Vc) is input to the level shift circuit 10, based on the control pulse Sp1, which is output by the comparator 7, the level shift circuit 10 subtracts the voltage level Vb of the constant voltage source 11 therefrom to shift it to the voltage level Vc of the operating power supply 6 to cause the shifted result to be output from SP2 as the H level. When this H level is input to the controller 5, the controller 5 starts or turns on the switch operation of the power supply based on the output control Sp2 of the level shift circuit. Thus, the output voltage V2 of the power supply rises. The operation is repeated in this manner. Needless to say, the first level and the second level, which are outputs of the comparator 7, are different levels.

Figure 2:
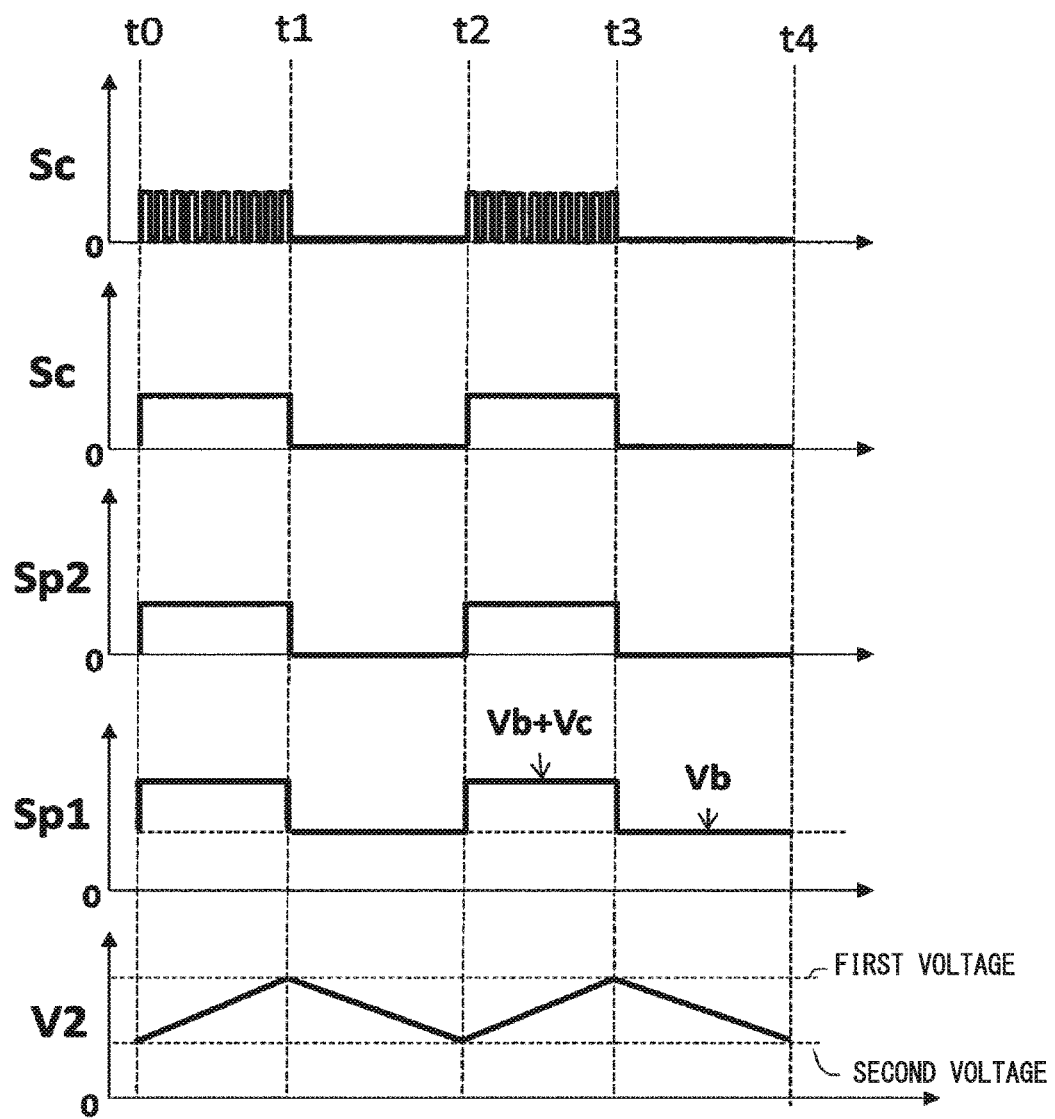
FIG. 2 is a timing waveform diagram for explaining an operation related to control of the switching power supply in FIG. 1.

Next, an operation during the period of t0 to t1, or t2 to t3 is described based on the timing waveform diagram in FIG. 2. The output voltage V2 during this period rises from a second voltage to a first voltage. The voltage level of the output control pulse Sp1 of the comparator 7 is approximately the voltage level of the sum of the voltage level Vb of the constant voltage source 11 and the voltage level Vc of the operating power supply 6 (Vb+Vc). The voltage level of the output control pulse Sp2 of the level shift circuit 5 causes an H level to be output.

Therefore, an output of the controller 5 outputs, in this period, a drive signal which turns on a switch of the power supply from the controller 5 as a control signal Sc based on the control pulse Sp2. Alternatively, the output of the controller 5, in this period, outputs a drive signal which turns a switch of the main circuit 4 ON/OFF a plurality of times from the controller 5 as a control signal Sc.

Next, an operation during the period of t1 to t2, or t3 to t4 in FIG. 2 is described. The output voltage V2 reaches the first voltage at t=t1 or t=t3 to cause the voltage level of the output control pulse Sp1 of the comparator 7 to approximately switch to the voltage level Vb of the constant voltage source 11. Thereafter, during the period of t1 to t2, or t3 to t4, this voltage level Vb is maintained. Similarly, the voltage level of the output control pulse Sp2 of the level shift circuit 10 is switched to a L level, and, in the period of t1 to t2, or t3 to t4, the voltage of this L level is maintained.

The output of the controller 5 outputs, from Sc of the controller 5, a drive signal which turns off a switching element of the main circuit 4 based on the control pulse Sp2 of the level shift circuit 10. The output voltage V2 of the switching power supply 1a drops.

At t=t2 or t=t4, the output voltage V2 of the switching power supply 1a reaches the second voltage to switch the voltage level of the output control pulse Sp1 of the comparator 7 again to approximately the voltage level of the sum of the voltage level Vb of the constant voltage source 11 and the voltage level Vc of the operating power supply 6. The voltage level of the output control pulse Sp2 of the level shift circuit 10 switches to the H level.

Based on the output control pulse Sp2 of the level shift circuit 10, the output of the controller 5 outputs a drive signal which turns on the switching element of the main circuit 4 from Sc of the controller 5. Alternatively, based on the output control pulse Sp2 of the level shift circuit 10, the output of the controller 5, in this period, outputs a drive signal which turns ON/OFF the switching element of the switching power supply 1a a plurality of times from Sc of the controller 5. The operation is repeated in this manner. Needless to say, the first voltage and the second voltage are different voltage values.

Figure 3:
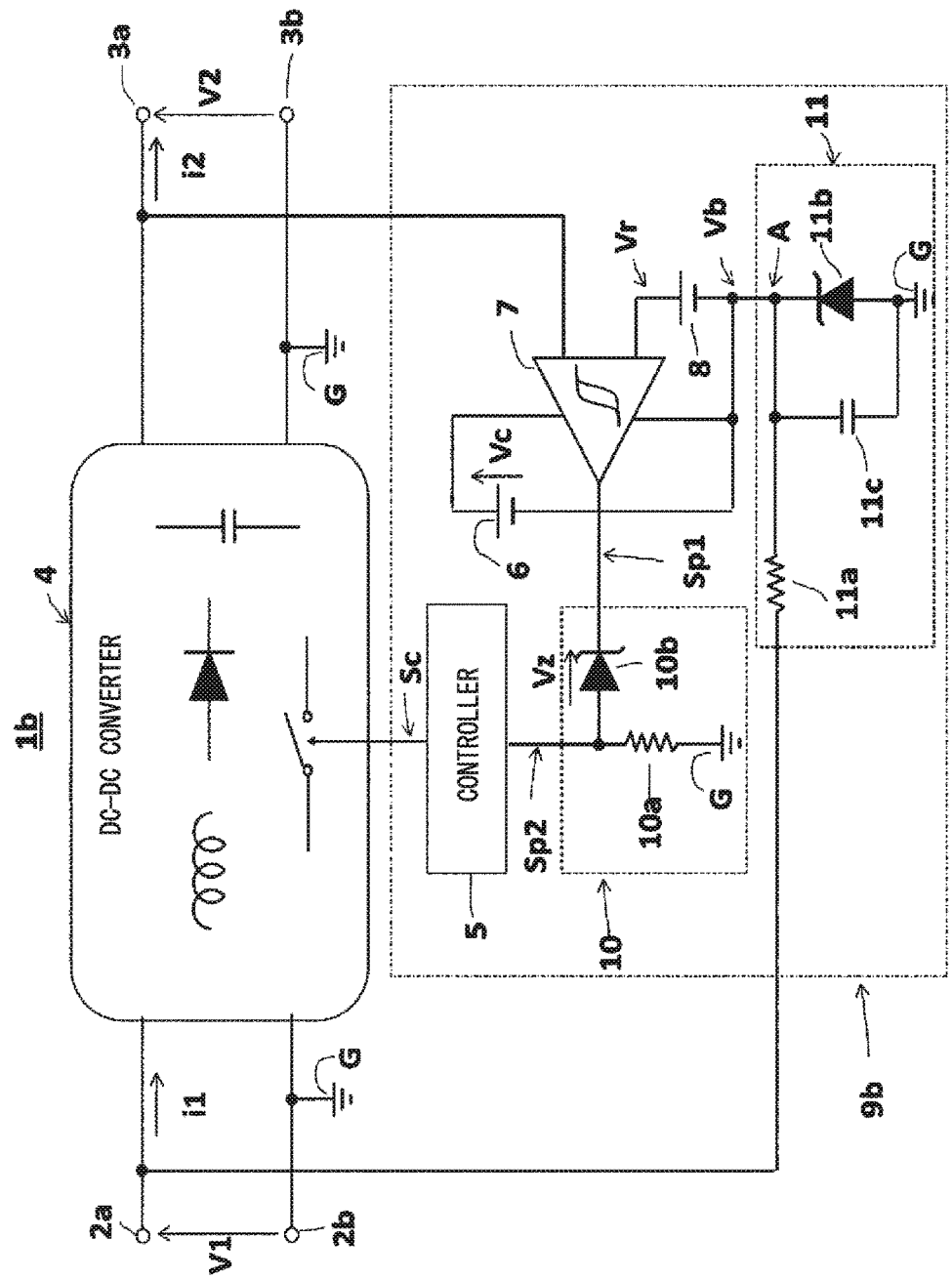
FIG. 3 is a circuit diagram illustrating a specific example of a control circuit related to FIG. 1.

Next, one specific embodiment of the control circuit 9a shown in FIG. 1 is described with reference to FIG. 3. The difference between FIG. 1 and FIG. 3 is that the level shift circuit 10 shown in FIG. 1 is shown with specific circuit features including a first Zener diode 10b and a first resistor 10a and that the constant voltage source 11 is shown with specific circuit features including a resistor 11a, a Zener diode 11b, and a capacitor 11c. The other features are the same as in FIG. 1. Moreover, the level shift circuit 10 may be configured with the first resistor 10a and the first Zener diode 10b.

The first Zener diode 10b has the anode connected to one end of the first resistor 10a and the controller 5. Moreover, the cathode of the first Zener diode 10b is connected to the output terminal of the comparator 7. The other end of the first resistor 10a is connected to the common ground G.

When a pulse voltage from the output pulse Sp1 of the comparator 7 is applied to the cathode of the first Zener diode 10b, the level shift circuit 10 outputs a pulse voltage level of the Sp2 in which the voltage level of the output pulse Sp1 of the comparator is level-shifted to the input of the controller 5 from the anode of the first Zener diode 10b.

The shift voltage level value of the level shift circuit 10 may be set by the first Zener diode 10b. The current which flows into the first Zener diode 10b may be set by the first resistor 10a.

With the Zener voltage Vz across the first Zener diode 10b being set equal to the voltage of the constant voltage source 11, the output control pulse Sp1 of the comparator 7 causes the voltage level Vb of the constant voltage source 11 to cause the L level to be output from the output terminal Sp2 of the level shift circuit 10. With the voltage level of the sum of the voltage level Vb of the constant voltage source 11 and the voltage level Vc of the operation power supply 6 (Vb+Vc) being output, the output control pulse Sp1 of the comparator 7 causes the H level to be output from the output terminal Sp2 of the level shift circuit. In this way, the level shift circuit 10 shifts the output voltage level value from the comparator 7.

Moreover, besides the configurations as described above, the above-described level shift circuit 10 may also be configured from an insulating transformer. Alternatively, it may also be configured using a capacitor, a logic circuit such as AND, a flip-flop circuit, a latch circuit, an RS flip-flop circuit, and a JK flip-flop circuit. Alternatively, it may also be configured using a photo coupler. The level shift circuit does not have to be used as long as the input of the controller may recognize the output levels (the first level and the second level) of the comparator to correctly control the switching element of the switching power supply.

The constant voltage source 11 shown in FIG. 3 includes a second resistor 11a, wherein an input voltage V1 is applied to one end thereof; a second Zener diode 11b which is connected to point A, which is the other end of the second resistor 11a; and a first capacitor 11c which is connected to the cathode of the second Zener diode 11b and one end of the point A. The anode of the second Zener diode 11b and the other end side of the first capacitor 11c are connected to the common ground G. Moreover, the point A is connected to the negative terminal of the reference power source 8, the negative terminal of the operating power supply 6 of the comparator 7; and the ground terminal of the comparator 7. Such a configuration makes it possible to create the constant voltage source 11.

The voltage value of the constant voltage source 11 may be set by the second Zener diode 11b. The current which flows through the second Zener diode 11b may be set by the second resistor 11a. The first capacitor 11c is provided to suppress the AC component (the voltage ripple component) of the second Zener diode 11b. The capacitance of the first capacitor 11c is preferably at least 0.01 µF.

The voltage which is applied to the one end of the second resistor 11a is applied from the input voltage V1 of the switching power supply 1b as one example. If there is a voltage from a different voltage line whose level is at least a voltage level required by the constant voltage source, the voltage may be applied to the one end of the second resistor 11a.

Moreover, besides the configuration as described above, the above-described constant voltage source 11 may also be configured from a capacitor and a linear regulator to accurately secure a constant voltage source. It may also be configured from a capacitor and a switching regulator. Alternatively, it may be configured from a capacitor and a charge-pump circuit.

Second Embodiment

Next, explanations will be given with reference to FIG. 4, which is a diagram of the circuit configuration related to the switching power supply which controls the output voltage by the hysteresis control according to the second embodiment of the present invention. The difference between a switching power supply 1c shown in FIG. 4 and the switching power supply 1a shown in FIG. 1 is that the internal configuration of the control circuit 9 differs therebetween. The other aspects are the same as those in FIG. 1.

A control circuit 9c includes a controller 5, a comparator 7, an operating power supply 6 of the comparator 7, a reference voltage source 8, and a constant voltage source 12, and controls a switch operation of the main circuit 4.

The positive terminal of the constant voltage source 12 is connected to the output terminal 3a thereof and the negative terminal is connected to the first input terminal of the comparator 7. The comparator 7 includes a first input terminal and a second input terminal and the second input terminal is connected to the positive terminal of the reference voltage source 8. The output terminal of the comparator 7 is connected to the controller 5 via an output line which outputs an output control pulse Sp1.

Moreover, the comparator 7 includes a negative power supply terminal and a positive power supply terminal. The negative power supply terminal is a common ground potential which is connected to the negative terminal of the reference voltage source 8 and the negative terminal of the operating source 6. The positive power supply terminal is connected to the positive terminal of the operating power supply 6. This provides a power supply which operates the comparator 7. As an example, when the output Sc of the controller 5 is at the H level, the output voltage V2 of the switching power supply 1c rises. When the output of the controller 5 is at the L level, the output voltage V2 of the switching power supply 1c drops. Below, the operation of the control circuit 9c is described in detail with reference to FIGS. 4 and 5.

Figure 4:
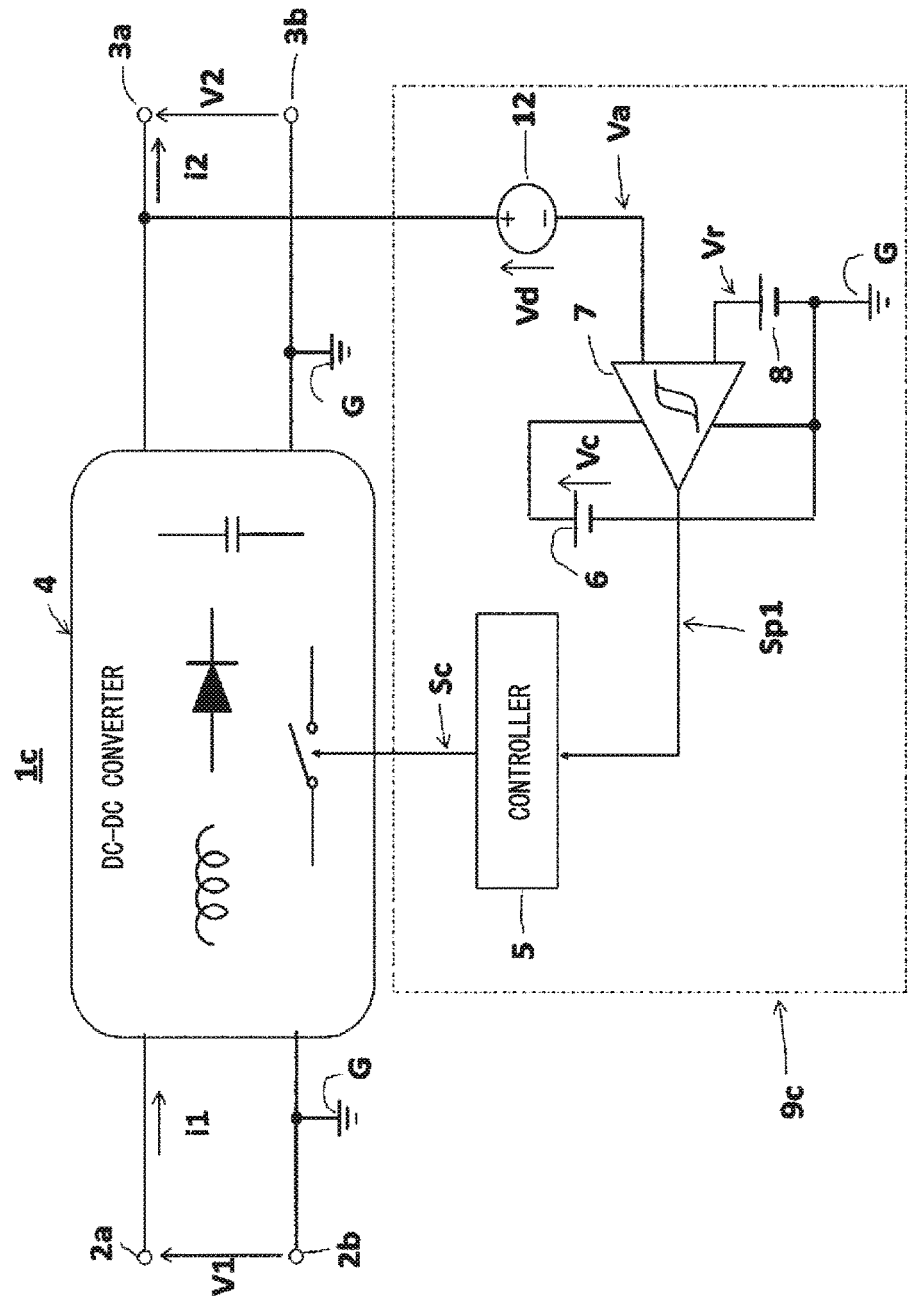
FIG. 4 is a diagram for explaining the circuit configuration related to the switching power supply which controls the output voltage by the hysteresis control according to a second embodiment of the present invention.

First, FIG. 4 is described. The output voltage V2 from the output terminal 3 is input to the positive terminal of the constant voltage source 12. A voltage Va in which a voltage Vd across the constant voltage source 12 is subtracted from the DC voltage V2, which includes the output voltage ripple component, is output from the negative terminal of the constant voltage source 12 and input to a first input terminal of the comparator 7.

The input voltage Va is the DC output voltage Va, which includes the output voltage ripple component. The switching power supply 1c is configured in which this output voltage ripple may be regarded as a voltage having the same phase as the voltage across the ESR of the output capacitor, or the converter may be regarded as a constant current source, and the AC component voltage (below also called "an output voltage ripple" when not distinguishing therebetween) of the voltage across the output capacitor is a triangular wave, or has a waveform which is similar to the triangular wave. When the output of the comparator 7 is brought to a first level, the voltage level of an output control pulse Sp1 of the comparator 7 causes an L level to be output for the input voltage Va. When this L level is input to the controller 5, based on the output control pulse Sp1 of the comparator 7, the controller 5 stops or turns off a switch operation of the power supply. Thus, the output voltage V2 of the switching power supply 1c drops.

Next, when the output voltage V2 drops to bring the output of the comparator 7 to the second level, the voltage level of the output control pulse Sp1 of the comparator 7 causes an H level to be output from the SP1 as the voltage level of the operating power supply 6 in an approximate manner. When this H level is input to the controller 5, the controller 5 starts or turns on the switching operation of the power supply based on the output control pulse Sp1 of the comparator 7. Thus, the output voltage V2 of the power supply rises. The operation is repeated in this manner.

Figure 5:
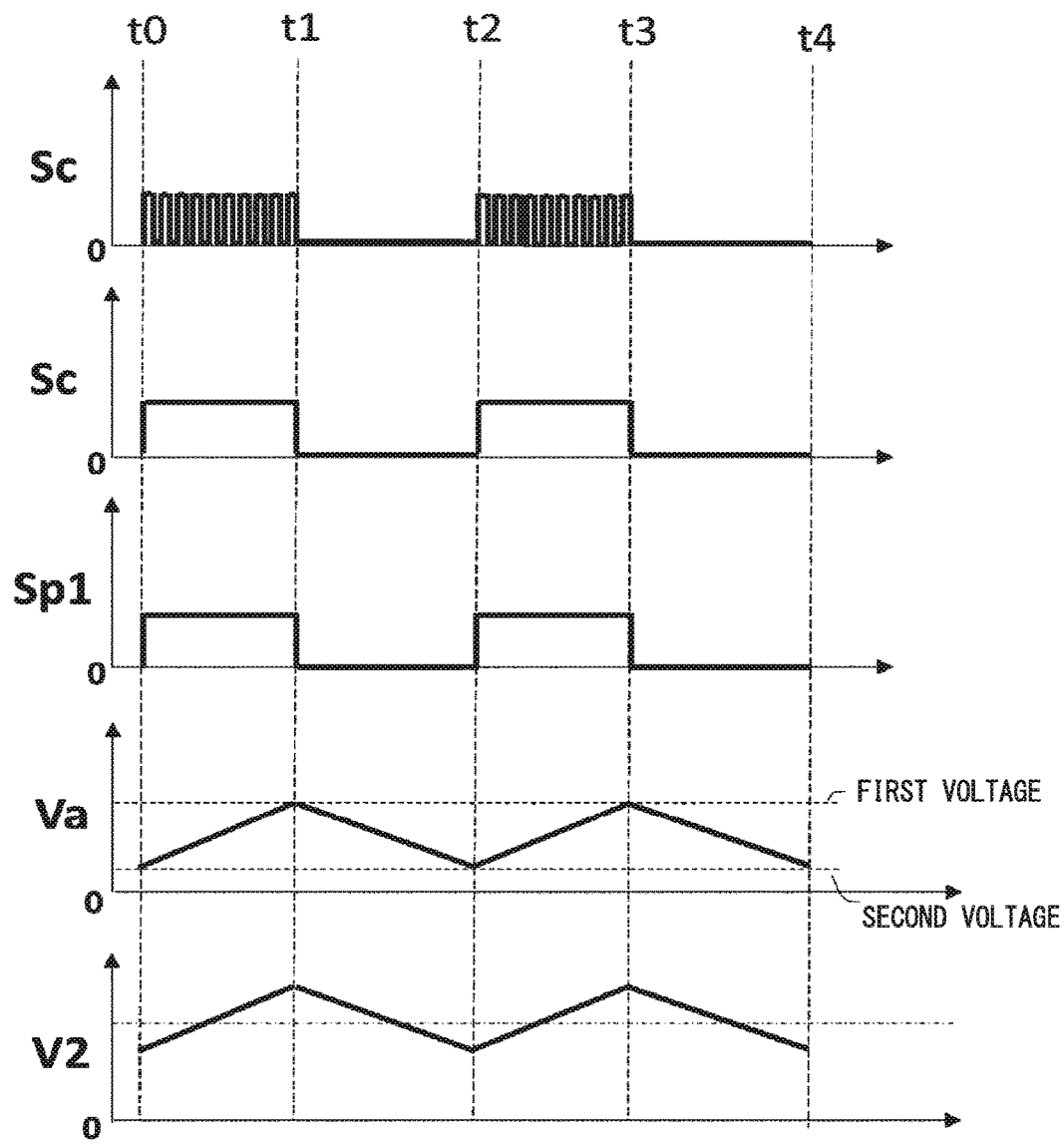
FIG. 5 is a timing waveform diagram for explaining the operation related to the control of the switching power supply in FIG. 4.

Next, an operation during the period of t0 to t1, or t2 to t3 is described based on the timing waveform diagram in FIG. 5. The output voltage V2 during this period rises. The input voltage Va of the comparator 7 rises by the voltage (V2−Vd). The voltage level of the output control pulse Sp1 of the comparator 7 is brought to approximately the voltage level Vc of the operating power supply 6 to cause an H level to be output. The output of the controller 5 outputs, in this period, based on the output control pulse Sp1 of the comparator 7, a drive signal which turns on a switching element of the switching power supply 1c to be turned on from the controller 5 as a control signal Sc. Alternatively, the output of the controller 5, in this period, based on the output control pulse Sp1 of the comparator 7, outputs a drive signal which turns ON/OFF the switching element of the switching power supply 1c a plurality of times from the controller 5 as the control signal Sc.

Next, an operation during the period of t1 to t2, or t3 to t4 in FIG. 5 is described. The input voltage Va reaches the first voltage at t=t1 or t=t3 to cause the voltage level of the output control pulse Sp1 of the comparator 7 to approximately take the common ground G to switch to the L level. Thereafter, during the period of t2 to t4, the level is maintained. The output of the controller 5, based on the output control pulse Sp1 of the comparator 7, outputs a drive signal which turns off a switching element of the switching power supply 1c from the controller 5 as a control signal Sc. The output voltage V2 in this period drops.

The input voltage Va of the comparator 7 drops by the voltage (V2−Vd). At t=t2 or t=t4, the input voltage Va reaches the second voltage to cause the voltage level of the output control pulse Sp1 of the comparator 7 to approximately switch again to the voltage level Vc of the operating power supply 6. Based on the output control pulse Sp1 of the comparator 7, the output of the controller 5 outputs a drive signal which turns on the switching element of the switching power supply 1c as the control signal Sc from the controller 5. Alternatively, based on the output control pulse Sp1 of the comparator 7, the output of the controller 5, in this period, outputs a drive signal which turns ON/OFF the switching element of the switching power supply 1c a plurality of times as a control signal Sc from the controller 5. The operation is repeated in this manner.

Figure 6:
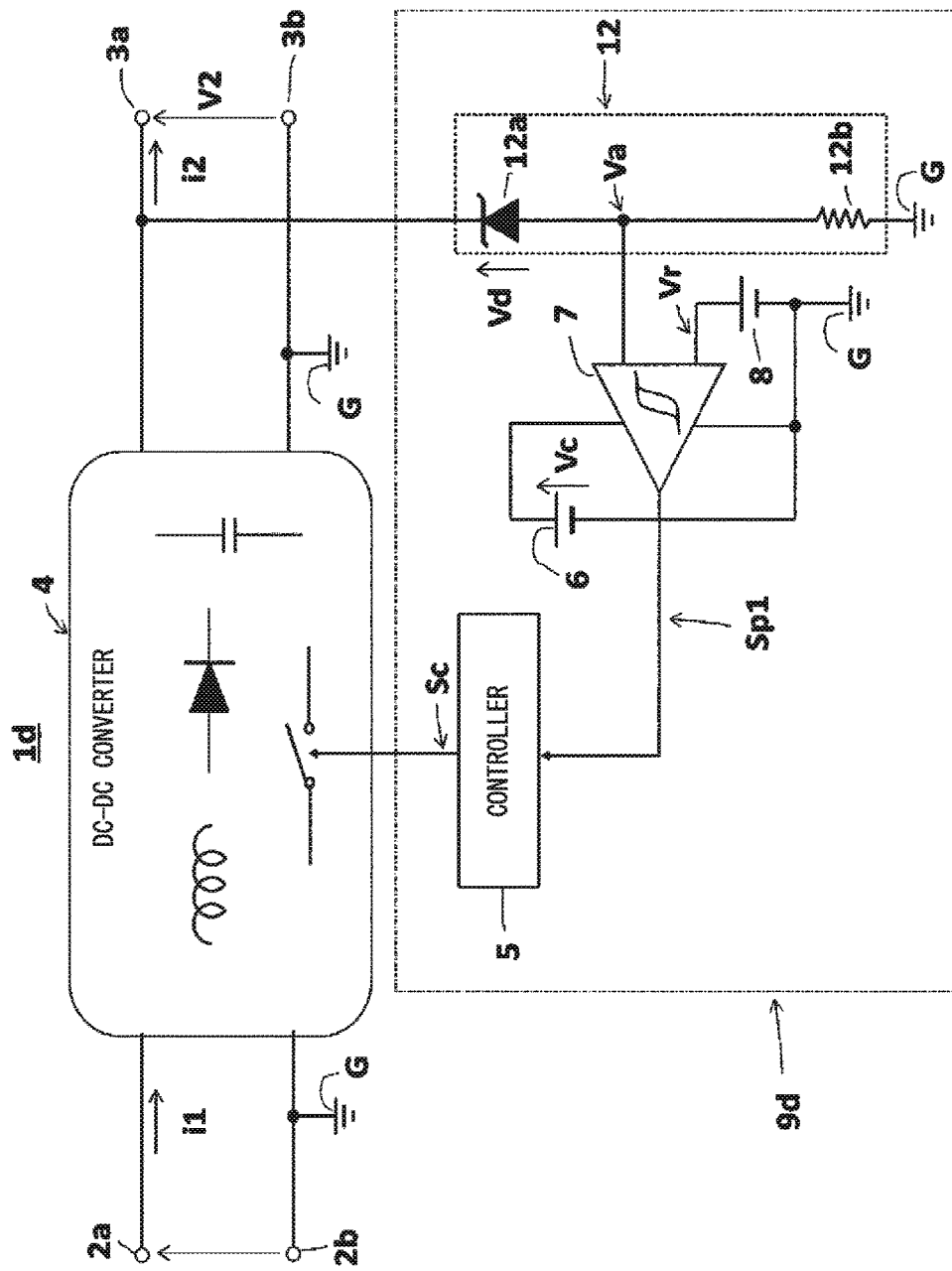
FIG. 6 is a circuit diagram illustrating one specific example of the control circuit related to FIG. 4.

Next, one example of the control circuit 9c shown in FIG. 4 is described with reference to FIG. 6. The difference between FIG. 4 and FIG. 6 is that the constant voltage source 12 shown is FIG. 4 is shown with specific circuit features including a resistor 12b and a Zener diode 12a. The other features are the same as those in FIG. 4.

The positive terminal of the Zener diode 12a is connected to the output terminal 3a thereof and the negative terminal is connected to the first input terminal of the comparator 7. The cathode of the Zener diode 12a is connected to one end of the resistor 12b and is brought to an input voltage Va. The other end of the resistor 12b has the common ground G potential. In the constant voltage source 12 shown in FIG. 6, when the input voltage V2 is applied to the cathode of the third Zener diode 12a, the voltage Va is input to a first input terminal of the comparator 7.

The voltage value of the constant voltage source 12 may be set by the third Zener diode 12a. The current which flows through the constant voltage source 12 may be set by the resistor 12b.

The voltage Va, which is input to the first input of the comparator 7, is a voltage (V2−Vd) in which a voltage Vd across the third Zener diode 12a is subtracted from the output voltage V2, and is brought to be equal to the input voltage Va, which is input to the first input terminal of the comparator 7.

Figure 7:
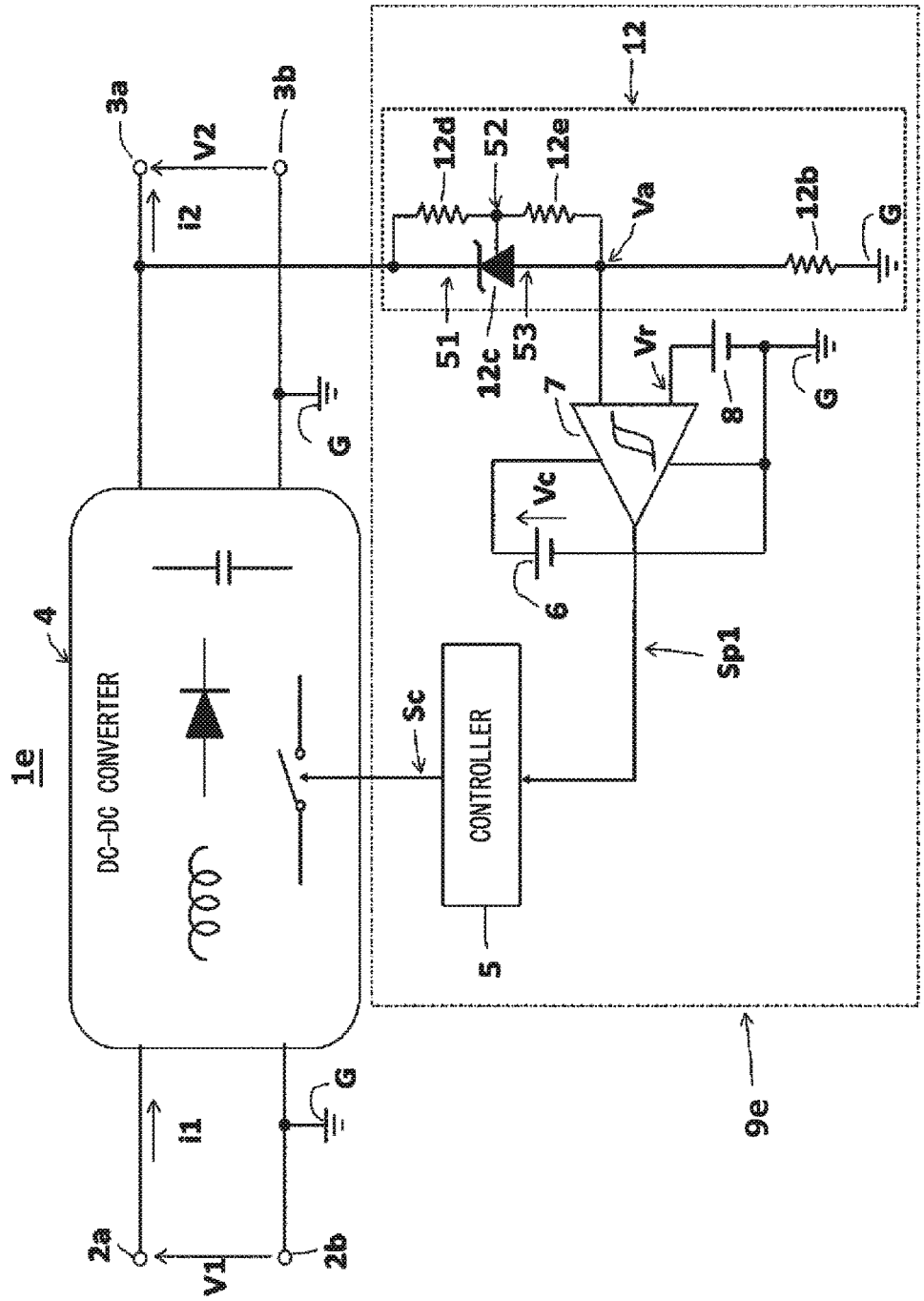
FIG. 7 is a circuit diagram illustrating another specific example of the control circuit related to FIG. 4.

Next, one example of the control circuit 9c shown in FIG. 4 is described with reference to FIG. 7. The difference between FIG. 4 and FIG. 7 is that the constant voltage source 12 shown is FIG. 4 is shown with specific circuit features including resistors 12b, 12d, 12e and a shunt regulator 12c. The other features are the same as those in FIG. 4. The constant voltage source circuit 12 shown in FIG. 7 is configured to include resistors and a three-terminal variable shunt regulator to accurately secure a constant voltage source.

The cathode of the shunt regulator 12c is connected to an output terminal 3a, while the anode thereof is connected to a first input terminal of the comparator 7. The first terminal of the comparator 7 is connected to one end of the resistor 12b, while the other end of the resistor 12b is the common ground potential.

When the input voltage V2 is applied to a Cathode terminal 51 of the shunt regulator 12c, the constant voltage circuit 12 has a voltage Va input to the first input terminal of the comparator 7 via an Anode terminal 53 of the shunt regulator.

A resistor 12d may be connected between the terminal 51 of the shunt regulator and the variable terminal 52 of the shunt regulator and a resistor 12e may be connected between the variable terminal 52 of the shunt regulator 12c and the terminal 53 of the shunt regulator to accurately create the constant voltage source 12.

In other words, setting of the voltage value of the above-described constant voltage source 12 may be simply set with values of the resistor 12d and the resistor 12e. The resistor 12b makes it possible to set the current which flows through the shunt regulator 12c and the resistor 12d and the resistor 12e.

Moreover, besides the configurations as described above, the constant voltage source 12 may be configured with an insulating transformer. Alternatively, it may also be configured with a capacitor and a linear regulator. Alternatively, it may be also be configured with a capacitor and a switching regulator. Alternatively, it may be also be configured with a capacitor and a charge-pump circuit.

For the above-described comparator 7, a comparator having hysteresis properties may be used. Moreover, the above-described comparator 7 may also be used for a window comparator, etc., for example, that allows producing the first and second voltages.

Third Embodiment

Figure 8:
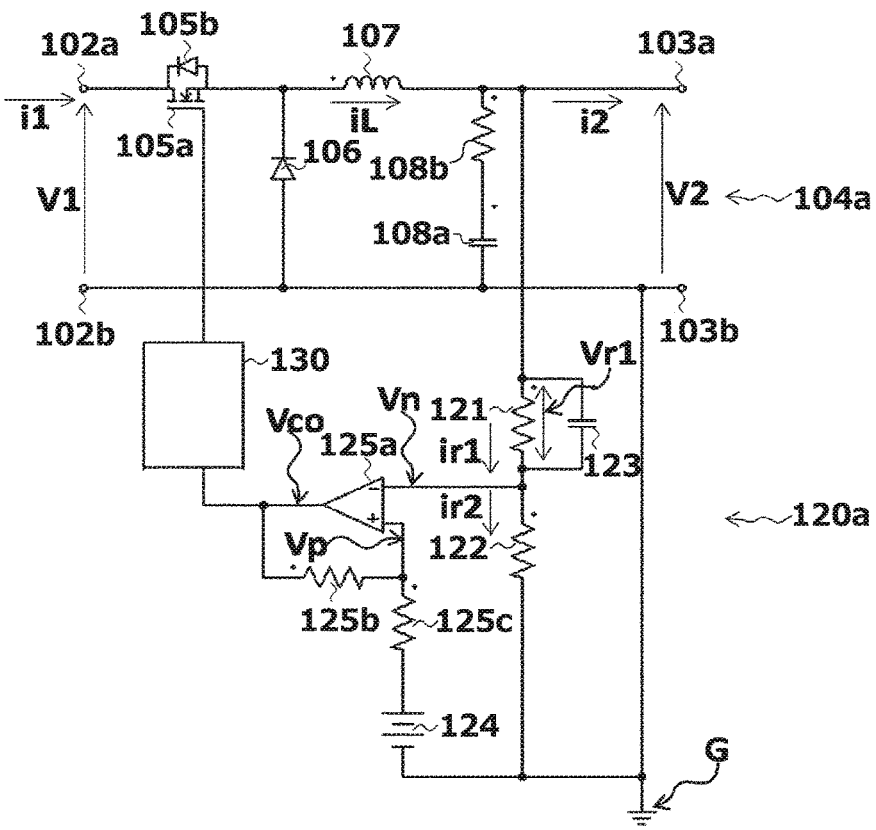
FIG. 8 is a circuit diagram illustrating a configuration of a switching power supply according to a third embodiment of the present invention.

FIG. 8 is a circuit diagram illustrating a configuration of a switching power supply 101a according to a third embodiment of the present invention. As one example, the switching power supply 101a shown in FIG. 8 includes a pair of input terminals 102a and 102b (also called "an input terminal 102" when not specifically distinguishing therebetween); a pair of output terminals 103a and 103b (also called "an output terminal 103" when not specifically distinguishing between); a main circuit 104a; and a control circuit 120a, and converts an input voltage (DC voltage) V1 input to the input terminal 102 to an output voltage (DC voltage) V2 to output the converted result from the output terminal 103 and controls the output voltage V2 to be at a predetermined target voltage. The switching power supply 101a inputs an input voltage V1 and an input current i1 to the input terminal 102 to output the output voltage V2 and a load current i2 from the output terminal 103.

The main circuit 104a includes a switching transistor 105a, a parasitic diode 105b of the switching transistor 105a, a diode 106, a choke coil 107, an output capacitor 108a, and an equivalent series resistor 108b of the output capacitor 108a. The switching power supply 101a, which is configured with a back converter circuit scheme as one example, outputs an input voltage V1 input from the input terminal 102 to the output voltage V2 to output the converted result to the output terminal 103.

The control circuit 120a includes a third resistor 121 and a fourth resistor 122 that voltage-divides the output voltage V2 of the switching power supply 101a; a comparator 125a in which a voltage-divided voltage Vn is input to a first inverting input terminal thereof and a reference voltage Vp is input to a second non-inverting input terminal thereof; and a controller 130 which controls a switching transistor 105a based on an output signal Vco of the comparator 125a, wherein the reference voltage Vp is brought to be a first high VpH when an output Vco of the comparator 125a takes a first high voltage VpH and is brought to be a second low VpL when the output Vco of the comparator 125a takes a second low voltage VpL. The control circuit 120a includes the third resistor 121, which is connected between a positive terminal 103a of an output terminal and a first inverting input terminal of the comparator 125a; and a capacitive element 123 which is connected in parallel with the third resistor 121. A common ground G of the control circuit 120a is connected to a negative terminal 103b of the output terminal. Each of signal voltages Vn, Vp, and Vco is set to be a voltage with the common ground G as the reference.

Moreover, a so-called hysteresis comparator is known in which a reference voltage Vp is brought to be a first high voltage VpH when an output Vco of the comparator 125a takes a first high level and an output Vco of the comparator 125a takes a second low level. The switching power supply 101a is configured with a hysteresis comparator circuit scheme as an example and includes the comparator 125a; a resistor 125b which connects between a non-inverting input terminal and an output terminal of the comparator 125a; and a resistor 125c and a constant voltage source 124 that are connected in series between the non-inverting input terminal and the common ground G.

Next, an operation of the control circuit 120a is described. When the voltage Vn in which the output voltage V2 is resistance-divided decreases below the second voltage VpL, the comparator output Vco is brought to a first high level to cause the controller 130 to start driving the switching transistor 105a, so that the reference voltage is brought to be the first voltage VpH. During the drive period of the switching transistor 105a, the current of the choke coil 107 increases to cause a current iL which is larger than a load current i2 to be supplied from the choke coil 107 to the output capacitor 108a, causing the output capacitor 108a to be charged to raise the output voltage V2. When the output voltage Vn in which the voltage V2 is resistance-divided is brought to be higher than the first voltage VpH, the comparator output Vco is brought to a second low level to cause the drive period to be completed and to be transitioned to a stop period. At this time, the reference voltage is brought to be the second voltage VpL. In the stop period, the load current i2 is brought to be larger than the current iL from the choke coil 107 to cause discharging from the output capacitor 108a to cause the output voltage V2 to decrease. When the voltage Vn in which the output voltage V2 is resistance-divided is again brought to be lower than the second voltage VpL, the drive period is started again to bring the reference voltage to the first voltage VpH. Such an operation is repeated to cause the drive period and the stop period to be controlled such that the resistance-divided voltage Vn is brought to be a value between the first voltage VpH and the second voltage VpL to cause the output voltage V2 to be controlled to the predetermined target voltage.

Here, when the resistance value of the third resistor 121 is set to R1, the resistance value of the fourth resistor 122 is set to R2, the minimum switching frequency of the switching transistor 105a is set to Fmin, and the static capacitance is set to C1, the capacitive element 123, which is connected in parallel with the third resistor 121, meets Equation (1)

$$C1 \geq \frac{R1 + R2}{2\pi F_{min} R2^2} \quad (1)$$

This makes it possible to suppress static load fluctuations of the output voltage when the load current i2 decreases to be a minimum switching frequency Fmin to around the difference between the first voltage and the second voltage. Equation (1) is described below.

Figure 9:
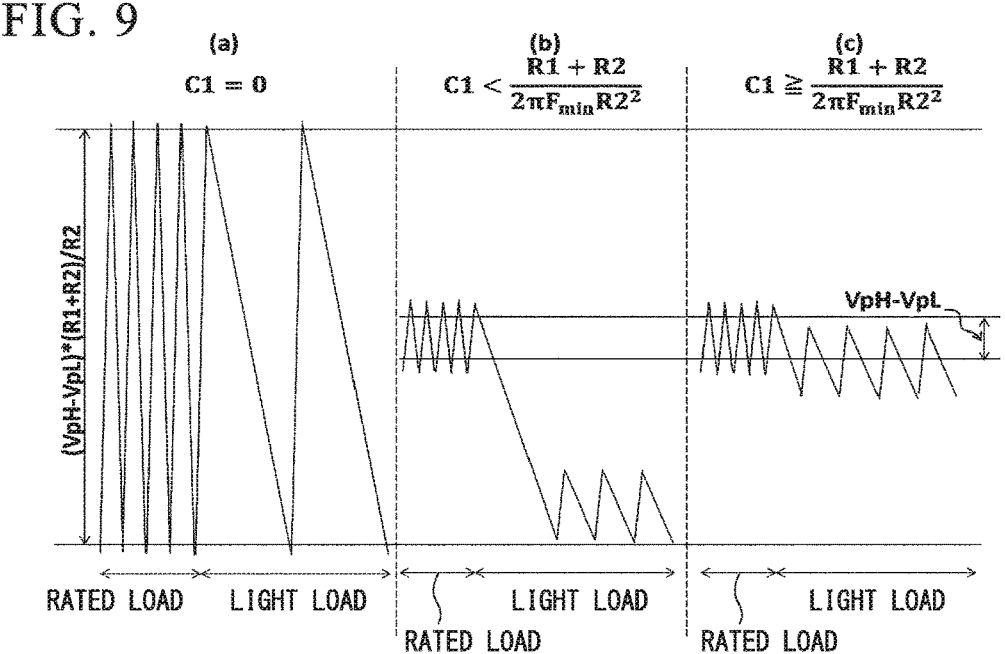
FIG. 9 is a timing waveform diagram illustrating a relationship between a capacitive element shown in the switching power supply in FIG. 8 and output voltage fluctuations.

Next, an effect of suppressing the output voltage fluctuations by the capacitive element 123, which is connected to the third resistor 121, is described using a waveform of the output voltage V2. FIG. 9 is a timing waveform diagram illustrating a relationship between the capacitive element 123 and the output voltage fluctuations. The waveform of the output voltage V2, which is schematically shown in FIG. 9, is a waveform which is extended in the Y-axis direction except for the DC component of the output voltage V2. The X axis shows time, while the Y axis shows a voltage ripple of the output voltage. Moreover, for the static capacitance C1 of the capacitive element 123, a voltage ripple of the output voltage V2 and static load fluctuations are shown, in FIG. 9, for cases of (a) in which there is no capacitive element; (b) in which the static capacitance C1 which is beyond the range of the static capacitance determined with Equation (1) is connected; and (c) in which the static capacitance C1 which meets the static capacitance determined with Equation (1) is connected. Moreover, in FIG. 9, each of (a), (b), and (c) shows cases in which the load is a rated load and in which the load is a light load.

In a case without a capacitive element that is shown in (a) in FIG. 9, the voltage ripple of the output voltage V2 is increased up to the product of a voltage-dividing ratio (R1+R2)/R2 and the difference VpH–VpL between the first voltage and the second voltage. There are no changes in the voltage ripple regardless of whether the load connected to the output terminal 103 is a rated load or a light load, and, for the light load, the switching frequency is lower and the stop period is longer.

In a case in which a static capacitance C1 which is smaller than a static capacitance determined by Equation (1) shown in (b) in FIG. 9 is connected, the voltage ripple of the output voltage V2 may be decreased to around the difference VpH−VpL between the first voltage and the second voltage. Regardless of whether the load connected to the output terminal 103 is the rated load or the light load, the voltage ripple may be decreased to around the same level. However, the average value of the output voltage V2 differs between the rated load and the light load, so that there are large static load fluctuations.

In a case in which a static capacitance C1 which is larger than a static capacitance determined by Equation (1) shown in (c) in FIG. 9 is connected, the static load fluctuations, which represent a difference between the light load and the rated load of the average value of the output voltage V2 in addition to the voltage ripple of the output voltage V2 also may be suppressed to around the difference VpH−VpL of the first voltage and the second voltage. Therefore, the output voltage fluctuations may be suppressed.

Next, the reason that the voltage ripple of the output voltage V2 is brought to the product of the voltage-dividing ratio (R1+R2)/R2 and the difference VpH−VpL between the first voltage and the second voltage when the capacitive element 123 is not connected is described. The output voltage V2 is voltage-divided between the third resistor 121 and the fourth resistor 122, so that the voltage Vn, which is input to the inverting input terminal of the comparator 125a, is voltage-divided to the product of R2/(R1+R2) and the output voltage V2. In this way, the voltage ripple of Vn is also attenuated to the product of R2/(R1+R2) and the voltage ripple of the output voltage V2. The control circuit 120a controls the drive period and the stop period such that Vn is brought to a value between VpL and VpH to control the output voltage V2 to a predetermined target voltage. Therefore, the voltage ripple of Vn is brought to be equal to the difference VpH−VpL of the first voltage and the second voltage to cause the voltage ripple of the output voltage V2 to increase up to the product of (R1+R2)/R2 and the voltage ripple of Vn, so that the magnitude of the voltage ripple of the output voltage V2 is brought to be (VpH−VpL)(R1+R2)/R2.

Next, the reason is described that the capacitive element 123 may be connected to decrease the voltage ripple of the output voltage V2 from the product of (R1+R2)/R2 and the difference VpH−VpL of the first voltage and the second voltage to around the difference VpH−VpL of the first voltage and the second voltage. The capacitive element 123 is connected to the third resistor 121 to cause the voltage Vr1 of the third resistor 121 to be stabilized to almost a value. In this way, the voltage Vn of the inverting input terminal of the comparator 125a is brought to a value in which a Vr1 is subtracted from the output voltage V2 to cause the voltage ripple of Vn to be equal to the voltage ripple of the output voltage V2. The control circuit controls the drive period and the stop period such that Vn is brought to be a value between VpL and VpH to control the output voltage V2 to a predetermined target voltage. Therefore, the voltage ripple of Vn is brought to be equal to the difference VpH−VpL between the first voltage and the second voltage to also bring the magnitude of the voltage ripple of the output voltage V2 to VpH−VpL.

As V2=Vn+Vr1, the output voltage V2 is controlled to a value between VpH+Vr1 and VpL+Vr1.

However, the voltage ripple of the output voltage V2 is brought to a little larger than (VpH−VpL)(R1+R2)/R2 in the case without the capacitive element 123 as shown in (a) in FIG. 9, and is brought to be a little larger than VpH−VpL in the case of connecting the capacitive element 123 as shown in (b) and (c) in FIG. 9. The reason is due to the fact that the output voltage V2 reaches the maximum, before it starts to drop, later than the completion of the drive period of the switching transistor 105a and the output voltage V2 reaches the minimum, before it starts to rise, later than the completion of the stop period of the switching transistor 105a. This is described using the ripple waveform of the output voltage V2 in FIGS. 10A and 10B.

Figure 10A:
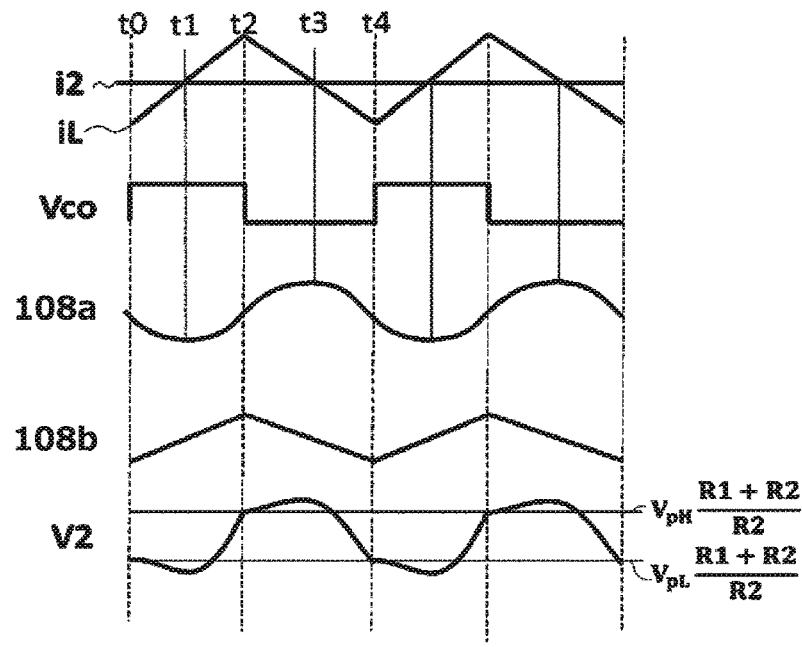
FIGS. 10A and 10B are timing waveform diagrams for explaining an operation when a capacitive element 123 of the switching power supply in FIG. 8 is not connected.
Figure 10B:
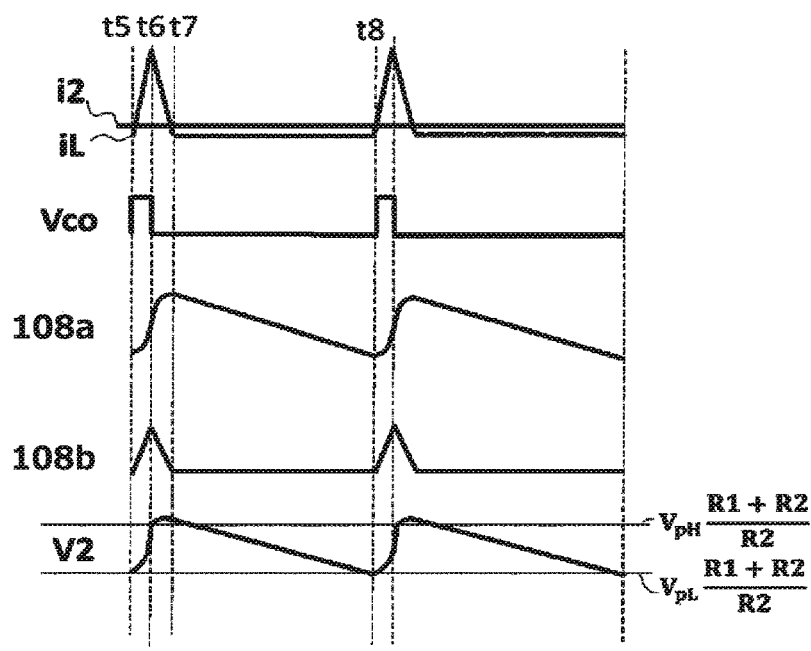

FIG. 10A is an operation waveform when operating in a current continuous mode in which a coil current iL of the switching power supply 101a is continuously changed and FIG. 10B is an operation waveform when operating in a current non-continuous mode in which the coil current iL of the switching power supply 101a is non-continuously changed.

In FIGS. 10A and 10B, i2 is a load current, iL is a current of the choke coil 107, Vco is an output of the comparator 125a, 108a is a voltage of the output capacitor 108a, 108b is a voltage of 108b of an ESR of the output capacitor, and V2 is an output voltage.

As shown in FIG. 10A, the current iL of the choke coil 107 increases when the output Vco of the comparator 125a takes a high level (first level) in the period of t0-t2, and, decreases when it takes a low level (second level) in the period of t2-t4. For the load current i2, a DC current which is an average of iL flows. The voltage of the output capacitor 108 increases when iL>i2 in the period of t1-t3 and decreases when iL<i2 in the period of t0-t1, and t3-t4. The voltage of the ESR (Equivalent Series Resistance) of the output capacitor 108b takes a value in which iL−i2 is multiplied by a resistance value, so that it increases simultaneously with an increase in iL and decreases simultaneously with an decrease in iL. The output voltage V2 is brought to a sum of the voltage of the output capacitor 108a and the voltage of the ESR 108b of the output capacitor, In the case without connecting the capacitive element 123, the output Vco of the comparator 125a is brought to the low level when the output voltage V2 is brought to be larger than VpH(R1+R2)/R2 in t2 and the output Vco of the comparator 125a is brought to the high level when the output voltage V2 is brought to be smaller than VpL (R1+R2)/R2 in t0 or t4. The output voltage V2 is a sum of the voltage of the output capacitor 108a and the voltage of the ESR 108b of the output capacitor, so that, with a delay after the output Vco of the comparator 125a is brought to the low level in t2, the value of the output voltage V2 increases to be larger than VpH (R1+R2)/R2, after which it reaches the maximum in t3 and then starts to decrease, and, with a delay after the output Vco of the comparator 125a is brought to the high level in t0, the value of the output voltage V2 decreases to be lower than VpL (R1+R2)/R2, after which it reaches the minimum in t1 and then starts to increase. Then, in the case without the capacitive element 123, the voltage ripple of the output voltage V2 is brought to be somewhat larger than (VpH−VpL)(R1+R2).

Figure 11A:
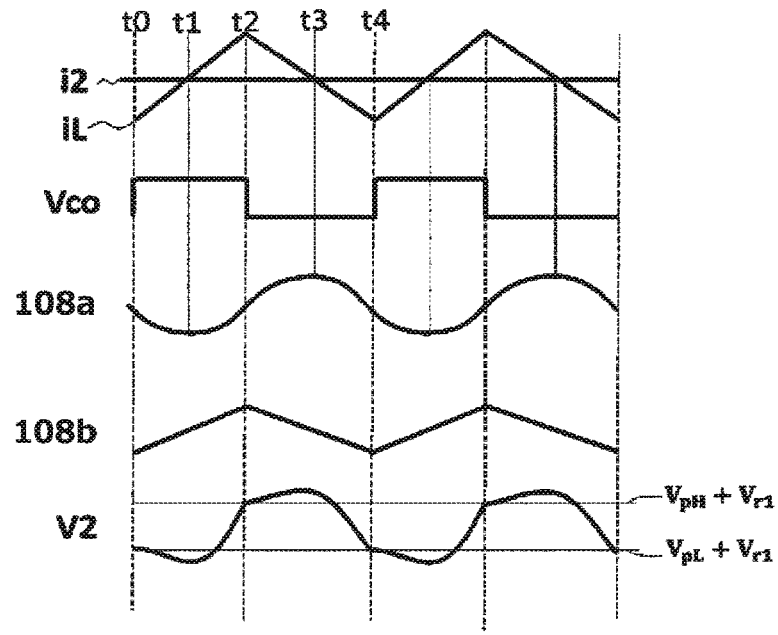
FIGS. 11A and 11B are timing waveform diagrams for explaining an operation when the capacitive element 123 of the switching power supply in FIG. 8 is connected.

As shown in FIG. 11A, also for the same reason, in the case in which the capacitive element 123 is connected in (b) and (c) in FIG. 9, it increases to be somewhat larger than VpH−VpL. As the output voltage V2 is a sum of the voltage of the output capacitor 108a and the voltage of the ESR 108b of the output capacitor, with a delay after the output Vco of the comparator 125a is brought to a low level, the value of the output voltage V2 increases to be larger than VpH+Vr1, after which it reaches the maximum and then starts to decrease, and, with a delay after the output Vco of the comparator 125a is brought to a high level, the value of the output voltage V2 decreases to be smaller than VpL+Vr1, after which it reaches the minimum and then starts to increase.

Figure 11B:
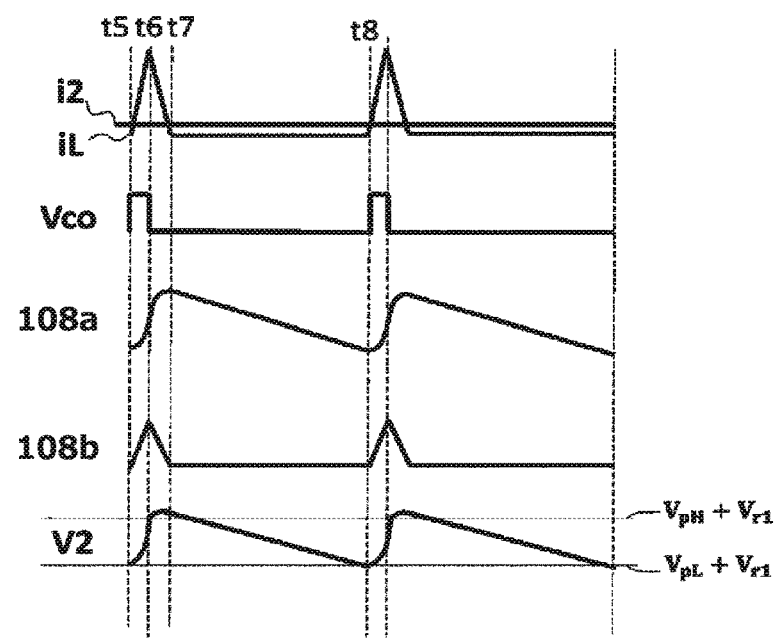

Even when operating in the current non-continuous mode of FIGS. 10B and 11B, in the same manner as in the current continuous mode, the voltage ripple of the output voltage V2 is brought to be somewhat larger. The difference from the case of the current continuous mode is that the output of the comparator 125a is brought to a low level in t6, after which the current iL of the choke coil 107 is decreased to be 0 in t7, and a period in which the current iL of the choke coil 107 is 0 continues in the period between t7 and t8. In the period in which the current iL of the choke coil 107 is 0, the load current i2 is discharged from the output capacitor 108a to cause the output voltage V2 to drop linearly. More specifically, when the load current i2 is small with the light load, the drop of the output voltage V2 is slow, so that it takes time from when the voltage Vn of the inverting input terminal of the comparator 125a reaches VpL to when the output of the comparator 125a is brought to the high level, causing the stop period to be long and the switching frequency to decrease.

Figure 12A:
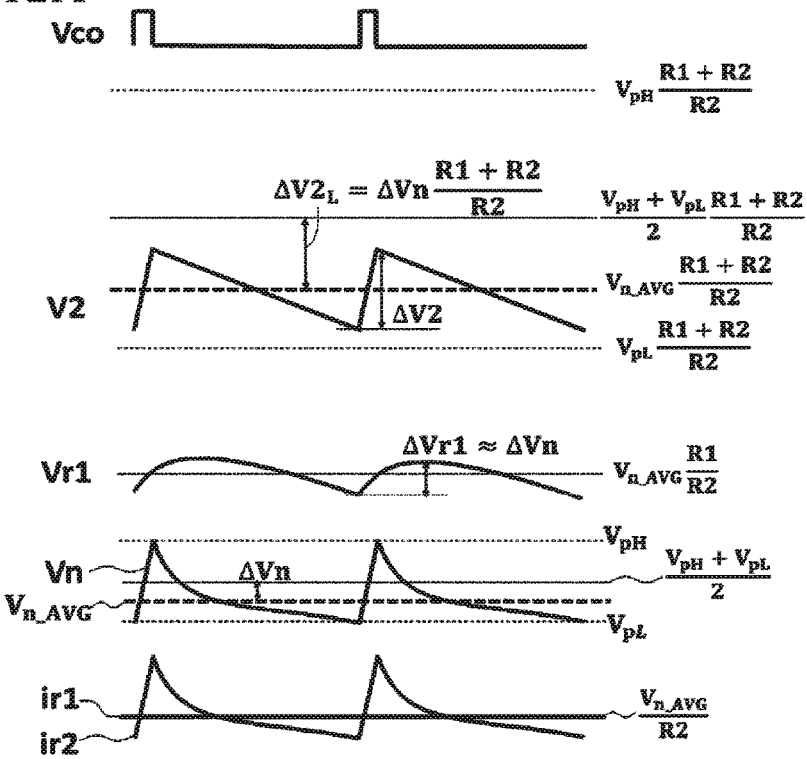
FIGS. 12A and 12B are timing waveform diagrams for explaining the relationship between a control circuit of the switching power supply in FIG. 8 and the output voltage fluctuations.
Figure 12B:
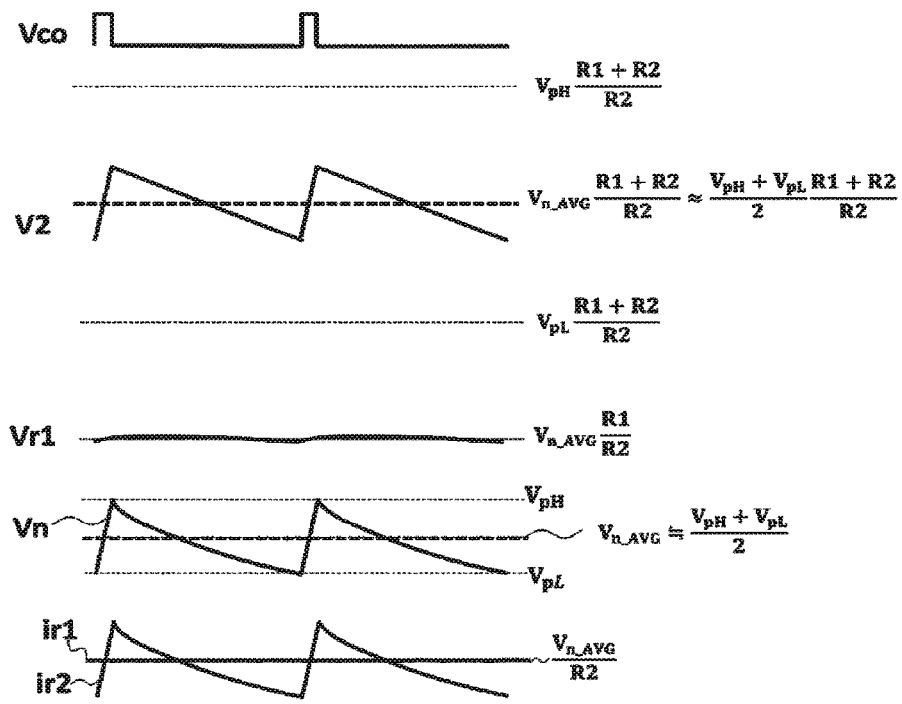

Next, causes for the average value of the output voltage V2 for the light load being lower than that for the rated load for connecting a static capacitance which is smaller than the static capacitance determined with Equation (1) in (b) in FIG. 9 are described using FIGS. 12A and 12B.

FIG. 12A is a timing waveform diagram for connecting a static capacitance C1 which is smaller than the static capacitance determined with Equation (1), while FIG. 12B is a timing waveform diagram for connecting the static capacitance C1, which is substantially larger than the static capacitance determined with Equation (1). In FIGS. 12A and 12B, Vco is an output of the comparator 125a; V2 is an output voltage; Vr1 is a voltage of the voltage-dividing resistor 121; Vn is an inverting input terminal voltage of the comparator 125a; Vn_AVG is the average value of Vn; ir1 is a current of the voltage-dividing resistor 121; and ir2 is a current of the voltage-dividing resistor 122.

FIG. 12A shows the state of the control circuit 120a when operated with the light load and the current non-continuous mode. The comparator 125a has a short period of a high output level and a long period of a low output level, causing the waveform of the output voltage V2 to have a short period in which the voltage increases and to have a long period in which the voltage decreases with a triangular wave in which the voltage linearly decreases.

Figure 13A:
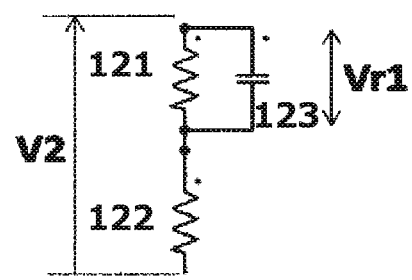
FIGS. 13A and 13B are explanatory diagrams illustrating a low-pass filter which is configured with a voltage-dividing resistance and the capacitive element of the switching power supply in FIG. 8 and a transmission function thereof.
Figure 13B:
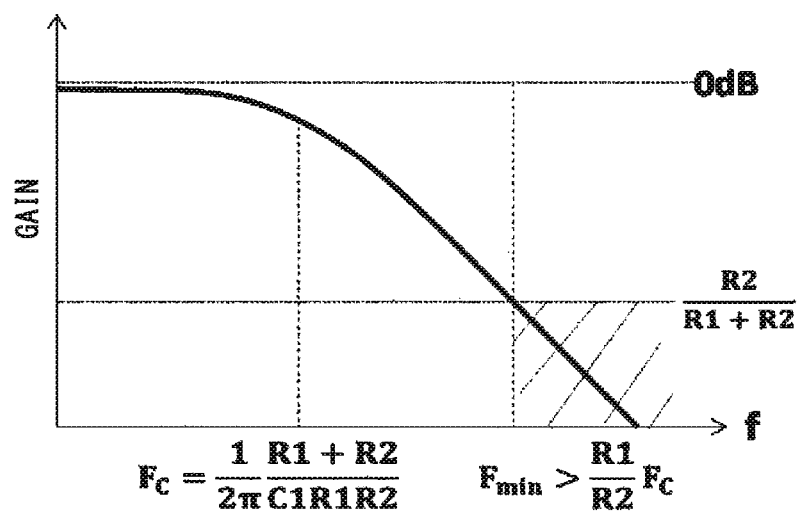

FIG. 13A shows a low-pass filter which has V2 as an input and Vr1 as an output with voltage-dividing resistors 121 and 122, and the capacitive element 123, while FIG. 13B shows the relationship between the frequency and the gain of the low-pass filter shown in FIG. 13A. The transmission function of the low-pass filter is to take the following Equation (2):

$$\frac{\Delta V_{r1}}{\Delta V_2} = \frac{\frac{1}{C1R1}}{s + \frac{R1+R2}{C1R1R2}} \quad (2)$$

The voltage ripple of V2 at the low frequency with the light load may not be sufficiently attenuated by the low-pass filter, so that the voltage ripple remains with Vr1 as shown in FIG. 12A. The inverting input terminal voltage Vn of the comparator 125a is a subtraction of V2−Vr1, so that the waveform of Vn decreases rapidly in the initial period in which the voltage decreases, and then the waveform of Vn gradually decreases. Therefore, Vn_AVG, which is the average value of Vn, is brought to be a value which is lower than (VpH+VpL)/2, which is the intermediate value of VpH and VpL. A decrease amount ΔVn from the intermediate value of Vn_AVG is denoted as follows:

$$\Delta V_n = \frac{V_{pH} + V_{pL}}{2} - V_{n_{AVG}} \quad (3)$$

The current ir2 of the voltage-dividing resistor 122 has a value in which Vn is divided by R2, taking the waveform which is similar to that of Vn as shown. When Vr1 is in the steady state in which Vr1 has the voltage ripple, the current ir1 of the voltage-dividing resistor 121 is equal to the average of the current ir2 of the voltage-dividing resistor 122 and a current ir2−ir1 which flows through the capacitive element 123 takes 0, which is the total in one switching period. Thus, the position relationship between ir1 and ir2 is similar to the position relationship between Vn_AVG and Vn, causing ir1 to take a value which is lower than the intermediate value of ir2 at the same ratio therewith, so that the following relationships in Equations (4) and (5) hold:

$$V_n = i_{r2} R2 \quad (4)$$

$$V_{n\_AVG} = i_{r1} R2 \quad (5)$$

ir1 is a current which flows through the resistor 121, causing the average value of Vr1 to take the following Equation (6):

$$V_{r1} = V_{n\_AVG} \frac{R1}{R2} \quad (6)$$

The average value of V2, V2_AVG, is to take the following Equation (7):

$$V_{2\_AVG} = V_{n\_AVG} + V_{r1} = V_{n\_AVG} \frac{R1+R2}{R2} \quad (7)$$

On the other hand, for connecting the static capacitance, which is substantially larger than the static capacitance determined in Equation (1), or for a case in which the relationship in the following Equation (8) holds since the heavy load causes the switching frequency F to be substantially higher than Fmin for the light load, the waveform in FIG. 12B is taken:

$$C1 \gg \frac{R1+R2}{2\pi F \cdot R2^2} \quad (8)$$

In the low-pass filter having the V2 as the input and Vr1 as the output with the voltage-dividing resistors 121 and 122 and the capacitive element 123, the voltage ripple of the output voltage V2 is substantially attenuated, causing Vr1 to take a waveform which is close to direct current. The inverting input terminal voltage Vn of the comparator 125a is a subtraction of V2−Vr1, where the direct current Vr1 is subtracted from V2 in the triangular wave, resulting in Vn to take the triangular wave. Therefore, as shown in Equation (9) as follows, the average value Vn_AVG, which is the average value of Vn, is brought to be almost equal to (VpH+VpL)/2, which is an intermediate value of VpH and VpL:

$$V_{n\_AVG} \approx \frac{V_{pH} + V_{pL}}{2} \quad (9)$$

Since Equations (4) to (7) also hold in FIG. 12B, the average value V2_AVG of V2 in FIG. 12B is to take the following Equation (10):

$$V_{2\_AVG} = \frac{V_{pH} + V_{pL}}{2} \frac{R1 + R2}{R2} \quad (10)$$

The difference ΔV2L of the average value of V2 in FIG. 12A and the average value of V2 in FIG. 12B is a static load fluctuation for connecting the static capacitance C1, which is outside the range of the static capacitance determined in Equation (1), which is the difference between the average value of V2 in the switching frequency Fmin for the light load in FIG. 12A and the average value of V2 in the case in which Equation (8) in met with the switching frequency F for the heavy load in FIG. 12B. The difference ΔV2L of the average value of V2 is given by the following Equation (11) from Equations (3), (7), and (10):

$$\Delta V_{2L} = \Delta V_n \frac{R1 + R2}{R2} \quad (11)$$

The decrease ΔVn in the average value of Vn occurs due to subtracting Vr1 with the voltage ripple from the triangular wave in V2, so that ΔVn has a magnitude which is almost the same as the voltage ripple ΔVr1 of Vr1. Therefore, the following Equation (12) holds:

$$\Delta V_{2L} = \Delta V_{r1} \frac{R1 + R2}{R2} \quad (12)$$

As shown in Equation (12), the static load fluctuation ΔV2L of the output voltage takes the magnitude which is the product of (R1+R2)/R2 and the ripple ΔVr1 of the inter-terminal voltage of R1 with which the capacitive element 123 is connected in parallel. The output voltage V2 being substantially higher than the reference voltage Vp causes the value of (R1+R2)/R2 to be large, causing a larger static load fluctuation.

Next, the fact is explained that the static capacitance C1, which meets the static capacitance determined in Equation (1) as the capacitive element 123, may be connected to suppress the static load fluctuation ΔV2L of the output voltage to around VpH−VpL, which is the difference between the first voltage and the second voltage.

As an example of specification of the output voltage V2 of the switching power supply 1a, the output voltage ripple ΔV2 is 1% of the output voltage V2 and the total fluctuation of the output voltage v2 is 5% of the output voltage, so that the total fluctuation often allows a range which is wider than that allowed by the output voltage ripple. The total fluctuation here includes a static load fluctuation, a static input fluctuation, an ambient temperature fluctuation, and a temporal drift, so that 1% or below is desirable for only the static load fluctuation. Therefore, targeting that the static load fluctuation ΔV2L is suppressed to be equal to or below the output voltage ripple ΔV2 results in:

$$\Delta V_{2L} < \Delta V_2 \quad (13)$$

As the output voltage ripple ΔV2 is suppressed to around VpH−VpL, which is the difference between the first voltage and the second voltage by providing the capacitive element 123, ΔV2L<ΔV2 may be achieved to also suppress the static load fluctuation ΔV2L of the output voltage to around VpH−VpL, which is the difference between the first voltage and the second voltage.

To meet Equation (13), Equation (12) may be substituted into Equation (2) to determine the condition for which the absolute value of the transmission function shown in Equations (14)(15) is less than or equal to 1:

$$\frac{\Delta V_{2L}}{\Delta V_2} = \frac{R1 + R2}{R2} \frac{\frac{1}{C1R2}}{s + \frac{R1 + R2}{C1R1R2}} \quad (14)$$

$$s = j2\pi F_{min} \quad (15)$$

Determining this condition results in the following Equation (16):

$$C1 > \frac{R1 + R2}{2\pi F_{min} R2^2} \sqrt{1 - \left(\frac{R2}{R1}\right)^2} \quad (16)$$

The output voltage V2 is substantially larger than the reference voltage Vp, so that the voltage-dividing ratio is large; when R1>R2, $$\sqrt{1 - \left(\frac{R2}{R1}\right)^2} \approx 1, \quad (17)$$

ignoring the minute term of $(R2/R1)^2$, results in C1>(R1+R2)/(2πFmin×R22) in Equation (1).

In FIGS. 13A and 13B are shown, with slanted lines, a range of the switching frequency in which ΔV2L, which is the static load fluctuation of the output voltage, may also be suppressed to around VpH−VpL, which is the difference between the first voltage and the second voltage, when the low-pass filter with V2 as the input and Vr1 as the output with the voltage-dividing resistances 121 and 122 and the capacitive element 123 is provided. When the switching frequency is in a region which is higher than the slanted lines for the conditions of heavy load and light load, the static load fluctuation may be suppressed.

The cutoff frequency Fc, at which the gain of the low-pass filter decreases by 3 dB, is given by the following Equation (18):

$$F_C = \frac{R1 + R2}{2\pi C1 R1 R2} \quad (18)$$

From Equations (18) and (1), the minimum switching frequency Fmin is given by the following Equation (19):

$$F_{min} = \frac{R1+R2}{2\pi C1 R2^2} = \frac{R1}{R2}F_C \quad (19)$$

Fmin needs to be set to the product of R1/R2 and Fc to attenuate the gain of the low-pass filter down to R2/(R1+R2) times. When the output voltage V2 is substantially higher than the reference voltage Vp, R1/R2 is large and R2/(R1+R2) is small, so that it is necessary to use the switching frequency in a region which is sufficiently separated from the cutoff frequency Fc and in which attenuation is sufficient.

As an example, for controlling the output voltage V2 to 20V, the first voltage VpH of the reference voltage Vp is set to 1.55V, the second low voltage VpL is set to 1.45V, and the hysteresis width, which is the difference between the first voltage VpH and the second voltage VpL, is set to 0.1V. The output voltage V2 is 13 times the reference voltage Vp, so that the resistance value R1 of the third resistor 121 is set to be 12 times the resistance value R2 of the second resistor R2 to voltage-divide the output voltage V2. For the target specification of the output voltage V2, the output voltage ripple ΔV2 is set to 1% of the output voltage V2 and the static load fluctuation ΔV2L is also set to 1% of the output voltage V2.

When the capacitive element 123 is not connected, then the voltage Vn, with the output voltage V2 being $\frac{1}{13}^{th}$ of the voltage-dividing ratio, is input to the inverting input terminal of the comparator 125a, so that the control circuit controls the output voltage V2 such that Vn is brought to a value between VpL and VpH. Then, the voltage ripple of Vn is brought to be equal to 0.1V of the hysteresis width, which is the difference of the first voltage VpH and the second voltage VpL, and the voltage ripple of the output voltage V2 is brought to 1.3V, which is 13 times the voltage-dividing ratio of the hysteresis width. Then, the output voltage ripple ΔV2 is 6.5% of the output voltage V2, which does not meet the specification.

The capacitive element 123 may be connected to decrease the voltage ripple of the output voltage V2. If the static capacitance of the capacitive element 123 is set to 1 nF, the voltage ripple of the output voltage V2 decreases to 0.15V. However, when the load connected to the output terminal 103 is brought to 10 kΩ to cause the load current to decrease down to 2 mA, the static capacitance of the capacitive element 123 is smaller than the static capacitance 100 nF determined in Equation (1) since the minimum switching frequency Fmin is 1.9 kHz, causing the output voltage V2 to be lower by around 0.7 V than a case of taking the rated load in which the load connected to the output terminal 103 is 3Ω to bring the load current to 7 A. While the voltage ripple ΔV2 of the output voltage V2 decreases down to 0.15V (0.75% of the output voltage V2), the static load fluctuation is 0.7V (3.5% of the output voltage V2), so that the specification of the static load fluctuation is not met.

When the static capacitance of the capacitive element 123 is increased up to the static capacitance of 100 nF, which is determined in Equation (1), the voltage ripple of the output voltage V2 is brought to 0.15V (0.75% of the output voltage V2), and the static load fluctuation, which is the difference between the output voltage V2 for the rated load of the load current of 7 A and that for the load current of 2 mA, is brought to 0.1V (0.5% of the output voltage V2), which is almost equal to 0.1V, which is the hysteresis width. In this case, both the output voltage ripple and the static load fluctuation meet the specification. The static capacitance of the capacitive element 123 may be increased beyond the static capacitance of 100 nF, which is determined in Equation (1) to further increase the static load fluctuation.

As described above, the control circuit according to the present embodiment includes third and fourth resistors 121 and 122 that voltage-divide the output voltage of the switching power supply 101a; a comparator 125a in which a reference voltage Vp is input to a second input terminal thereof; and a controller 130 which controls a switching transistor 105a based on an output signal of the comparator 125a, wherein the reference voltage Vp is brought to a first voltage when the output of the comparator 125a takes a first level (high level) and is brought to a second voltage when the output of the comparator 125a takes a second level (low level), the third resistor 121 is connected between the output terminal positive terminal 103a of the switching power supply 101a and the first input terminal of the comparator 125a; the control circuit includes a capacitive element 123 which is connected in parallel with the third resistor 121; and the Equation (1) is met when the resistance value of the third resistor 121 is set to R1, the resistance value of the fourth resistor 122 is set to R2, the minimum switching frequency of the switching transistor is set to Fmin, and the static capacitance of the capacitive element 23 is set to C1.

In this way, the static load fluctuation of the output voltage when the load current decreases to reach the minimum switching frequency Fmin may be suppressed to around the difference between the first voltage and the second voltage.

Fourth Embodiment

Figure 14:
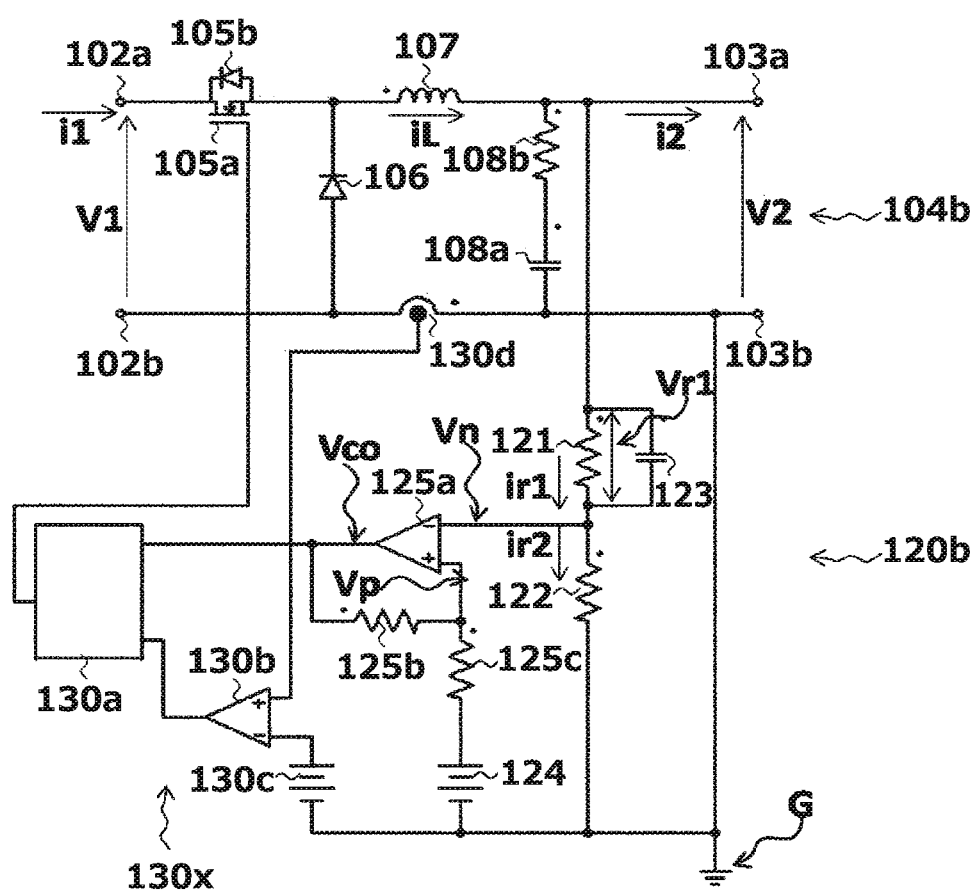
FIG. 14 is a circuit diagram illustrating the configuration of the switching power supply according to a fourth embodiment of the present invention.

FIG. 14 is a circuit diagram illustrating the configuration of a switching power supply 101b according to a fourth embodiment of the present invention. The switching power supply 101b shown in FIG. 14 includes a pair of input terminals 102a and 102b (also called "an input terminal 102" when not specifically distinguishing therebetween); a pair of output terminals 103a and 103b (also called "an output terminal 103" when not specifically distinguishing between); a main circuit 104b; and a control circuit 120b, and converts an input voltage (DC voltage) V1 input to the input terminal 102 to an output voltage (DC voltage) V2 to output the converted result from the output terminal 103 and controls the output voltage V2 to be at a predetermined target voltage. The switching power supply 101b inputs an input voltage V1 and an input current i1 to the input terminal 102 to output the output voltage V2 and a load current i2 from the output terminal 103.

In the same manner as the main circuit 104a of the first embodiment, the main circuit 104b is configured with a back-converter circuit scheme as one example of the switching power supply 101b and converts an input voltage V1 input from the input terminal 102 to the output voltage V2 to output the converted result to the output terminal 3.

The control circuit 120b includes a third resistor 121 and a fourth resistor 122 that voltage-divides the output voltage V2 of the switching power supply 101b; a comparator 125a in which a voltage-divided voltage Vn is input to a first inverting input terminal thereof and a reference voltage Vp is input to a second non-inverting input terminal thereof; and a controller 130x which controls a switching transistor 105a based on an output signal Vco of the comparator 125a, wherein the reference voltage Vp is brought to be a first high VpH when an output Vco of the comparator 125a takes a first high level and is brought to be a second low VpL when the output Vco of the comparator 125a takes a second low level. The control circuit 120b includes the third resistor 121, which is connected between a positive terminal 103a of an output terminal and a first inverting input terminal of the comparator 125a; and a capacitive element 123 which is connected in parallel with the third resistor 121. A common ground G of the control circuit 120b is connected to a negative terminal 103b of the output terminal. Each of signal voltages Vn, Vp, and Vco is set to be a voltage with the common ground G as the reference.

Moreover, in the same manner as the third embodiment, a so-called hysteresis comparator is provided in which a reference voltage Vp is brought to be a first high voltage VpH when an output Vco of the comparator 125a takes a first high level and to be a second low voltage VpL when an output Vco of the comparator 125a takes a second low level. As an example of this hysteresis comparator circuit scheme, in the same manner as the third embodiment, the switching power supply 101b includes the comparator 125a; a resistor 125b which connects between a non-inverting input terminal and an output terminal of the comparator 125a; and a resistor 125c and a constant voltage source 124 that are connected in series between the non-inverting input terminal and the common ground G.

The controller 130x includes a current detection element 130d which detects a current iL which flows through a choke coil 107; a reference voltage 130c; a comparator 130b which compares an output of the current detection element 130d and the reference voltage 130c; and a drive device 130a which drives the switching transistor 105a based on an output Vco of the comparator 125a and an output of the comparator 130b.

The drive device 130a turns on the switching transistor 105a when the output Vco of the comparator 125a takes a first high level and the output of the comparator 130b takes a low level. The output of the comparator 130b is brought to a high level when turning on the switching transistor 105a brings the current iL which flows through the choke coil 107 to at least a value. Then, when the output Vco of the comparator 125a continues at the first high level, the switching transistor 105a is turned off for a period. Turning off the switching transistor 105a causes the current iL which flows though the choke coil 107 to be lower than the value. When the output Vco of the comparator 125a continues to be at the first high level even thereafter, the switching transistor 105a is turned on until the current iL which flows through the choke coil 107 reaches at least the value again. When the output Vco of the comparator 125a takes a second low level, the switching transistor 105a is turned off regardless of the output of the comparator 130b.

This causes switching to be performed a plurality of times during the period in which the output Vco of the comparator 125a is at the first high level.

Next, an operation of the control circuit 120b is described. When the voltage Vn in which the output voltage V2 is resistance-divided decreases below the second voltage VpL, the comparator output Vco is brought to a first high level to cause the controller 130x to start driving the switching transistor 105a, so that the reference voltage is brought to be the first voltage VpH. During the drive period of the switching transistor 105a, the current of the choke coil 107 increases to cause a current iL which is larger than a load current i2 to be supplied from the choke coil 107 to the output capacitor 108a, causing the output capacitor 108a to be charged to raise the output voltage V2. The current iL which flows through the choke coil 107 being brought to be at least a value which is larger than the load current turns off the switching transistor 105a for a period. Turning off the switching transistor 105a causes the current iL which flows through the choke coil 107 to be lower than a value. When the output Vco of the comparator 125a continues at the first high level even thereafter, the switching transistor 105a is turned on until the current iL which flows through the choke coil 107 reaches at least a value again. This causes switching to be performed a plurality of times during a period in which the output Vco of the comparator 125a continues at the first high level. In the controller 130x, when the voltage Vn in which the output voltage V2 is resistance-divided is brought to be higher than the first voltage VpH, the comparator output Vco is brought to a second low level to cause the drive period to be completed and to be transitioned to a stop period. At this time, the reference voltage is brought to the second voltage VpL. In the stop period, the current iL from the choke coil 7 is brought to 0 to cause discharging from the output capacitor 108a by the load current i2 to cause the output voltage V2 to decrease. When the voltage Vn in which the output voltage V2 is resistance-divided is again brought to be lower than the second voltage VpL, the drive period is started again to cause the reference voltage to be brought to the first voltage VpH to cause the switching transistor 105a to be switched a plurality of times. Such an operation is repeated to cause the drive period and the stop period to be controlled such that the resistance-divided voltage Vn is brought to be a value between the first voltage VpH and the second voltage VpL to cause the output voltage V2 to be controlled to the predetermined target voltage.

Here, when the resistance value of the third resistor 121 is set to R1, the resistance value of the fourth resistor 122 is set to R2, and the minimum switching frequency of the switching transistor 105a is set to Fmin, the capacitive element 123, which is connected in parallel with the third resistor 121, is set to be a static capacitance C1 which meets the above-described Equation (1):

In the same manner as the third embodiment, this makes it possible to suppress static load fluctuations of the output voltage to around the difference between the first voltage and the second voltage when the load current i2 decreases to be a minimum switching frequency Fmin.

Figure 15A:
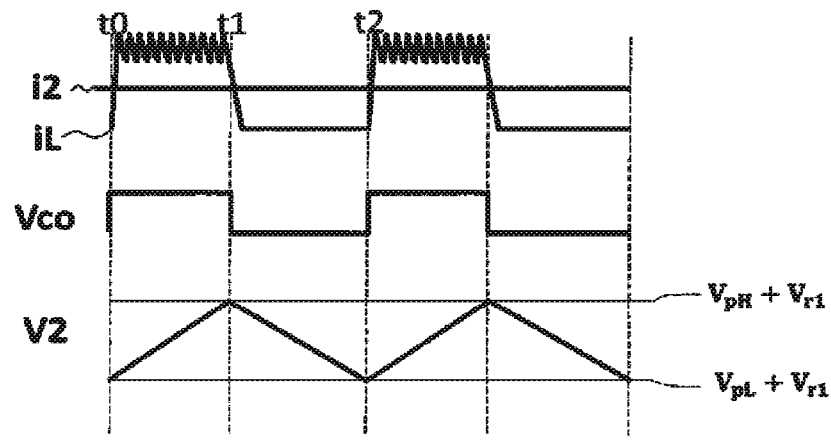
FIGS. 15A and 15B are timing waveform diagrams for explaining an operation when a capacitive element 123 of the switching power supply in FIG. 14 is connected.

The ripple waveform of the output voltage V2 of the switching power supply 101b according to the fourth embodiment is described with reference to FIGS. 15A and 15B. The waveforms of the load current i2, the current iL of the choke coil 107, the output Vco of the comparator 125a, and the output voltage V2 are shown in FIG. 15A for a heavy load with a large load current i2 and in FIG. 15B for a light load with a small load current i2. The capacitive element 123 may be connected to decrease the voltage ripple of the output voltage V2 from the product of (R1+R2)/R2 and the difference VpH−VpL of the first voltage and the second voltage to around the difference VpH−VpL of the first voltage and the second voltage.

This is because the capacitive element 123 is connected to the third resistor 121 to stabilize the voltage Vr1 of the third resistor 121 to almost a constant value. In this way, the voltage Vn of the inverting input terminal of the comparator 125a is brought to a value in which a Vr1 is subtracted from the output voltage V2 to cause the voltage ripple of Vn to be equal to the voltage ripple of the output voltage V2. The control circuit 120b controls the drive period and the stop period such that Vn is brought to be a value between VpL and VpH to control the output voltage V2 to a predetermined target voltage. Therefore, the voltage ripple of Vn is brought to be equal to the difference VpH−VpL between the first voltage and the second voltage to also bring the magnitude of the voltage ripple of the output voltage v2 to VpH−VpL.

As V2=Vn+Vr1, the output voltage V2 is controlled to a value between VpH+Vr1 and VpL+Vr1.

When the output Vco of the comparator 125a is brought to a first high level in t0, the switching transistor 105a is turned on to increase the choke coil current iL. When iL is brought to be larger than a value, the switching transistor 105a is turned off for a period, and, when Vco continually takes a first, high level, the switching transistor 105a is turned on again. This causes switching to be performed a plurality of times during the period of t0-t1 in which the output Vco of the comparator 125a is at the first high level to bring the choke coil current iL to almost a value. During the period in which Vco is at the first, high level, the choke coil current iL is larger than the load current i2, so that the output capacitor 108a undergoes constant current charging with the current of iL−i2 to cause the output voltage V2 to increase linearly. Moreover, when the Vco is at the second low level, as shown for the period of t1-t2 of FIG. 15A, the choke coil current iL is brought to 0. The output capacitor 108a undergoes constant current discharging only by the load current i2 to cause the output voltage V2 to decrease linearly.

Compared to the output voltage V2 according to the third embodiment in FIG. 11A, the output voltage V2 according to the fourth embodiment in FIG. 15A is seldom brought to be larger than VpH+Vr1 or smaller than VpL+Vr1, so that it is suppressed to a value such that the magnitude of the voltage ripple of the output voltage V2 is suppressed to a value which is closer to the hysteresis width of VpH−VpL. This is because, when the output Vco of the comparator 125a is brought to the first high level at t0, iL reaches a current value of a constant current which is larger than i2 in a period which is sufficiently shorter than the length of the period t0-t1 in which Vco is at the first high level to cause the output capacitor 108a to undergo constant current charging with iL−i2 to cause V2 to increase linearly and, when the output Vco of the comparator 125a is brought to the second low level at t1, iL is brought to 0 in a period which is sufficiently shorter than the length of the period t1-t2 in which Vco is at the second low level to cause the output capacitor 108a to undergo constant current charging with i2 to cause V2 to decrease linearly.

In FIG. 11A according to the third embodiment, as iL<i2 during the first half t0-t1 and iL>i2 during the second half t1-t2 of the period in which Vco is at the first high level, charging and discharging of the output capacitor 108a are performed, so that the voltage of 108a at the time of completion of the period in which Vco is at the first high level at t2 is brought to be a center value of the voltage of 108a, so that, with V2 being only the voltage of 108a, V2 is brought to be larger than VpH+Vr1, making it not possible to bring Vco to be at the second low level, causing the hysteresis control not to perform correctly. Therefore, the output voltage V2 may be set to be the sum of the voltage of the output capacitor 108a and the voltage of the equivalent series resistance 108b of the output capacitor 108a, with the magnitude which is at least equivalent to the voltage ripple of 108a, making it possible to correctly operate the hysteresis control. Therefore, a capacitor with a large equivalent series resistance such as an electrolytic capacitor is used for the output capacitor 108a.

On the other hand, in a case of using switching to be performed a plurality of times in the period t0-t1 in which the output Vco of the comparator 125a is at the first high level, such as the fourth embodiment, with the charging/discharging of the output capacitor 108a, the voltage of 108a at t1 at the completion of the period in which Vco is at the first high level is brought to be the maximum value of the voltage of 108a, and the voltage of 108a at t2 at the completion of the period in which Vco is at the second low level is brought to be the minimum value of the voltage of 108a, making it possible to control V2 to be between VpH+Vr1 and VpL+Vr1 without the voltage ripple of the equivalent series resistance 108b, causing the hysteresis control to operate correctly. In this way, a capacitor whose equivalent series resistance is small, such as a ceramic capacitor, may be used for the output capacitor 108a. The ability to use a capacitor whose equivalent series resistance is small is advantageous in reducing the high-frequency noise and dynamic load fluctuation of the output voltage V2 of the switching power supply 101b.

Figure 15B:
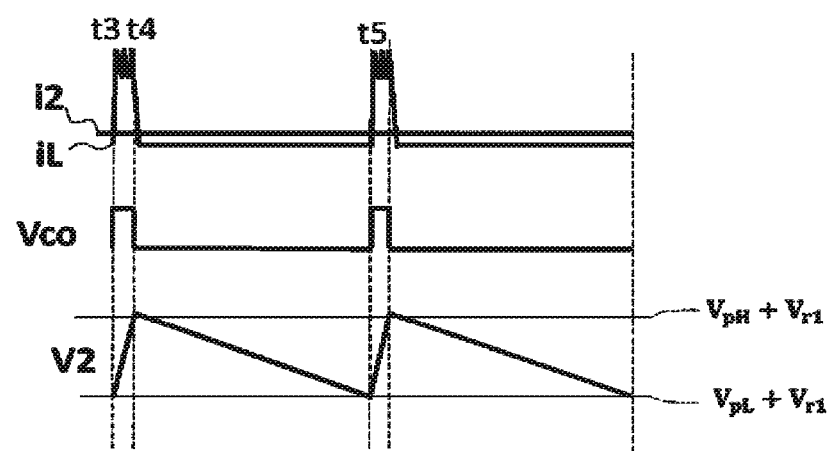

With reference to FIG. 15B, a voltage ripple of the output voltage V2 for the light load according to the fourth embodiment is described. For the light load, the period t4-t5 in which the output Vco of the comparator 125a is at the second low level increases to cause the switching frequency to be low and the average value of iL to take the same low value as i2. In the same manner as FIG. 11B according to the fourth embodiment, V2 has a short rise period and, in the fall period thereof, causes the output capacitor 108a to undergo constant current discharging with a low load current i2, causing V2 to decrease linearly. FIG. 15B has the same waveforms as those in FIG. 11B, so that, in the same manner as what is described previously for the third embodiment, the average value of the inverting output terminal voltage Vn of the comparator 125a that is shown in FIG. 12A decreases from the center value to the same extent as the voltage ripple ΔVr1 of the inter-terminal voltage Vr1 of the third resistor 121. This results in the static load fluctuation ΔV2L of the product of (R1+R2)/R2 and ΔVr1, so that it is necessary to connect the capacitive element 123 which meets Equation (1) in parallel with the third resistor to suppress this static load fluctuation ΔV2L to around the voltage ripple ΔV2 of the output voltage V2.

As described above, for the control circuit of the present embodiment, it is desirable to cause the switching transistor 105a to be switched a plurality of times in a period in which the output Vco of the comparator 125a is at the first level (high level). In this way, as the on/off period of the switching transistor 105a is sufficiently shorter than the on/off period of the output Vco of the comparator 125a, the output Vco of the comparator 125a being brought to the first level (high level) causes the output voltage V2 to increase, while the output Vco of the comparator 125a being brought to the second level (low level) causes the output voltage V2 to decrease, making it possible to suppress the output voltage ripple to around the difference between the first voltage and the second voltage.

Moreover, for the control circuit according to the present embodiment, it is desirable to turn off the switching transistor 105a for a period when the current which flows through the switching power supply 101b is brought to at least a value. This causes the current which flows through the switching power supply 101b to be brought to at least a value in the period in which the output Vco of the comparator 125a is at the first level (high level) to cause repeating of the switching transistor 105a to be turned off for a period, making it possible to cause performing of switching a plurality of times during a period in which the output Vco of the comparator 125a is at the first level. This makes it possible to cause the output capacitor 108a of the switching power supply 101b to be charged with a current which is larger than the load current in the period in which the output Vco of the comparator 125a is at the first level, so that the output voltage V2 linearly increases simultaneously with the beginning of the period in which the output voltage V2 is at the first level. The output capacitor 108a of the switching power supply 101b is discharged with only the load current in the period in which the output Vco of the comparator 125a is at the second level (low level), so that the output voltage V2 linearly decreases at the same time as the beginning of the second level. This makes it possible to suppress the output voltage ripple to around the difference between the first voltage and the second voltage.

For the current which flows through the switching power supply, various detection methods are possible depending on the configuration of the switching power supply. For example, the switching power supply 101b shown in the present embodiment may detect the current of the switching transistor 105a or the choke coil 107. Moreover, an insulation-type switching power supply may detect the coil current of the transformer, while the current of a resonant capacitor may be detect when the resonant capacitor is present.

Fifth Embodiment

Figure 16:
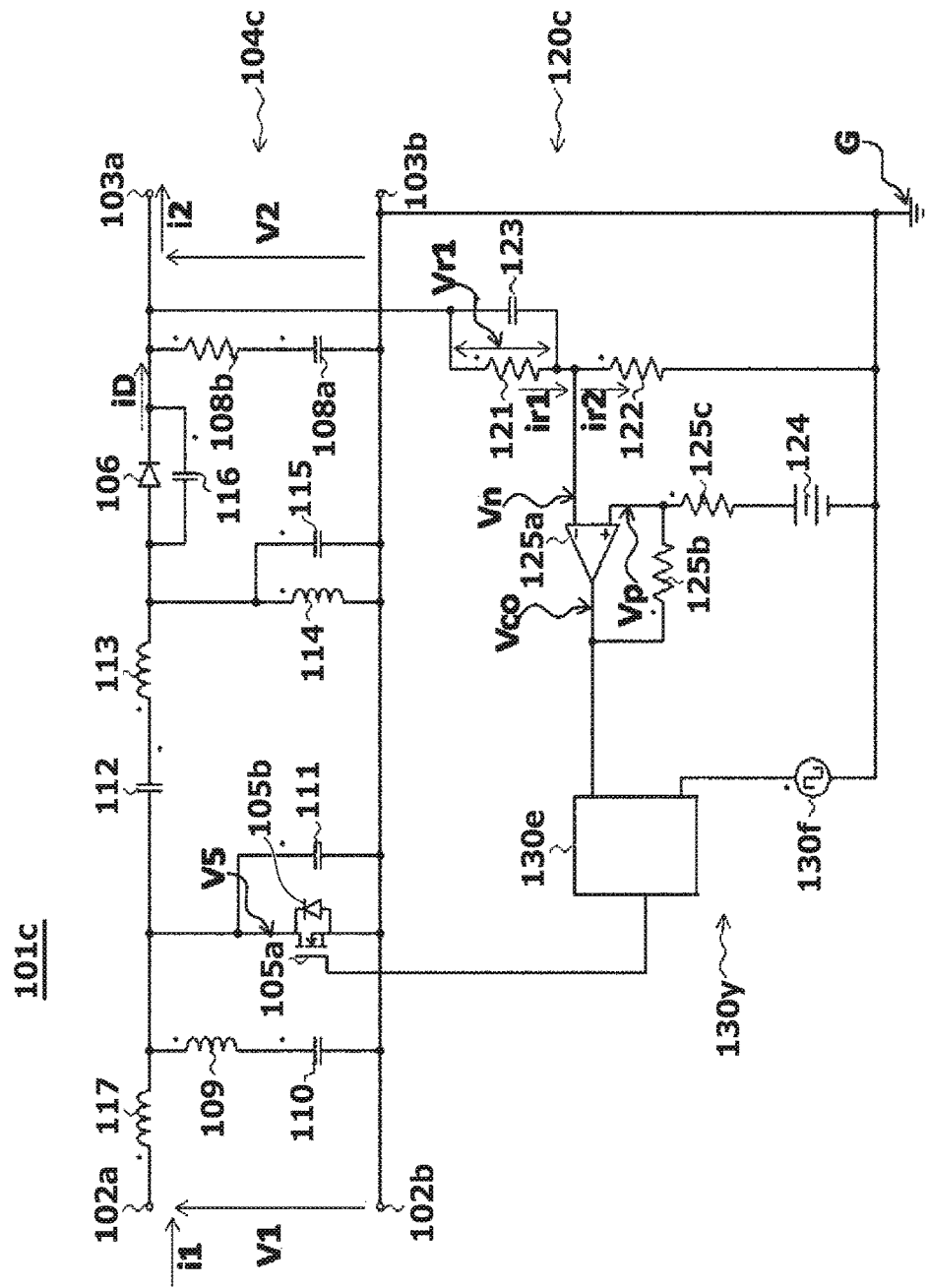
FIG. 16 is a circuit diagram illustrating the configuration of the switching power supply according to a fifth embodiment of the present invention.

FIG. 16 is a circuit diagram illustrating a configuration of a switching power supply 101c according to a fifth embodiment of the present invention. As one example, the switching power supply 101c shown in FIG. 16 includes a pair of input terminals 102a and 102b (also called "an input terminal 102" when not specifically distinguishing therebetween); a pair of output terminals 103a and 103b (also called "an output terminal 103" when not specifically distinguishing between); a main circuit 104c; and a control circuit 120c, and converts an input voltage (DC voltage) V1 input to the input terminal 2 to an output voltage (DC voltage) V2 to output the converted result from the output terminal 103 and controls the output voltage V2 to be at a predetermined target voltage. The switching power supply 101c inputs an input voltage V1 and an input current i1 to the input terminal 102 to output the output voltage V2 and a load current i2 from the output terminal 103.

The main circuit 104c includes a switching transistor 105a, a parasite diode 105b of the switching transistor 105a, a diode 106, resonant inductors 109, 113, 114, and 117, resonant capacitors 110, 111, 112, 115, and 116, an output capacitor 108a, and an equivalent series resistor 108b of the output capacitor 108a. The switching power supply 101c, which is configured with a resonant converter circuit scheme as one example of the switching power supply, outputs an input voltage V1 input from the input terminal 102 to the output voltage V2 to output the converted result to the output terminal 103.

The control circuit 120c includes a third resistor 121 and a fourth resistor 122 that voltage-divides the output voltage V2 of the switching power supply 101c; a comparator 125a in which a voltage-divided voltage Vn is input to a first inverting input terminal thereof and a reference voltage Vp is input to a second non-inverting input terminal thereof; and a controller 130y which controls a switching transistor 105a based on an output signal Vco of the comparator 125a, wherein the reference voltage Vp is brought to be a first high VpH when an output Vco of the comparator 125a takes a first high level and is brought to be a second low VpL when the output Vco of the comparator 125a takes a second low level. The control circuit 120c includes the third resistor 121, which is connected between a positive terminal 103a of an output terminal and a first inverting input terminal of the comparator 125a; and a capacitive element 123 which is connected in parallel with the third resistor 121. A common ground G of the control circuit 120c is connected to a negative terminal 103b of the output terminal. A voltage of each of signal voltages Vn, Vp, and Vco is set to be a voltage with the common ground G as the reference.

Moreover, a so-called hysteresis comparator is provided in the same manner as the third embodiment in which a reference voltage Vp is brought to be a first high voltage VpH when an output Vco of the comparator 125a takes a first high level and is brought to be a second low voltage VpL when an output Vco of the comparator 125a takes a second low level. As an example of a hysteresis comparator circuit scheme, in the same manner as the third embodiment, the switching power supply 101c includes the comparator 125a; a resistor 125b which connects between a non-inverting input terminal and an output terminal of the comparator 125a; and a resistor 125c and a constant voltage source 124 that connects in series between the non-inverting input terminal and the common ground G.

The controller 130y is configured with an oscillator 130f which oscillates at a frequency, and a drive device 130e which drives the switching transistor 105a based on the output Vco of the comparator 125a and the output of the oscillator 130f.

When the output Vco of the comparator 125a is brought to the first high level, the drive device 130e turns on and off the switching transistor 105a based on an output of the oscillator 130f which oscillates at the frequency. The inter-terminal voltage V5 of the switching transistor 105a increases from 0V by turning off the switching transistor 105a. The resonant capacitor 111 may be charged to cause the inter-terminal voltage V5 to start increasing only after the switching transistor 105a is turned off completely to decrease the switching loss at the time of turning off the switching transistor 5a. Thereafter, the inter-terminal voltage V5 again returns to 0V when the switching transistor 105a is turned off for a period by resonating of the resonant inductors 109, 113, 114, 117, and the resonant capacitors 110, 111, 112, 115, and 116. Then, the switching transistor 105a may be turned on to result in so-called ZVS (zero voltage switching), making it possible to decrease a switching loss at the time of turning on the switching transistor 105a. When the output Vco of the comparator 125a continues at the first high level, a process is repeated such that the switching transistor 105a is turned off after being turned during a period, making it possible to causing switching to be performed a plurality of times in the period in which the output Vco of the comparator 125a is at the first high level.

Next, an operation of the control circuit 120c is described. When the voltage in which the output voltage V2 is resistance-divided is brought to be lower than the second voltage VpL, the output Vco of the comparator 125a is brought to the first high level, and the switching device 130y starts driving of the switching transistor 105a, and the reference voltage Vp is brought to the first voltage VpH. The switching transistor 105a being turned on and off by the controller 130y causes a current iD having a semi-sinusoidal wave with a peak value to flow from the diode 106. The time average of iD being larger than the load current i2 causes the output capacitor 108a to be charged to cause the output voltage V2 to increase. In the controller 130y, when the voltage Vn in which the output voltage V2 is resistance-divided is brought to be higher than the first voltage VpH, the comparator output Vco is brought to be at the second low level to cause the drive period to be completed to be transitioned to a stop period. Then, the reference voltage Vp is brought to the second voltage VpL. In the stop period, the current iD from the diode 106 is brought to 0, causing discharging from the output capacitor 108a by the load current i2 to cause the output voltage V2 to decrease. When the voltage Vn in which the output voltage V2 is resistance-divided is brought to be lower than the second voltage VpL again, the drive period is started again to bring the reference voltage Vp to the first voltage VpH to switch the switching transistor 105a a plurality of times. Repeating this operation causes the drive period and the stop period to be controlled such that the resistance-divided voltage Vn is brought to a value between the first voltage VpH and the second voltage VpL to cause the output voltage V2 to be controlled to a predetermined target voltage.

Here, the capacitive element 123 which is connected in parallel with the first resistor 121 is set to be a static capacitance C1 which meets the above-shown Equation (1) when the resistance value of the third resistor 121 is set to R1, the resistance value of the fourth resistor 122 is set to R2, and the minimum switching frequency of the switching transistor 105a is set to Fmin.

In this way, in the same manner as the third and fourth embodiments, when the load current i2 decreases to result in the minimum switching frequency Fmin, the static load fluctuation of the output voltage may be suppressed to around the difference between the first voltage and the second voltage.

Figure 17A:
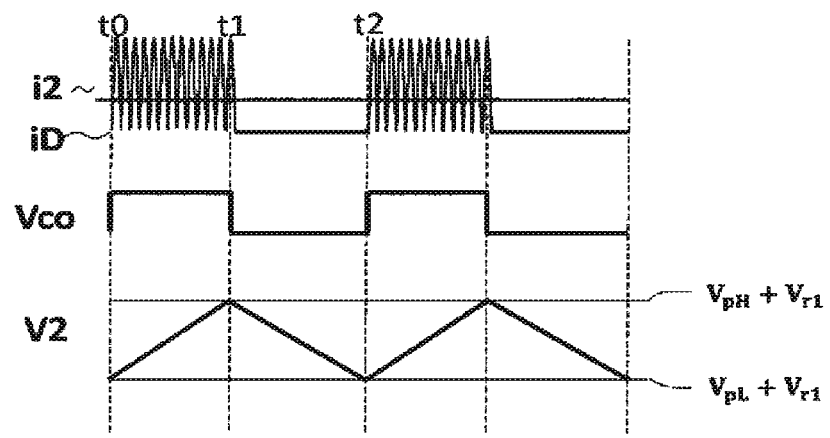
FIGS. 17A and 17B are timing waveform diagrams for explaining an operation when the capacitive element 123 of the switching power supply in FIG. 16 is connected.
Figure 17B:
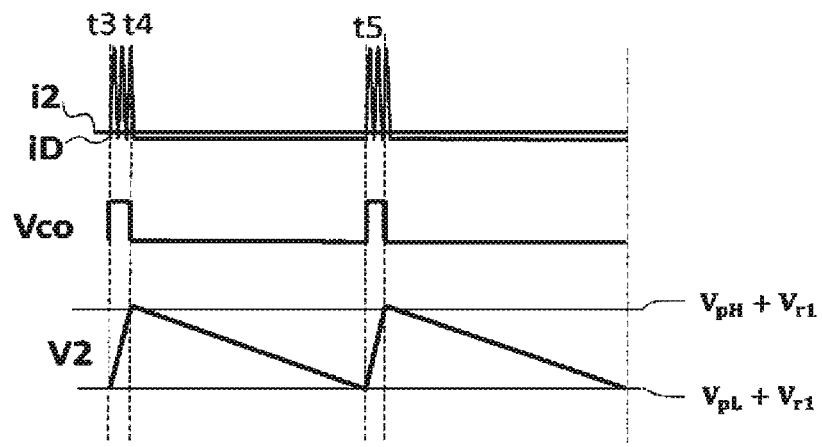

With reference to FIGS. 17A and 17B, a ripple waveform of the output voltage V2 of the switching power supply 101c according to the fifth embodiment is described. The waveform of the load current i2 for a heavy load when the load current i2 is large is shown along in FIG. 17A and the waveform of the load current i2 for a light load when the load current i2 is small is shown in FIG. 17B, along with the waveforms of the current iD of the diode 106, the output Vco of the comparator 125a, and the output voltage V2. The capacitive element 123 may be connected to decrease the voltage ripple of the output voltage V2 from the product of (R1+R2)/R2 and the difference VpH−VpL of the first voltage and the second voltage to around the difference VpH−VpL of the first voltage and the second voltage.

This is because the capacitive element 123 is connected to the third resistor 121 to stabilize the voltage Vr1 of the third resistor 121 to almost a constant value. In this way, the voltage Vn of the inverting input terminal of the comparator 125a is brought to a value in which a Vr1 is subtracted from the output voltage V2 to cause the voltage ripple of Vn to be equal to the voltage ripple of the output voltage V2.

The control circuit 120c controls the drive period and the stop period such that Vn is brought to be a value between VpL and VpH to control the output voltage V2 to a predetermined target voltage. Therefore, the voltage ripple of Vn is brought to be equal to the difference VpH−VpL between the first voltage and the second voltage to also bring the magnitude of the voltage ripple of the output voltage v2 to VpH−VpL. As V2=Vn+Vr1, the output voltage V2 is controlled to a value between VpH+Vr1 and VpL+Vr1.

When the output Vco of the comparator 125a is brought to a first high level in t0, the switching transistor 105a is turned on and off by the controller 130y to cause the current iD having a semi-sinusoidal wave with a peak value to flow through the diode 106. The time average of iD is constant and larger than the load current i2, causing the output capacitor 8a to undergo constant-current charging in the period of t0-t1 to cause the output voltage V2 to increase linearly. Moreover, during the period of t1-t2 in which the Vco is at the second low level, the current iD of the diode 106 is brought to 0 as shown in FIG. 17A. The output capacitor 108a undergoes constant current discharging only by the load current i2 to cause the output voltage V2 to decrease linearly.

In the same manner as the output voltage V2 according to the fifth embodiment in FIG. 17A, the output voltage V2 according to the fourth embodiment in FIG. 15A is seldom brought to be larger than VpH+Vr1 or smaller than VpL+Vr1, so that it is suppressed to a value such that the magnitude of the voltage ripple of the output voltage V2 is suppressed to a value which is closer to the hysteresis width of VpH−VpL. This is because, when the output Vco of the comparator 125a is brought to the first high level at t0, iD reaches a current value of a constant current which is larger than i2 in a period which is sufficiently shorter than the length of the period t0-t1 in which Vco is at the first high level to cause the output capacitor 108a to undergo constant current charging with iL−i2 to cause V2 to increase linearly and, when the output Vco of the comparator 125a is brought to the second low level at t1, iD is brought to 0 in a period which is sufficiently shorter than the length of the period t1-t2 in which Vco is at the second low level to cause the output capacitor 108a to undergo constant current discharging with i2 to cause V2 to decrease linearly.

Moreover, in the same manner as the fourth embodiment, according to the fifth embodiment, for causing switching to be performed a plurality of times in the period in which the output Vco of the comparator 125a is at the first high level, charging and discharging of the output capacitor 108a cause the voltage of the output capacitor 108a at the time of completion of the period in which Vco is at the first high level at t1 is brought to be the maximum value of the voltage of the output capacitor 108a. Moreover, the voltage of the output capacitor 108a at the time of completion of the period in which the output Vco of the comparator 125a is at the second low level at t2 is brought to be the minimum value of the voltage of the output capacitor 108a. Thus, even when the voltage ripple of the equivalent series resistance 108b is not present, the output voltage V2 may be controlled to be between VpH+Vr1 and VpL+Vr1, causing the hysteresis control to operate correctly. Therefore, a capacitor with a small equivalent series resistance, such as a ceramic capacitor, may be used for the output capacitor 108a. The capacitor with the small equivalent series resistance may be used to achieve advantageous effects in reducing the dynamic load fluctuation of the output voltage V2 of the switching power supply 101c and the high frequency noise. Moreover, according to the fifth embodiment, the switching frequency may be increased while suppressing the switching loss of the switching transistor 105a to decrease energy which accumulates in the resonant inductors 109, 113, 114, 117 and the resonant capacitors 110, 111, 112, 115, 116 that are used in the main circuit 104c of the resonant converter. The smaller the energy accumulated in these resonant inductors and capacitors, the greater the ability to cause the average value of the current iD of the diode 106 to follow a value which is close to the load current i2 when the load current i2 changes rapidly, making it possible to suppress the dynamic load fluctuation of the output voltage. This makes it possible to suppress the dynamic load fluctuation of the output voltage, the static load fluctuation, and the output voltage ripple to around the difference between the first voltage and the second voltage.

With reference to FIG. 17B, a voltage ripple of the output voltage V2 for the light load according to the fifth embodiment is described. For the light load, the period t4-t5 in which the output Vco of the comparator 125a is at the second low level increases to cause the switching frequency to be low. In the same manner as FIG. 11B according to the third embodiment and FIG. 15B according to the fourth embodiment, V2 has a short rise period and, in the fall period thereof, causes the output capacitor 108a to undergo constant current discharging over a long time with a low load current i2, causing V2 to decrease linearly. FIG. 17B has the same waveforms as those in FIGS. 11B and 15B, so that, in the same manner as what is described previously for the first and second embodiments, the average value of the inverting output terminal voltage Vn of the comparator 125a that is shown in FIG. 12A decreases from the intermediate value to the same extent as the voltage ripple ΔVr1 of the inter-terminal voltage Vr1 of the third resistor 121. This results in the static load fluctuation ΔV2L of the product of (R1+R2)/R2 and ΔVr1, so that it is necessary to connect the capacitive element 123 which meets Equation (1) in parallel with the third resistor 121 to suppress this static load fluctuation ΔV2L to around the voltage ripple ΔV2 of the output voltage V2.

As described above, the control circuit 120c of the present embodiment is a resonant converter in which the main circuit 104c of the switching power supply 101c includes a resonant converter. In this way, the switching frequency may be increased while suppressing the switching loss to decrease energy accumulated in the inductors 109, 113, 114, 117 and capacitors 110, 111, 112, 115, 116. Therefore, the dynamic load fluctuation of the output voltage V2, the static load fluctuation, and the output voltage ripple may be suppressed to around the difference between the first voltage and the second voltage.

Sixth Embodiment

Figure 18:
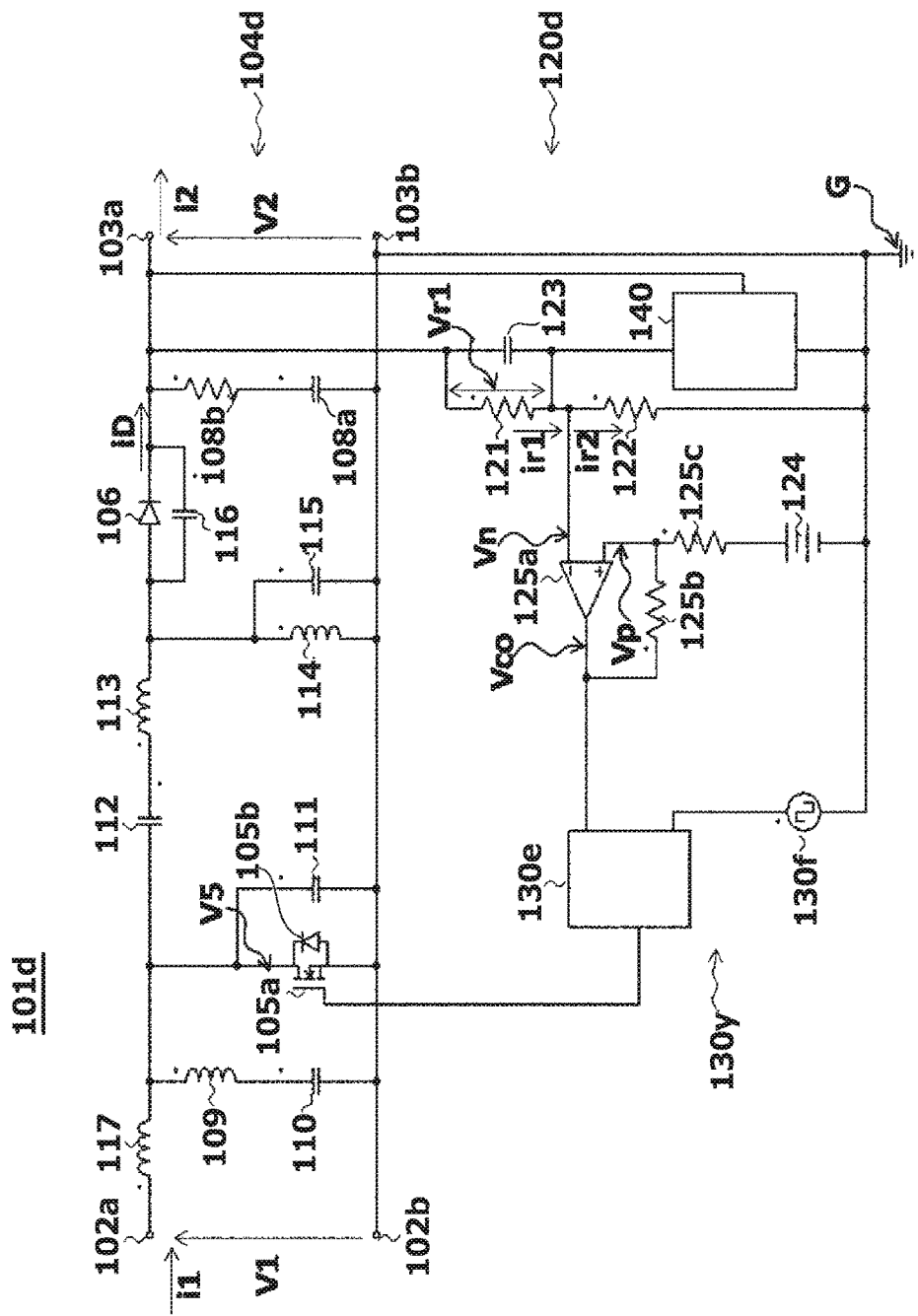
FIG. 18 is a circuit diagram illustrating the configuration of the switching power supply according to a sixth embodiment of the present invention.

A sixth embodiment according to the present invention is described for the configuration of a switching power supply device 101d with reference to the drawings. The switching power supply device 101d shown in FIG. 18 is an addition of a charging circuit 140 which charges the capacitive element 123 at the time of activation to the configuration of the fifth embodiment shown in FIG. 16. The same charging circuit 140 may also be added to the third and fourth embodiments. Describing the fifth embodiment as an example, the capacitive element 123 connects the capacitive element which meets Equation (1) in parallel with the third resistor 121, so that a period at the time of activating the switching power supply 101c shown in FIG. 16 in which the inter-terminal voltage Vr1 of the third resistor 121 is lower than the voltage Vr1, which is stable after completion of the activation, continues for a long time. The inverting input terminal voltage Vn of the comparator 125a is controlled to V2=Vp+Vr1 since the output voltage V2 is controlled to be brought to the same value as the reference voltage Vp, so that a period continues for a long time in which the output voltage V2 also is lower than the predetermined target voltage. The predetermined target voltage for the output voltage V2 is the product of (R1+R2)/R2 and Vp, so that Vr1 then is Vp times R1/R2. For Vr1 to reach the voltage of Vp×R1/R2 from 0V at the time of activation, the capacitive element 123 is charged along a route which goes through the capacitive element 123, the fourth resistor 122, and the common ground G from the positive terminal 103a of the output terminal. Taking into account the loss of the control circuit, resistance values R1 and R2 of the third resistor 121 and the fourth resistor 122 may not be set to a small value (for example, less than or equal to 1 kΩ). Therefore, the charge current of the capacitive element 123 being small and the static capacitance of the capacitive element 123 shown in Equation (1) being large cause the period to reach the voltage Vp×R1/R2 from 0V at the time of activation to be longer.

The charging circuit 140 shown in FIG. 18 detects the output voltage V2 to short-circuit the common ground G and the inverting input terminal of the comparator 125a only in an activation period in which the output voltage V2 is also lower than the predetermined target voltage. Therefore, during the activation period, the capacitive element 123 is charged with a large charge current along a route passes through the capacitive element 123 and the charging circuit 140 from the positive terminal 103a of the output terminal. In this way, the activation period for the output voltage V2 to reach the predetermined target voltage from 0V may be shortened when the capacitive element 123 of the static capacitance shown in Equation (1) is connected in parallel with the third resistor 121.

Figure 19A:
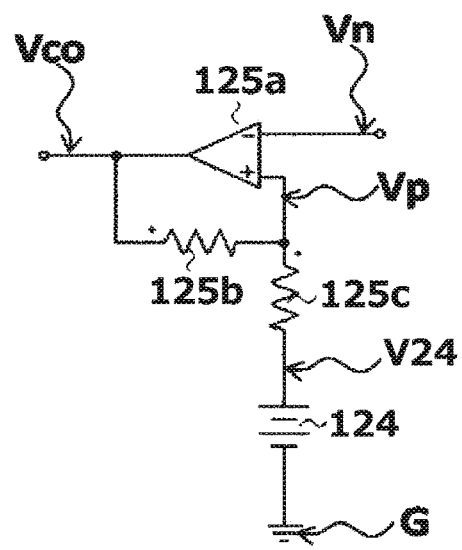
FIGS. 19A and 19B are circuit diagrams illustrating configurations of comparators and reference voltages according to embodiments of the present invention.
Figure 19B:
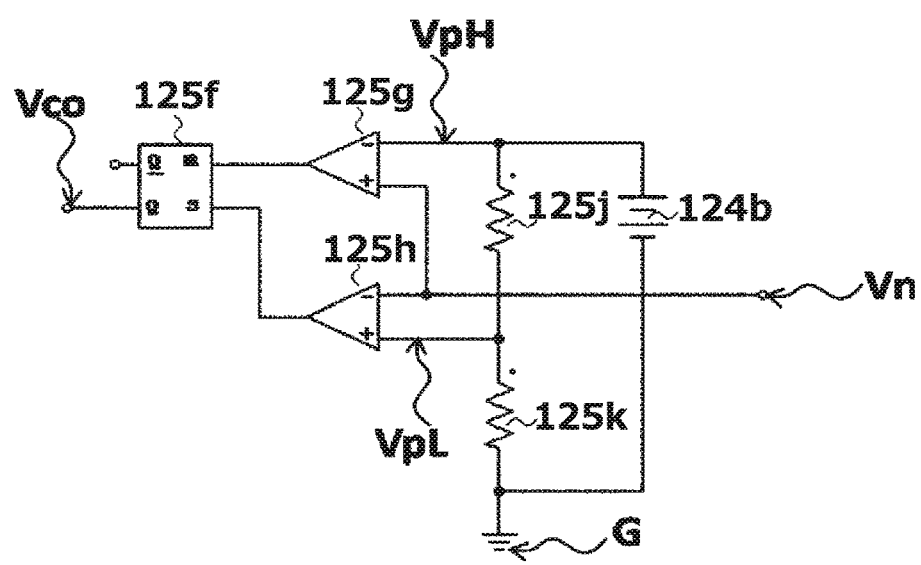

FIGS. 19A and 19B show embodiments of a so-called hysteresis comparator in which a reference voltage Vp is brought to a first high voltage VpH when an output Vco of the comparator takes a high level VcoH and to a second voltage VpL when the output Vco of the comparator takes a second low voltage VcoL. For the hysteresis comparator circuit scheme, a first specific example is shown in FIG. 19A, while a second specific example is shown in FIG. 19B. The first specific example of the hysteresis comparator circuit scheme includes a comparator 125a; a resistor 125b of a resistance value Rb that connects between the non-inverting input terminal and the output terminal of the comparator 125a; and a constant voltage source 124 of a voltage V24 and a resistor 125c of a resistance value Rc that connects serially between the common ground G and the non-inverting terminal. The reference voltage Vp when the output Vco of the comparator 125a is at the first high level VcoH is brought to VpH, shown in Equation (20) below:

$$V_{pH} = V_{24}\frac{R_b}{R_b + R_c} + V_{coH}\frac{R_c}{R_b + R_c} \quad (20)$$

The reference voltage Vp when the output Vco of the comparator is at the second low level VcoL is brought to VpL, shown in Equation (21) below:

$$V_{pL} = V_{24}\frac{R_b}{R_b + R_c} + V_{coL}\frac{R_c}{R_b + R_c} \quad (21)$$

The difference VpH−VpL between the first voltage and the second voltage is shown in Equation (22) below:

$$V_{pH} - V_{pL} = (V_{coH} - V_{coL})\frac{R_c}{R_b + R_c} \quad (22)$$

As an example, when VcoH=5V in which the output Vco of the comparator 125a is equal to the power supply voltage of the comparator 125a, or VcoL=0V, and V24=1.5V, and Rc/(Rb+Rc)=0.02 in which the resistance value Rc of the resistor 125c is set to be sufficiently smaller than the resistance value Rb of the resistor 125b, VpH=1.57V, VpL=1.47V, and VpH−VpL=0.1V.

The inverting input terminal voltage Vn of the comparator 125a is compared with a high VpH to determine whether Vco is changed from VcoH to VcoL in the period in which the output Vco of the comparator 125a is at the first high level VcoH and the inverting input terminal voltage Vn of the comparator 125a is compared with a low VpL to determine whether Vco is changed from VcoL to VcoH in the period in which the output Vco of the comparator 125a is at the second low level VcoL, the output Vco of the comparator 125a is not changed and maintained to the first high level VcoH or the second low level VcoL when Vn takes an intermediate value of VpH and VpL.

A second example shown in FIG. 19B is a so-called window comparator which may realize a function equivalent to that of the hysteresis comparator according to the first specific example. The second specific example includes a comparator 125g, a comparator 125h, a constant voltage source 124b of a voltage VpH, a resistor 125j which voltage-divides the constant voltage source 124b, a resistor 125k, and an SR flip-flop 125f. The input signal Vn to the window comparator is input to the non-inverting input terminal of the comparator 125g and the inverting input terminal of the comparator 125h; the voltage VpH of the constant voltage source 124b is input to the inverting input terminal of the comparator 125g, and the voltage VpL in which the voltage VpH of the constant voltage source 124b is voltage-divided by the resistor 125j and the resistor 125k is input to the non-inverting input terminal of the comparator 125h. The output of the comparator 125h is brought to a high level to set the SR flip-flop 125f, and the output Vco of the SR flip-flop 125f to be brought to the first high level VcoH, and the output of the comparator 125g is brought to a high level to reset the SR flip-flop 125f, and the output Vco of the SR flip-flop 125f to be brought to the second low level VcoL. In this way, in the period in which the output Vco of the SR flip-flop 125f is at the first high level VcoH, the input signal Vn to the window comparator is compared with the high VpH to determine whether Vco is changed from VcoH to VcoL and, in the period in which the output Vco of the SR flip-flop 125f is at the second low level VcoL, the input signal Vn into the window comparator is compared with the low VpL to determine whether the Vco is changed from VcoL to VcoH, Vco is not changed and maintained at the first high level VcoH or the second low level VcoL when Vn takes an intermediate value of VpH and VpL.

Therefore, the window comparator shown in FIG. 19B may realize the function of the input signal Vn and the output signal Vco that are equivalent to the hysteresis comparator shown in FIG. 19A.

The function equivalent to the hysteresis comparator and the window comparator according to the embodiments of the present invention that are described above may be embedded into an integrated circuit, so that the embodiments of the present invention are not to be limited to the above-recited descriptions of the embodiments.

Seventh Embodiment

Figure 20:
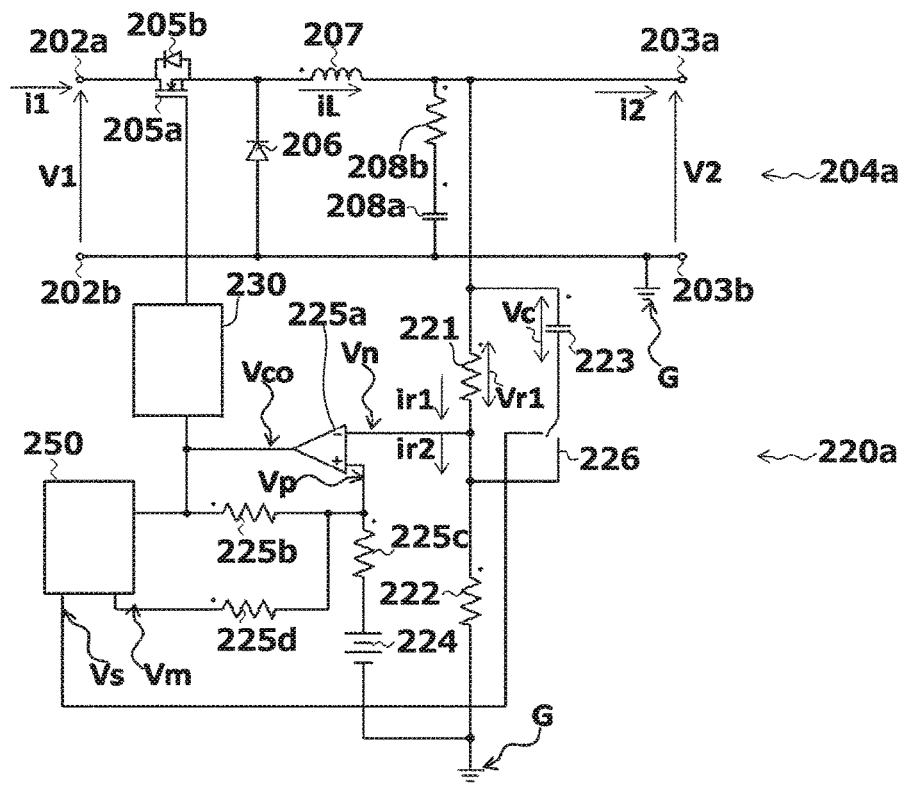
FIG. 20 is a circuit diagram illustrating the configuration of the switching power supply according to a seventh embodiment of the present invention.

FIG. 20 is a circuit diagram illustrating the configuration of a switching power supply 201a according to a seventh embodiment of the present invention. As one example, the switching power supply 201a shown in FIG. 20 includes a pair of input terminals 202a and 202b (also called "an input terminal 202" when not specifically distinguishing therebetween); a pair of output terminals 203a and 203b (also called "an output terminal 203" when not specifically distinguishing between); a main circuit 204a; and a control circuit 220a, and converts an input voltage (DC voltage) V1 input to the input terminal 202 to an output voltage (DC voltage) V2 to output the converted result from the output terminal 203 and controls the output voltage V2 to be at a predetermined target voltage. The switching power supply 201a inputs an input voltage V1 and an input current i1 to the input terminal 202 to output the output voltage V2 and a load current i2 from the output terminal 203. The switching power supply 201a inputs an input voltage V1 and an input current i1 to the input terminal 202 to output the output voltage V2 and a load current i2 from the output terminal 203.

The main circuit 204a includes a switching transistor 205a, a parasite diode 205b of the switching transistor 205a, a diode 206, a choke coil 207, an output capacitor 208a, and an equivalent series resistor 208b of the output capacitor 208a. The switching power supply 201a, which is configured with a back converter circuit scheme as one example, outputs an input voltage V1 input from the input terminal 202 to the output voltage V2 to output the converted result to the output terminal 3.

The control circuit 220a includes a third resistor 221 and a fourth resistor 222 that voltage-divide the output voltage V2 of the switching power supply 201a; a comparator 225a in which a voltage-divided voltage Vn is input to a first inverting input terminal thereof and a reference voltage Vp is input to a second non-inverting input terminal thereof; and a controller 230 which controls a switching transistor 205a based on an output signal Vco of the comparator 225a. The control circuit 220a includes the third resistor 221, which is connected between a positive terminal 203a of an output terminal and a first inverting input terminal of the comparator 225a; and a series connection of a capacitive element 223 and a switch element 226 that is connected in parallel with the third resistor 221. A reference voltage Vp is brought to be a first high voltage VpH when an output Vco of the comparator 225a takes a first high level and to be a second low voltage VpL when an output Vco of the comparator 225a takes a second low level. Moreover, the control circuit 220a includes an OFF period detection circuit 250 which detects that the second level of the output Vco of the comparator 225a has been continuing longer than a period, wherein, when the second level of the output Vco of the comparator 225a has been continuing longer than the period, the OFF period detection circuit 250 opens the switch element 226 with an output signal Vs and, at the same time, brings the reference voltage Vp to a third intermediate voltage VpM with an output signal Vm.

A common ground G of the control circuit 220a is connected to a negative terminal 203b of the output terminal. Each of signal voltages Vn, Vp, Vco, Vs, and Vm is set to be a voltage with the common ground G as the reference.

Moreover, a so-called hysteresis comparator is known in which the reference voltage Vp is brought to be a first high voltage VpH when the output Vco of the comparator 225a takes a first high level and to be a second low voltage VpL when the output Vco of the comparator 225a takes a second low level. Furthermore, when the second low level of the output Vco of the comparator 225a has been continuing longer than a specific period, the reference voltage Vp is brought to be a third intermediate voltage VpM with an output signal Vm of the OFF period detection circuit 50. The switching power supply 201 is configured with a hysteresis comparator circuit scheme as an example and includes the comparator 225a; a resistor 225b which connects between a non-inverting input terminal and an output terminal of the comparator 225a; and a resistor 225c and a constant voltage source 224 that are connected in series between the common ground G and the non-inverting input terminal; and a resistor 225d which is connected between the non-inverting input terminal of the comparator 225a and the OFF period detection circuit 250.

Next, an operation of the control circuit 220a is described. When the voltage Vn in which the output voltage V2 is resistance-divided decreases below the second voltage VpL, the comparator output Vco is brought to a first high level to cause the controller 230 to start driving the switching transistor 205a, so that the reference voltage is brought to be the first voltage VpH. During the drive period of the switching transistor 205a, the current of the choke coil 207 increases to cause a current iL which is larger than a load current i2 to be supplied from the choke coil 207 to the output capacitor 208a, causing the output capacitor 208a to be charged to raise the output voltage V2. When the voltage Vn in which the output voltage V2 is resistance-divided is brought to be higher than the first voltage VpH, the comparator output Vco is brought to a second low level to cause the drive period to be completed and to be transitioned to a stop period. At this time, the reference voltage is brought to be the second voltage VpL. In the stop period, the load current i2 is brought to be larger than the current iL from the choke coil 207 to cause discharging from the output capacitor 208a to cause the output voltage V2 to decrease. When the voltage Vn in which the output voltage V2 is resistance-divided is again brought to be lower than the second voltage VpL, the drive period is started again to bring the reference voltage to the first voltage VpH. Such an operation is repeated to cause the drive period and the stop period to be controlled such that the resistance-divided voltage Vn is brought to be a value between the first voltage VpH and the second voltage VpL to cause the output voltage V2 to be controlled to the predetermined target voltage.

Here, when the switching frequency is high and the period in which the output Vco of the comparator 225a is at the second low level is short, the switch element 226 is closed. In this way, the capacitive element 223 is connected to the third resistor 221 to cause an output voltage ripple to be suppressed. When the switching frequency decreases and the period in which the output Vco of the comparator 225a is at the second low level increases, the switch element 226 is opened to cause the capacitive element 223 to be separated from the third resistor 221 and the reference voltage to be a third voltage VpM.

Figure 21:
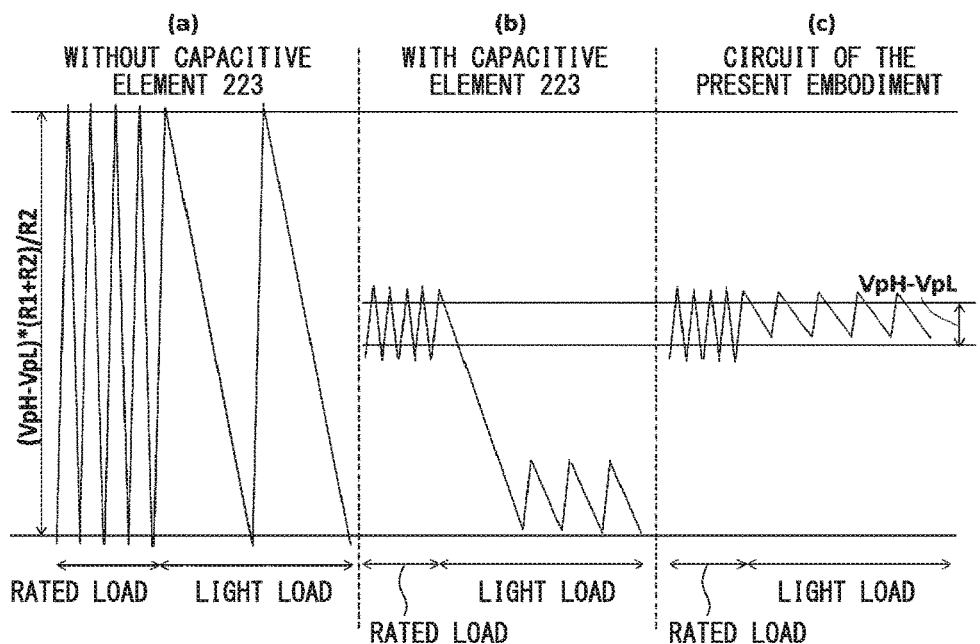
FIG. 21 is a timing waveform diagram illustrating a relationship between a capacitive element shown in the switching power supply in FIG. 20 and output voltage fluctuations.
Figure 28:
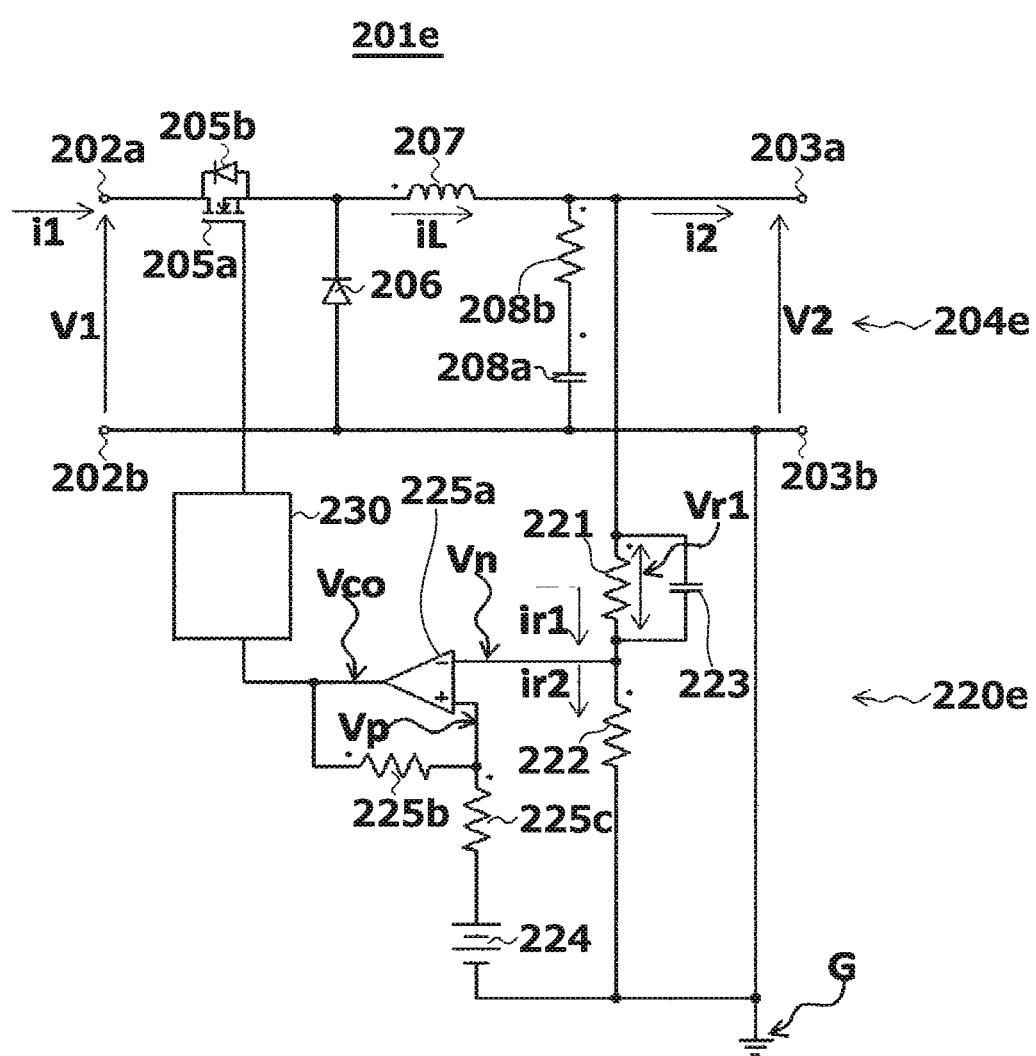
FIG. 28 is a circuit diagram illustrating the configuration of the switching power supply according to the related art.

Next, an effect of suppressing the output voltage fluctuations by the capacitive element 223, which is connected to the third resistor 221, is described using a waveform of the output voltage V2. FIG. 28 is a circuit diagram illustrating the configuration of the switching power supply 201e according to the related art. Compared to the circuit according to the seventh embodiment of the present invention, neither the switch element 226 nor the OFF period detection circuit 250 are included in FIG. 28. In FIG. 28, the capacitive element 223 is connected in parallel with the third resistor 221, while the OFF period detection circuit 250 is not connected, so that, a case in which the switching frequency is high and the OFF period detection circuit 250 is not operating in FIG. 20 is equivalent to FIG. 28. FIG. 21 is a timing waveform diagram illustrating a relationship between the capacitive element 223 and the output voltage. The waveform of the output voltage V2, which is schematically shown in FIG. 21, is a waveform which is extended in the Y-axis direction except for the DC component of the output voltage V2. The X axis shows time, while the Y axis shows a voltage ripple of the output voltage. Moreover, a voltage ripple of the output voltage V2 and static load fluctuations are shown in FIG. 21, for cases of (a) in which the capacitive element 223 is further removed from FIG. 28; (b) in FIG. 28 in which only the capacitive element 223 is connected; and (c) in FIG. 20 in which the circuit according to the present embodiment is connected. Moreover, in FIG. 21, each of (a), (b), and (c) shows cases in which the load is a rated load and in which the load is a light load.

In a case without the capacitive element 223 that is shown in (a) in FIG. 21, the voltage ripple of the output voltage V2 is increased up to the product of a voltage-dividing ratio (R1+R2)/R2 and the difference VpH−VpL in voltage between the first voltage and the second voltage. There are no changes in the voltage ripple regardless of whether the load connected to the output terminal 203 is a rated load or a light load, and, for the light load, the switching frequency is lower and the stop period is longer.

In a case shown in (b) in FIG. 21 in which only the capacitive element 223 is connected, the voltage ripple of the output voltage V2 may be decreased to around the difference VpH−VpL between the first voltage and the second voltage. Regardless of whether the load connected to the output terminal 203 is the rated load or the light load, the voltage ripple may be decreased to around the same level. However, the average value of the output voltage V2 differs between the rated load and the light load, so that there are large static load fluctuations.

In a case shown in (c) in FIG. 21 in which the circuit according to the present embodiment is connected, the static load fluctuations, which represent a difference between the light load and the rated load of the average value of the output voltage V2, in addition to the voltage ripple of the output voltage V2 also may be suppressed. Therefore, the output voltage fluctuations may be suppressed.

Next, the reason that the voltage ripple of the output voltage V2 is brought to the product of the voltage-dividing ratio (R1+R2)/R2 and the difference VpH−VpL between the first voltage and the second voltage when the capacitive element 223 is not connected is described. The output voltage V2 is voltage-divided between the third resistor 221 and the fourth resistor 222, so that the voltage Vn, which is input to the inverting input terminal of the comparator 225a, is voltage-divided to the product of R2/(R1+R2) and the output voltage V2. In this way, the voltage ripple of Vn is also attenuated to the product of R2/(R1+R2) and the voltage ripple of the output voltage V2. The control circuit 220a controls the drive period and the stop period such that Vn is brought to a value between VpL and VpH to control the output voltage V2 to a predetermined target voltage. Therefore, the voltage ripple of Vn is brought to be equal to the difference VpH−VpL of the first voltage and the second voltage to cause the voltage ripple of the output voltage V2 to increase up to the product of (R1+R2)/R2 and the voltage ripple of Vn, so that the magnitude of the voltage ripple of the output voltage V2 is brought to be (VpH−VpL)(R1+R2)/R2.

Next, the reason is described that the capacitive element 223 may be connected to decrease the voltage ripple of the output voltage V2 from the product of (R1+R2)/R2 and the difference VpH−VpL of the first voltage and the second voltage to around the difference VpH−VpL of the first voltage and the second voltage. The capacitive element 223 is connected to the third resistor 221 to cause the voltage Vr1 of the third resistor 221 to be stabilized to almost a value. In this way, the voltage Vn of the inverting input terminal of the comparator 225a is brought to a value in which a Vr1 is subtracted from the output voltage V2 to cause the voltage ripple of Vn to be equal to the voltage ripple of the output voltage V2. The control circuit controls the drive period and the stop period such that Vn is brought to be a value between VpL and VpH to control the output voltage V2 to a predetermined target voltage. Therefore, the voltage ripple of Vn is brought to be equal to the difference VpH−VpL between the first voltage and the second voltage to also bring the magnitude of the voltage ripple of the output voltage V2 to VpH−VpL.

As V2=Vn+Vr1, the output voltage V2 is controlled to a value between VpH+Vr1 and VpL+Vr1.

However, the voltage ripple of the output voltage V2 is brought to a little larger than (VpH−VpL)(R1+R2)/R2 in the case without the capacitive element 223 as shown in (a) in FIG. 21, and is brought to be a little larger than VpH−VpL in the case of connecting the capacitive element 223 as shown in (b) and (c) in FIG. 21. The reason is due to the fact that the output voltage V2 reaches the maximum, before it starts to drop, later than the completion of the drive period of the switching transistor 205a and the output voltage V2 reaches the minimum, before it starts to rise, later than the completion of the stop period of the switching transistor 205a. This is similar to the ripple waveform of the output voltage V2 of FIGS. 10A and 10B. In other words, the operating waveform when the coil current iL of the switching power supply 201a is operating in the current continuous mode in which the coil current iL of the switching power supply 201a is continuously changed in the same as FIG. 10A, and, moreover, the operating waveform when the coil current iL of the switching power supply 201a is operating in the current non-continuous mode in which the coil current iL of the switching power supply 201a is non-continuously changed in the same as FIG. 10B, so that the similar explanations for the above-mentioned figures will be omitted.

The timing waveform diagram for explaining the operation when the capacitive element 223 of the switching power supply in FIG. 20 is connected is the same as FIGS. 11A and 11B, so that the similar explanations for the above-mentioned figures will be omitted.

Next, using FIGS. 12A and 12B, the reason for the fact that the average value of the output voltage V2 is lower than a case of the rated load in a case of a light load is described in a case in which the capacitance element 223 of the switching power supply is connected in (b) in FIG. 21.

FIG. 12A is a timing waveform diagram for a case of connecting only the capacitive element 223 in which the switching frequency decreases in the light load, while FIG. 12B is a timing waveform diagram for a case in which the load is heavy and the switching frequency does not decrease. In FIGS. 12A and 12B, Vco is an output of the comparator 225a; V2 is an output voltage; Vr1 is a voltage of the voltage-dividing resistor 221; Vn is an inverting input terminal voltage of the comparator 225a; Vn_AVG is the average value of Vn; ir1 is a current of the voltage-dividing resistor 221; and ir2 is a current of the voltage-dividing resistor 222.

FIG. 12A shows the state of the control circuit 220a when operated with the light load and the current non-continuous mode. The comparator 225a has a short period of a high output level and a long period of a low output level, causing the waveform of the output voltage V2 to have a short period in which the voltage increases and to have a long period in which the voltage decreases with a triangular wave in which the voltage linearly decreases.

Figure 22:
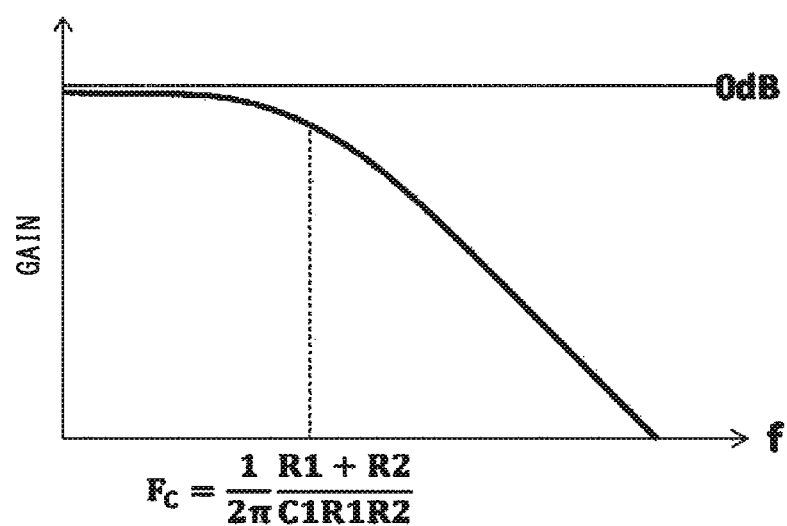
FIG. 22 is an explanatory diagram illustrating a transmission function of a low-pass filter which is configured with a voltage-dividing resistance and the capacitive element of the switching power supply in FIG. 20.

FIG. 22 shows the relationship between the frequency and the gain of a low-pass filter which has V2 as an input and Vr1 as an output with voltage-dividing resistors 221 and 222, and the capacitive element 223. The transmission function of the low-pass filter is to take the above-shown Equation (2).

Explanations for Equations (2) to (7) according to the third embodiment is omitted since they are similar in FIG. 22. The switching frequency not decreasing because of the heavy load causes the waveform in FIG. 12B to be generated. Moreover, explanations for Equations (9)-(10) according to the third embodiment that are similar in FIG. 22 will be omitted.

The difference ΔV2L of the average value of V2 in FIG. 12A and the average value of V2 in FIG. 12B is a static load fluctuation for a case of connecting only the capacitive element 223, which is the difference between the average value of V2 for the case in which the switching frequency decreases for the light load in FIG. 12A and the average value of V2 for the case in which the switching frequency does not decrease for the heavy load in FIG. 12B from Equations (3), (7), and (10), the difference ΔV2L of the average value of V2 is to take the above-shown Equation (11).

Explanations for Equation (12) according to the third embodiment will be omitted as they are the same in FIG. 22.

Figure 23:
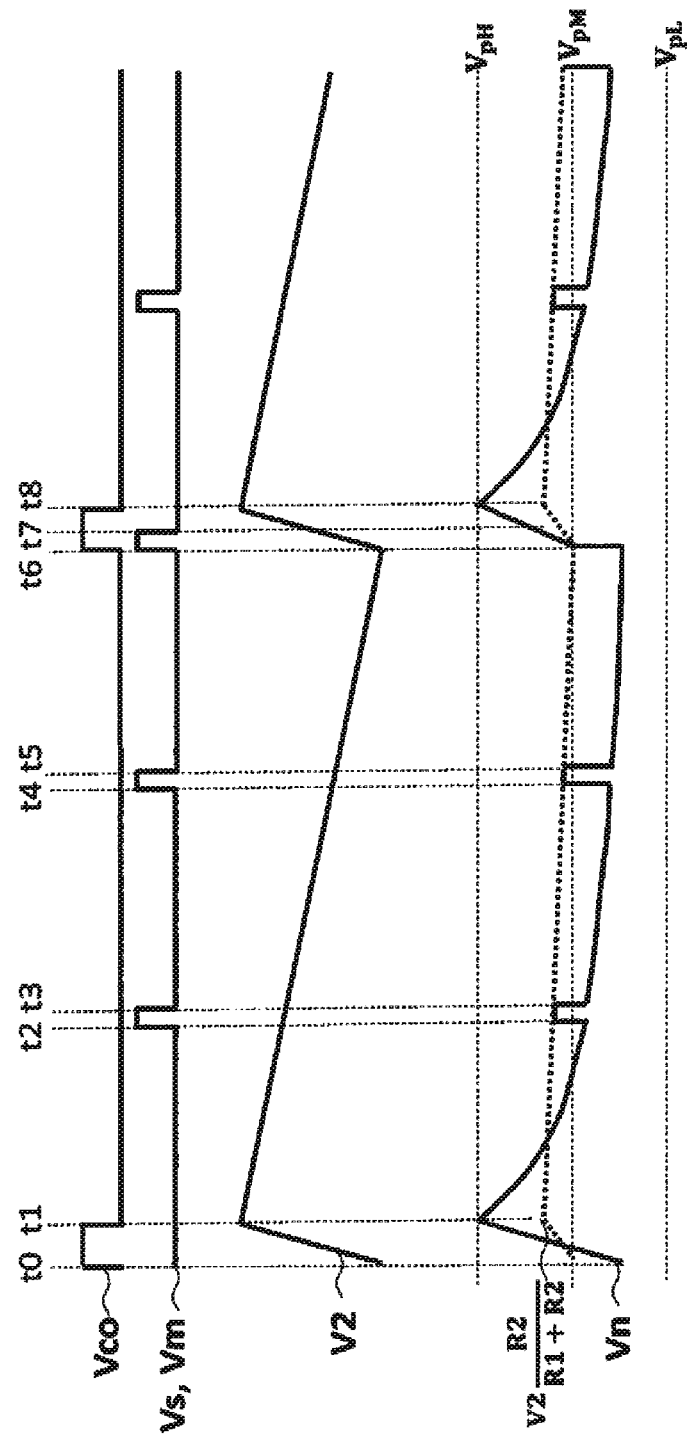
FIG. 23 is a timing waveform diagram for explaining an operation of an OFF period detection circuit 250 of the switching power supply in FIG. 20.

Next, using FIG. 23, the fact is explained that the circuit according to the present embodiment may be connected to suppress the static load fluctuation ΔV2L of the output voltage as shown in (c) in FIG. 21.

When the output Vco of the comparator 225a is brought to a first high level in the period from t0 to t1, the output voltage V2 increases to cause the inverting input terminal voltage Vn of the comparator 225a to also increase. When the Vn reaches the first reference voltage VpH, the Vco is brought to a second low level, while, when the switching frequency decreases in the non-continuous mode, a current iL which is supplied from the choke coil 207 to the output capacitor 208a is brought to 0, and the load current i2 causes the output voltage V2 to decrease linearly. When the switching frequency decreases with the light load, a period from t1 in which the comparator output Vco takes a low level continues for a long time.

The OFF period detection circuit 250 detects that the period in which the Vco is at the low level continues for a period from t1. This period is set to be around 10 times to 100 times the switching period for the rated load. For example, it is set to be 100 ms when the switching period for the rated load is 10 ms. The inverting input terminal voltage Vn of the comparator 225a first decreases rapidly in the period of t1-t2 and gradually decreases thereafter. Upon detecting that the low level of Vco continues for the period in t1-t2, the OFF period detection circuit 250 opens the switch element 226 with the output signal Vs of the OFF period detection circuit 250 and, at the same time, changes the reference voltage to a third intermediate voltage VpM with the output signal Vm of the OFF period detection circuit 250. The switch element 226 is opened to cause the capacitive element 223 to be separated to cause Vn to be changed to a voltage V2×(R2/(R1+R2)) in which V2 is voltage-divided by the third resistor and the fourth resistor. When the changed Vn is higher than the reference voltage VpM, the low level continues for Vco. These output signals Vs and Vm continue for a period of t2-t3, which is sufficiently shorter than the above-described period of t1-t2, and then Vs and Vm return at t3 to close the switch element 226 again to cause the reference voltage to return to VpL.

In the period of t3-t4, in the same manner as t1-t2, the OFF period detection circuit 250 detects that the low level of Vco continues for a period, after which, in the period of t4-t5, Vs and Vm open the switch element 226 to cause Vn to be changed to V2×(R2/(R1+R2)) and the reference voltage to be changed to VpM. Vn is still higher than VpM, so that the low level of Vco is continued. Thereafter, the OFF period detection circuit 250 detects a period of t5-t6 to open the switch element 226 with Vs and Vm at t6 to cause Vn to be changed to V2×(R2/(R1+R2)) and the reference voltage to be changed to VpM. Since the Vn decreases below VpM, the output Vco of the comparator 225a is brought to a high level from t6. The period in which the Vco is at the high level continues until t8 at which Vn rises up to VpH. At t7, which is prior thereto, the Vs and Vm returns to close the switch element 226 and bring the reference voltage to VpH.

Looking at the inverting input terminal voltage Vn of the comparator 225a immediately before t6, it is brought to be a voltage which is higher than the reference voltage VpL, so it is seen that the Vco cannot transition to the high level at t6 unless the OFF period detection circuit 250 operates. Vn gradually decreases if the OFF period detection circuit 250 does not operate, causing the time taken for Vn to be brought to a voltage which is lower than VpL to be long, and the period in which Vco is at the low level to further continue for a long time. If the OFF period detection circuit 250 operates, VpM is set as in Equation (23) below to cause Vco to transition to a low level with Equation (24) for the lower limit of the output voltage V2, causing the V2 to start to increase.

$$V_{pM} = \frac{V_{pH} + V_{pL}}{2} - \frac{V_{pH} - V_{pL}}{2} \frac{R2}{R1+R2} \quad (23)$$

$$V_2 = V_{pM} \frac{R1+R2}{R2} = \frac{V_{pH} + V_{pL}}{2} \frac{R1+R2}{R2} - \frac{V_{pH} - V_{pL}}{2} \quad (24)$$

For the case of the heavy load such as in FIG. 12B, the lower limit of the output voltage V2 in Equation (24) is brought to a value which is lower than Equation (8) for the average value of V2 for the case in which neither the switching frequency nor the output voltage V2 decreases. The Vco transitions to the high level at the lower limit of V2 to cause the voltage to increase by around VpH−VpL from the value in Equation (24), making it possible to make the average value of V2 in FIG. 12B and the average value of V2 when the switching frequency decreases for the light load almost the same. Thus, the circuit according to the present embodiment may be connected to suppress the static load fluctuation Δ V2L of the output voltage.

As described above, the control circuit according to the seventh embodiment of the present invention includes third and fourth resistors 221 and 222 that voltage-divide the output voltage of the switching power supply 201a; a comparator 225a in which the voltage-divided voltage is input to a first input terminal thereof and a reference voltage Vp is input to a second input terminal thereof; and a controller 230 which controls a switching transistor 205a based on an output signal of the comparator 225a, wherein the reference voltage Vp is brought to a first voltage VpH when the output of the comparator 225a takes a first level (high level) and is brought to a second voltage VpL when the output of the comparator 25a takes a second level (low level), the third resistor 221 is connected between the output terminal positive terminal 203a of the switching power supply 201a and the first input terminal of the comparator 225a; a serial connection is made of a capacitive element 223 and a switch element 226 in parallel with the third resistor 221; and an OFF period detection circuit 250 which detects that the low level of the output of the comparator 225a continues longer than a period, wherein, when the low level of the output of the comparator 225a continues longer than the period, the OFF period detection circuit 250 opens the switch element 226 and, at the same time, causes the reference voltage to be brought to a third voltage VpM.

This may cause the load current to decrease to suppress the static load fluctuation of the output voltage when the switching frequency decreases.

Eighth Embodiment

Figure 24:
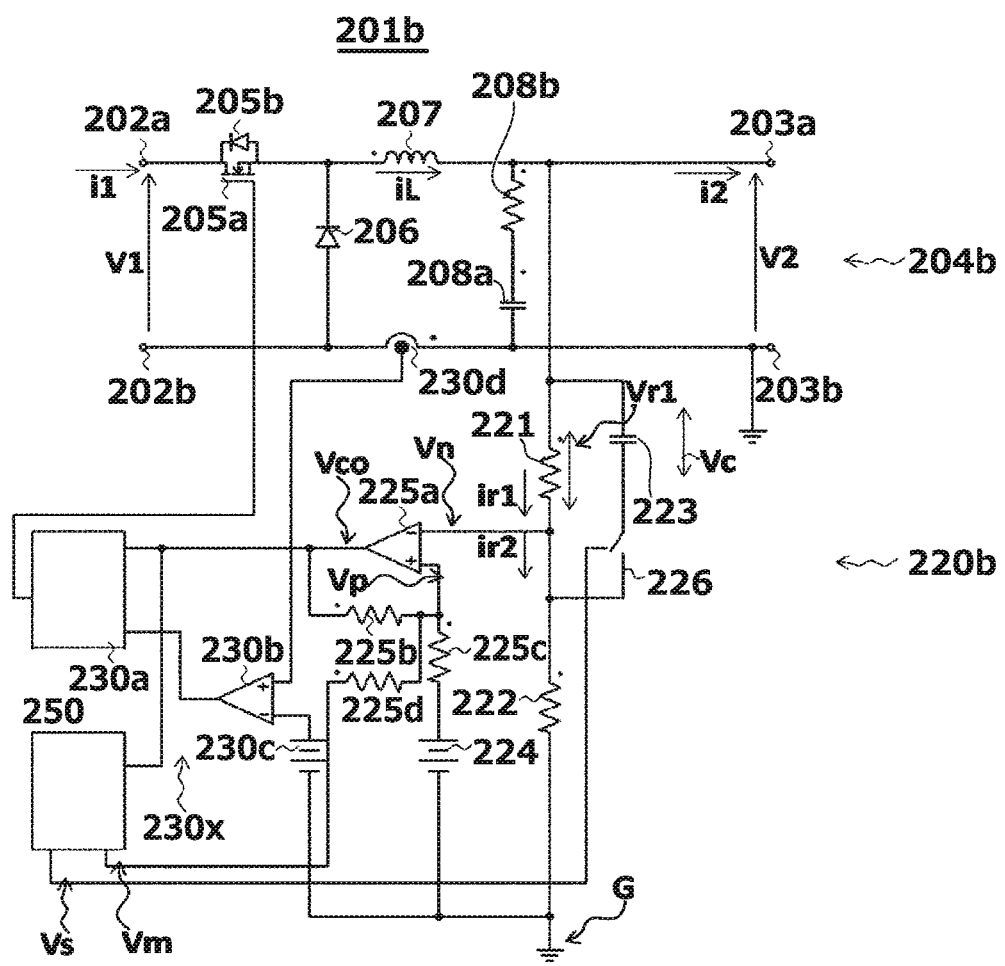
FIG. 24 is a circuit diagram illustrating the configuration of the switching power supply according to an eighth embodiment of the present invention.

FIG. 24 is a circuit diagram illustrating the configuration of a switching power supply 201b according to an eighth embodiment of the present invention. As one example, the switching power supply 201b shown in FIG. 24 includes a pair of input terminals 202a and 202b (also called "an input terminal 202" when not specifically distinguishing therebetween); a pair of output terminals 203a and 203b (also called "an output terminal 203" when not specifically distinguishing between); a main circuit 204b; and a control circuit 220b, and converts an input voltage (DC voltage) V1 input to the input terminal 202 to an output voltage (DC voltage) V2 to output the converted result from the output terminal 203 and controls the output voltage V2 to be at a predetermined target voltage. The switching power supply 201b inputs an input voltage V1 and an input current i1 to the input terminal 2 to output the output voltage V2 and a load current i2 from the output terminal 203.

In the same manner as the main circuit 204a of the first embodiment, the main circuit 204b is configured with a back-converter circuit scheme as one example of the switching power supply 201b and outputs an input voltage V1 input from the input terminal 202 to the output voltage V2 to output the converted result to the output terminal 203.

The control circuit 220b includes a third resistor 221 and a fourth resistor 222 that voltage-divides the output voltage V2 of the switching power supply 201b; a comparator 225a in which a voltage-divided voltage Vn is input to a first inverting input terminal thereof and a reference voltage Vp is input to a second non-inverting input terminal thereof; a controller 230x which controls a switching transistor 205a based on an output signal Vco of the comparator 225a; the third resistor 221, which is connected between a positive terminal 203a of an output terminal and a first inverting input terminal of the comparator 225a; and a series connection of a switch element 226 and a capacitive element 223 that are connected in parallel with this fourth resistor. The reference voltage Vp is brought to be a first high voltage VpH when an output Vco of the comparator 225a takes a first high level and to be a second low voltage VpL when an output Vco of the comparator 225a takes a second low level. Moreover, the control circuit 220b includes an OFF period detection circuit 250 which detects that the second level of the output Vco of the comparator 225a continues longer than a period, wherein, when the second level of the output of the comparator 225a continues longer than the period, it opens the switch element 226 with an output signal Vs and, at the same time, brings the reference voltage Vp to be a third intermediate voltage VpM with an output signal Vm. A common ground G of the control circuit 220b is connected to a negative terminal 203b of the output terminal. A voltage of each of signal voltages Vn, Vp, and Vco is set to be a voltage with the common ground G as the reference.

Moreover, in the same manner as the fifth embodiment, a so-called hysteresis comparator is provided in which a reference voltage Vp is brought to be a first high voltage VpH when an output Vco of the comparator 225a takes a first high level and to be a second low voltage VpL when an output Vco of the comparator 225a takes a second low level. As an example of this hysteresis comparator circuit scheme, in the same manner as the fifth embodiment, the switching power supply 201b includes the comparator 225a; a resistor 225b which connects between a non-inverting input terminal and an output terminal of the comparator 225a; and a resistor 225c and a constant voltage source 224 that are connected in series between the non-inverting input terminal and the common ground G203b; and a resistor 225d which connects between the non-inverting input terminal of the comparator 225a and the OFF period detection circuit 250.

The controller 230x includes a current detection element 230d which detects a current iL which flows through a choke coil; a reference voltage 230c; a comparator 230b which compares an output of the current detection element 230d and the reference voltage 230c; and a drive device 230a which drives the switching transistor 205a based on an output Vco of the comparator 225a and an output of the comparator 230b.

The drive device 230a turns on the switching transistor 205a when the output Vco of the comparator 225a takes a first high level and the output of the comparator 230b takes a low level. The output of the comparator 230b is brought to the high level when turning on the switching transistor 205a causes the current iL which flows through the choke coil 207 to be brought to at least a value. At this time, when the output Vco of the comparator 225a continues at the first high level, the switching transistor 205a is turned off for a period. Turning off the switching transistor 205a causes the current iL which flows though the choke coil 207 to be lower than the value. When the output Vco of the comparator 225a continues to be at the first high level even thereafter, the switching transistor 205a is turned on until the current iL which flows through the choke coil 207 reaches at least the value again. When the output Vco of the comparator 225a is at the second low level, the switching transistor 205a is turned off regardless of the output of the comparator 230b.

This causes switching to be performed a plurality of times during the period in which the output Vco of the comparator 225a is at the first high level.

Next, an operation of the control circuit 220b is described. When the voltage Vn in which the output voltage V2 is resistance-divided decreases below the second voltage VpL, the comparator output Vco is brought to a first high level to cause the controller 230x to start driving the switching transistor 205a, so that the reference voltage is brought to be the first voltage VpH. During the drive period of the switching transistor 205, the current of the choke coil 207 increases to cause a current iL which is larger than a load current i2 to be supplied from the choke coil 207 to the output capacitor 208a, causing the output capacitor 208a to be charged to raise the output voltage V2. The current iL which flows through the choke coil 207 being brought to be at least a value which is larger than the load current turns off the switching transistor 205a for a period. Turning off the switching transistor 205a causes the current iL which flows through the choke coil 207 to be lower than a value. When the output Vco of the comparator 225a continues at the first high level even thereafter, the switching transistor 205a is turned on until the current iL which flows through the choke coil 207 reaches at least a value again. This causes switching to be performed a plurality of times during a period in which the output Vco of the comparator 225a continues at the first high level. In the controller 230x, when the voltage Vn in which the output voltage V2 is resistance-divided is brought to be higher than the first voltage VpH, the comparator output Vco is brought to a second low level to cause the drive period to be completed and to be transitioned to a stop period. At this time, the reference voltage is brought to the second voltage VpL. In the stop period, the current iL from the choke coil 207 is brought to 0 to cause discharging from the output capacitor 208a by the load current i2 to cause the output voltage V2 to decrease. When the voltage Vn in which the output voltage V2 is resistance-divided is again brought to be lower than the second voltage VpL, the drive period is started again to bring the reference voltage to the first voltage VpH to switch the switching transistor 205a a plurality of times. Such an operation is repeated to cause the drive period and the stop period to be controlled such that the resistance-divided voltage Vn is brought to be a value between the first voltage VpH and the second voltage VpL to cause the output voltage V2 to be controlled to the predetermined target voltage.

Here, the switching element 226 is closed when the switching frequency is high, and a period in which the output Vco of the comparator 225a is at the second low level. This causes the capacitive element 223 to be connected to the third resistor 221 to cause the output voltage ripple to be suppressed. When the switching frequency decreases and a period in which the output Vco of the comparator 225a is at the second low level, the switch element 226 and the reference voltage is brought to the third voltage VpM. In the same manner as the seventh embodiment, this makes it possible to suppress the static load fluctuation of the output voltage.

According to the eighth embodiment of the present invention, explanations for the ripple waveform of the output voltage V2 of the switching power supply device 201b is similar to those for FIGS. 15A and 15B and the associated explanations according to the above-described fourth embodiment of the present invention, so that they will be omitted here.

As described above, for the control circuit of the eighth embodiment of the present invention, it is desirable to switch the switching transistor 205a a plurality of times in a period in which the output Vco of the comparator 225a is at the first level (high level). In this way, as the on/off period of the switching transistor 205a is sufficiently shorter than the on/off period of the output Vco of the comparator 225a, the output Vco of the comparator 225a being brought to the first level (high level) causes the output voltage V2 to increase immediately, while the output Vco of the comparator 225a being brought to the second level (low level) causes the output voltage V2 to decrease, making it possible to suppress the output voltage ripple to around the difference between the first voltage and the second voltage.

Moreover, for the control circuit according to the eighth embodiment of the present invention, it is desirable to turn off the switching transistor 205a for a period when the current which flows through the switching power supply 201b is brought to at least a value. This causes the current which flows through the switching power supply 201b to be brought to at least a value in the period in which the output Vco of the comparator 225a is at the first level (high level) to cause repeating of the switching transistor 205a being turned off for a period, making it possible to cause performing of switching a plurality of times during a period in which the output Vco of the comparator 225a is at the first level. This makes it possible to cause the output capacitor 208a of the switching power supply 201b to be charged with a current which is larger than the load current in the period in which the output Vco of the comparator 225a is at the first level, so that the output voltage V2 linearly increases at the same time as the beginning of the period in which the output voltage V2 is at the first level. The output capacitor 208a of the switching power supply 201b is discharged with only the load current in the period in which the output Vco of the comparator 225a is at the second level (low level), so that the output voltage V2 linearly decreases at the same time as the beginning of the period at the second level. This makes it possible to suppress the output voltage ripple to around the difference between the first voltage and the second voltage.

For the current which flows through the switching power supply, various detection methods are possible depending on the configuration of the switching power supply. For example, the switching power supply 201b shown in the eighth embodiment of the present invention may detect the current of the switching transistor 205a or the choke coil 207. Moreover, an insulation-type switching power supply may detect the coil current of the transformer, while the current of a resonant capacitor may be detected when the resonant capacitor is present.

Ninth Embodiment

Figure 25:
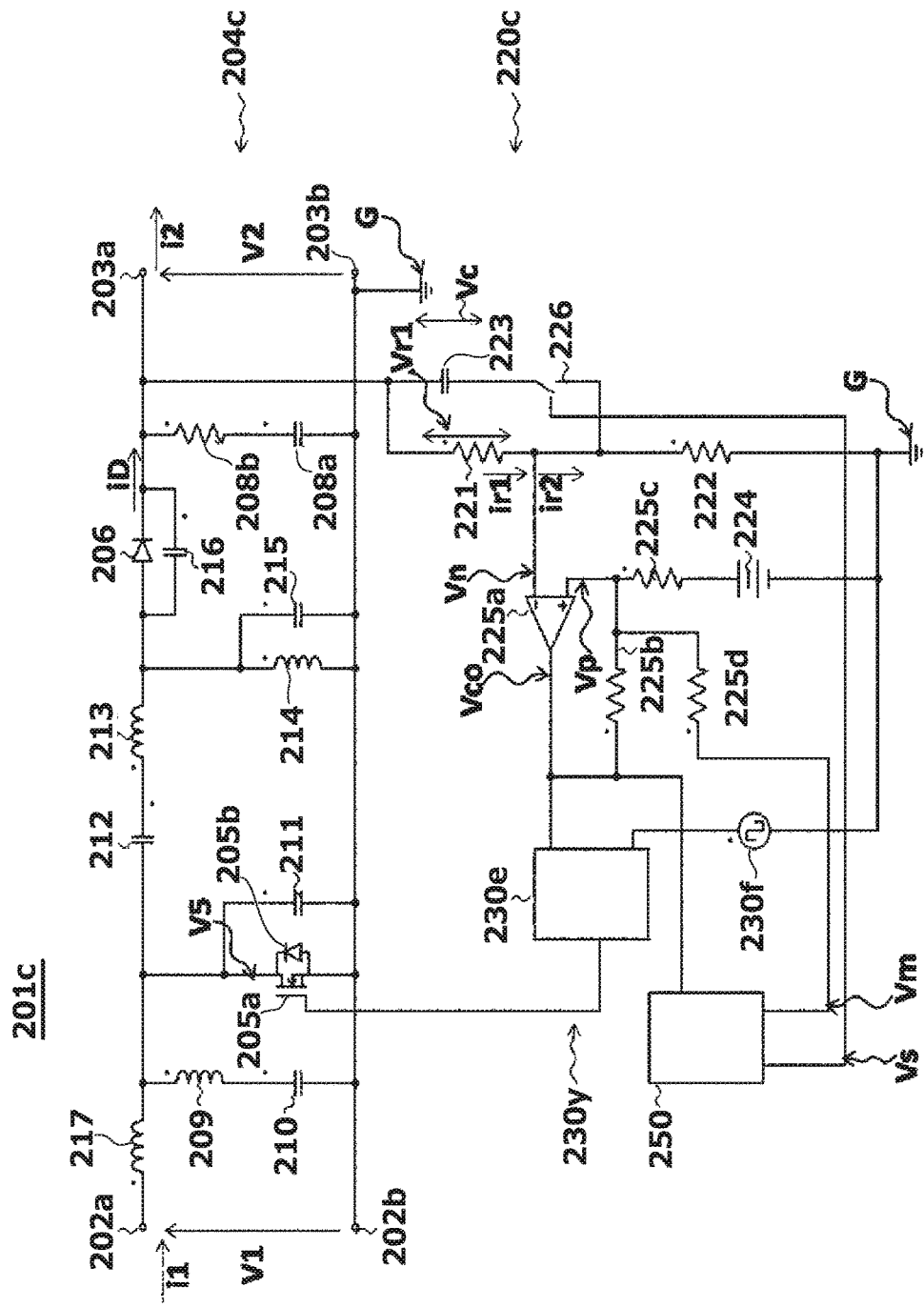
FIG. 25 is a circuit diagram illustrating the configuration of the switching power supply according to a ninth embodiment of the present invention.

FIG. 25 is a circuit diagram illustrating a configuration of a switching power supply 201c according to a ninth embodiment of the present invention. As one example, the switching power supply 201c shown in FIG. 25 includes a pair of input terminals 202a and 202b (also called "an input terminal 202" when not specifically distinguishing therebetween); a pair of output terminals 203a and 203b (also called "an output terminal 203" when not specifically distinguishing between); a main circuit 204c; and a control circuit 220cc, and converts an input voltage (DC voltage) V1 input to the input terminal 202 to an output voltage (DC voltage) V2 to output the converted result from the output terminal 203 and controls the output voltage V2 to be at a predetermined target voltage. The switching power supply 201c inputs an input voltage V1 and an input current i1 to the input terminal 202 to output the output voltage V2 and a load current i2 from the output terminal 203.

The main circuit 204c includes a switching transistor 205a, a parasite diode 205b of the switching transistor 205a, a diode 206, resonant inductors 209, 213, 214, and 217, resonant capacitors 210, 211, 212, 215, and 216, an output capacitor 208a, and an equivalent series resistor 208b of the output capacitor 208a. The switching power supply 201c, which is configured with a resonant converter circuit scheme as one example of the switching power supply, outputs an input voltage V1 input from the input terminal 202 to the output voltage V2 to output the converted result to the output terminal 203.

The control circuit 220cc includes a third resistor 221 and a fourth resistor 222 that voltage-divides the output voltage V2 of the switching power supply 201c; a comparator 225a in which a voltage-divided voltage Vn is input to a first inverting input terminal thereof and a reference voltage Vp is input to a second non-inverting input terminal thereof; a controller 230y which controls a switching transistor 205a based on an output signal Vco of the comparator 225a; the third resistor 221, which is connected between a positive terminal 203a of an output terminal and a first inverting input terminal of the comparator 225a; and a series connection of the capacitive element 223 and a switch element 226 that are connected in parallel with the third resistor 221.

A reference voltage Vp is brought to be a first high voltage VpH when an output Vco of the comparator 225a takes a first high level and is brought to be a second low voltage VpL when an output Vco of the comparator 225a takes a second low level. Moreover, the control circuit 220c includes an OFF period detection circuit 250 which detects that the second level of the output Vco of the comparator 225a continues longer than a period, wherein, when the second level of the output Vco of the comparator 225a continues longer than the period, the OFF period detection circuit 250 opens the switch element 226 with the output signal Vs and, at the same time, brings the reference voltage Vp to a third intermediate voltage VpM with the output signal Vm. A common ground G of the control circuit 220c is connected to a negative terminal 203b of the output terminal. A voltage of each of signal voltages Vn, Vp, and Vco is set to be a voltage with the common ground G as the reference.

Moreover, a so-called hysteresis comparator is provided in the same manner as the fifth embodiment in which a reference voltage Vp is brought to be a first high voltage VpH when an output Vco of the comparator 225a takes a first high level and is brought to be a second low voltage VpL when an output Vco of the comparator 225a takes a second low level. An exemplary hysteresis comparator circuit scheme, in the same manner as the fifth embodiment, is configured with a hysteresis comparator circuit scheme includes the comparator 225a; a resistor 225b which connects between a non-inverting input terminal and an output terminal of the comparator 225a; a resistor 225c and a constant voltage source 224 that connects in series between the non-inverting input terminal and the common ground G; and a resistor 225d which is connected between the non-inverting input terminal of the comparator 225a and the OFF period detection circuit 250.

The controller 230y is configured with an oscillator 230f which oscillates at a frequency, and a drive device 230e which drives the switching transistor 205a based on the output Vco of the comparator 225a and the output of the oscillator 230f.

When the output Vco of the comparator 225a is brought to the first high level, the drive device 230e turns on and off the switching transistor 205a based on an output of the oscillator 230f which oscillates at the frequency. The inter-terminal voltage V5 of the switching transistor 205a increases from 0V by turning off of the switching transistor 205a. The resonant capacitor 211 may be charged to cause the inter-terminal voltage V5 to start increasing only after the switching transistor 205a to be turned off completely to decrease the switching loss at the time of turning off the switching transistor 205a. Thereafter, by resonating of the resonant inductors 209, 213, 214, 217, and the resonant capacitors 210, 211, 212, 215, and 216, when the switching transistor 205a is turned off for a period the inter-terminal voltage V5 again returns to 0V and a body diode 205b of the switching transistor 205a is turned on. Then, the switching transistor 205a may be turned on to cause a so-called ZVS (zero voltage switching) to be performed, making it possible to decrease a switching loss at the time of turning on the switching transistor 205a. When the output Vco of the comparator 225a continues at the first high level, a process is repeated such that the switching transistor 205a is turned off after being turned on during a period, making it possible to causing switching to be performed a plurality of times in the period in which the output Vco of the comparator 225a is at the first high level.

Next, an operation of the control circuit 220cc is described. When the voltage Vn in which the output voltage V2 is resistance-divided is brought to be lower than the second voltage VpL, the output Vco of the comparator 225a is brought to the first high level, and the controller 230y starts driving of the switching transistor 205a, and the reference voltage Vp is brought to the first voltage VpH. The switching transistor 205a being turned on and off by the controller 230y causes a current iD having a semi-sinusoidal wave with a peak value to flow from the diode 206. The time average of iD being larger than the load current i2 causes the output capacitor 208a to be charged to cause the output voltage V2 to increase. In the controller 230y, when the voltage Vn in which the output voltage V2 is resistance-divided is brought to be higher than the first voltage VpH, the comparator output Vco is brought to be at the second low level to cause the drive period to be completed to be transitioned to a stop period. Then, the reference voltage Vp is brought to the second voltage VpL. In the stop period, the current iD from the diode 206 is brought to 0, causing discharging from the output capacitor 208a by the load current i2 to cause the output voltage V2 to decrease. When the voltage Vn in which the output voltage V2 is resistance-divided is brought to be lower than the second voltage VpL again, the drive period is started again to bring the reference voltage Vp to the first voltage VpH to switch the switching transistor 205a a plurality of times. Repeating this operation causes the drive period and the stop period to be controlled such that the resistance-divided voltage Vn is brought to a value between the first voltage VpH and the second voltage VpL to cause the output voltage V2 to be controlled to a predetermined target voltage.

When the switching frequency is high and the period in which the output Vco of the comparator 225a is at the second low level is short, the switch element 226 is closed. In this way, the capacitive element 223 is connected to the third resistor 221 to cause the output voltage ripple to be suppressed. The switching frequency decreasing and the period in which the output Vco of the comparator 225a is at the second low level increasing opens the switching element 226 and the reference voltage to be brought to a third voltage VpM. This makes it possible to suppress the static load fluctuation of the output voltage in the same manner as the seventh embodiment.

With reference to FIGS. 17A and 17B, a ripple waveform of the output voltage V2 of the switching power supply 1c according to the ninth embodiment is described. The waveform of the load current i2 for a heavy load when the load current i2 is large is shown in FIG. 17A and the waveform of the load current i2 for a light load when the load current i2 is small is shown in FIG. 17B, along with the waveforms of the current iD of the diode 206, the output Vco of the comparator 225a, and the output voltage V2. The capacitive element 223 may be connected to decrease the voltage ripple of the output voltage V2 from the product of the voltage-dividing ratio of (R1+R2)/R2 and the difference VpH−VpL of the first voltage and the second voltage to around the difference VpH−VpL of the first voltage and the second voltage.

This is because the capacitive element 223 is connected to the third resistor 221 to stabilize the voltage Vr1 of the third resistor 221 to almost a constant value. In this way, the voltage Vn of the inverting input terminal of the comparator 225a is brought to a value in which a Vr1 is subtracted from the output voltage V2 to cause the voltage ripple of Vn to be equal to the voltage ripple of the output voltage V2. The control circuit 220c controls the drive period and the stop period such that Vn is brought to be a value between VpL and VpH to control the output voltage V2 to a predetermined target voltage. Therefore, the voltage ripple of Vn is brought to be equal to the difference VpH−VpL between the first voltage and the second voltage to also bring the magnitude of the voltage ripple of the output voltage V2 to VpH−VpL. As V2=Vn+Vr1, the output voltage V2 is controlled to a value between VpH+Vr1 and VpL+Vr1.

When the output Vco of the comparator 225a is brought to a first high level in t0, the switching transistor 205a is turned on and off by the controller 230y to cause the current iD having a semi-sinusoidal wave with a peak value to flow through the diode 206. The time average of iD is constant and larger than the load current i2, causing the output capacitor 208a to undergo constant-current charging in the period of t0-t1 to cause the output voltage V2 to increase linearly. Moreover, during the period of t1-t2 in which the Vco is at the second low level, the current iD of the diode 206 is brought to 0. The output capacitor 208a undergoes constant current discharging only by the load current i2 to cause the output voltage V2 to decrease linearly.

The output voltage V2 according to the ninth embodiment is similar to the output voltage V2 in FIG. 17A and, in the same manner as the output voltage V2 according to the eighth embodiment in FIG. 24, is seldom brought to be larger than VpH+Vr1 or smaller than VpL+Vr1, so that the magnitude of the voltage ripple of the output voltage V2 is suppressed to a value which is closer to the hysteresis width of VpH−VpL. This is because, when the output Vco of the comparator 225a is brought to the first high level at t0, iD reaches a current value of a constant current which is larger than i2 in the time average value in a period which is sufficiently shorter than the length of the period t0-t1 in which Vco is at the first high level to cause the output capacitor 208a to undergo constant current charging with iL−i2 to cause V2 to increase linearly and, when the output Vco of the comparator 225a is brought to the second low level at t1, iD is brought to 0 in a period which is sufficiently shorter than the length of the period t1-t2 in which Vco is at the second low level to cause the output capacitor 208a to undergo constant current discharging with i2 to cause V2 to decrease linearly.

Moreover, in the same manner as the eighth embodiment, according to the ninth embodiment, for causing switching to be performed a plurality of times in the period in which the output Vco of the comparator 225a is at the first high level, charging and discharging of the output capacitor 208a cause the voltage of the output capacitor 208a at the time of completion at t1 of the period in which Vco is at the first high level to be brought to be the maximum value of the voltage of the output capacitor 208a. Moreover, the voltage of the output capacitor 208a at the time of completion at t2 of the period in which the output Vco of the comparator 225a is at the second low level is brought to be the minimum value of the voltage of the output capacitor 208a. Thus, even when the voltage ripple of the equivalent series resistance 208b is not present, the output voltage V2 may be controlled to be between VpH+Vr1 and VpL+Vr1, causing the hysteresis control to operate correctly. Therefore, a capacitor with a small equivalent series resistance, such as a ceramic capacitor, may be used for the output capacitor 208a. The capacitor with the small equivalent series resistance may be used to achieve advantageous effects in reducing the dynamic load fluctuation of the output voltage V2 of the switching power supply 201c and the high frequency noise. Moreover, according to the seventh embodiment, the switching frequency may be increased while suppressing the switching loss of the switching transistor 205a to decrease energy which accumulates in the resonant inductors 209, 213, 214, 217 and the resonant capacitors 210, 211, 212, 215, 216 that are used in the main circuit 204c of the resonant converter. The smaller the energy accumulated in these resonant inductors and capacitors, the greater the ability to cause the average value of the current iD of the diode 206 to follow a value which is close to the load current i2 when the load current i2 changes rapidly, making it possible to suppress the dynamic load fluctuation of the output voltage. This makes it possible to suppress the dynamic load fluctuation of the output voltage, the static load fluctuation, and the output voltage ripple to around the difference between the first voltage and the second voltage.

With reference to FIG. 17B, a voltage ripple of the output voltage V2 for the light load according to the ninth embodiment is described. For the light load, the period t4-t5 in which the output Vco of the comparator 225a is at the second low level increases to cause the switching frequency to be low. In the same manner as the seventh embodiment (see FIG. 10B) and the eighth embodiment (see FIG. 17B), V2 has a short rise period and, in the fall period thereof, causes the output capacitor 208a to undergo constant current discharging over a long time with a low load current i2, causing V2 to decrease linearly. FIG. 17B has the same waveforms as those in the seventh embodiment (see FIG. 10B) and the eighth embodiment, so that, in the same manner as what is described previously for the seventh and eighth embodiments, the average value of the inverting output terminal voltage Vn of the comparator 225a that is shown in FIG. 12A decreases from the center value to the same extent as the voltage ripple ΔVr1 of the inter-terminal voltage Vr1 of the third resistor 221. This results in the static load fluctuation ΔV2L of the product of (R1+R2)/R2 and ΔVr1, so that it is necessary to open the switch element 226 to cause the capacitive element 223 to be separated and the reference voltage to be brought to a third voltage VpM when the switching frequency decreases and the period in which the comparator output Vco is at the second low level increases. This makes it possible to suppress the static load fluctuation of the output voltage.

As described above, the control circuit 220c according to the ninth embodiment of the present invention is a resonant converter in which the main circuit 204c of the switching power supply 201c includes a resonant circuit. In this way, the switching frequency may be increased while suppressing the switching loss to decrease energy accumulated in the inductors 209, 213, 214, 217 and capacitors 210, 211, 212, 215, 216. Therefore, the dynamic load fluctuation of the output voltage V2, the static load fluctuation, and the output voltage ripple may be suppressed to around the difference between the first voltage and the second voltage.

Tenth Embodiment

Figure 26:
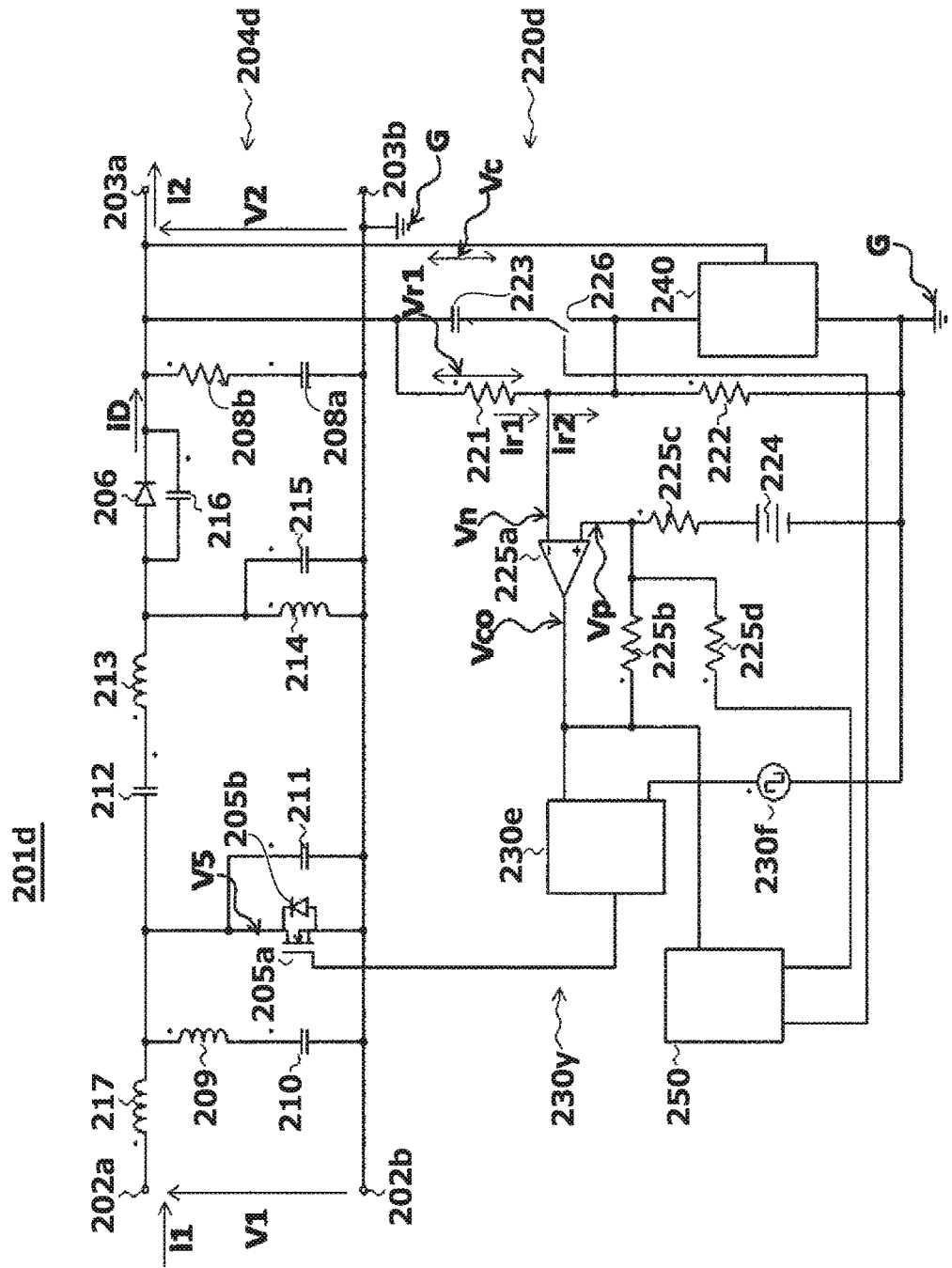
FIG. 26 is a circuit diagram illustrating the configuration of the switching power supply according to a tenth embodiment of the present invention.

A tenth embodiment according to the present invention is described for the configuration of a switching power supply device 201d with reference to the drawings. The switching power supply device 201d shown in FIG. 26 is an addition of a charging circuit 240 which charges the capacitive element 223 at the time of activation to the configuration of the ninth embodiment shown in FIG. 25. The same charging circuit 240 may be added also for the seventh and eighth embodiments. Describing the ninth embodiment as an example, the switch element 226 is closed at the time of activation, the capacitive element 223 is connected in parallel with the third resistor 221, and the inter-terminal voltage of the capacitive element 223 is 0V at the time of activation, so that the period at the time of activation of the switching power supply 201c shown in FIG. 25 continues for a long time in which the inter-terminal voltage Vr1 of the third resistor 221 is lower than the voltage of Vr1 that is stable after completion of the activation. As the output voltage V2 is controlled to have the same value as that of the reference voltage Vp, the inverting input terminal voltage Vn of the comparator 225a is controlled such that V2=Vp+Vr1, so that the period in which V2 is also lower than the predetermined target voltage continues for a long time. The predetermined target voltage for the output voltage V2 is Vp times (R1+R2)/R2, so that Vr1 then is Vp times R1/R2. For Vr1 to reach the voltage of Vp×R1/R2 from 0V at the time of activation, the capacitive element 223 is charged along a route which goes through the capacitive element 223, the switch element 226, the fourth resistor 222, and the common ground G from the positive terminal 203a of the output terminal. Taking into account the loss of the control circuit, resistance values R1 and R2 of the third resistor 221 and the fourth resistor 222 may not be set to a small value (for example, less than or equal to 1 kΩ). Therefore, the charge current of the capacitive element 223 being small and the static capacitance of the capacitive element 223 being large cause the period to reach the voltage Vp×R1/R2 from 0V at the time of activation to be longer.

The charging circuit 240 shown in FIG. 26 detects the output voltage V2 to short-circuit the common ground G and the inverting input terminal of the comparator 225a only in an activation period in which the output voltage V2 is also lower than the predetermined target voltage. Therefore, during the activation period, the capacitive element 223 is charged with a large charge current along a route which passes through the capacitive element 223 and the charging circuit 240 from the positive terminal 203a of the output terminal. In this way, the activation period for the output voltage V2 to reach the predetermined target voltage from 0V may be shortened when the capacitive element 223 is connected in parallel with the third resistor 221.

Figure 27A:
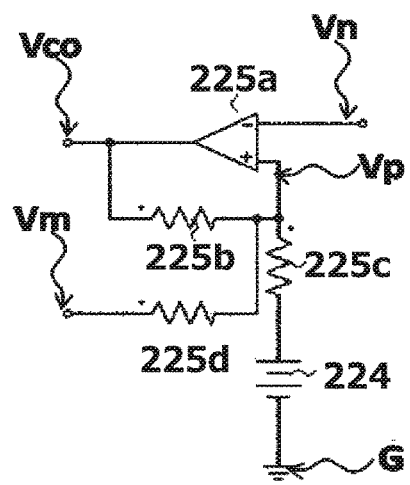
FIGS. 27A and 27B are circuit diagrams illustrating configurations of comparators and reference voltages according to embodiments of the present invention.
Figure 27B:
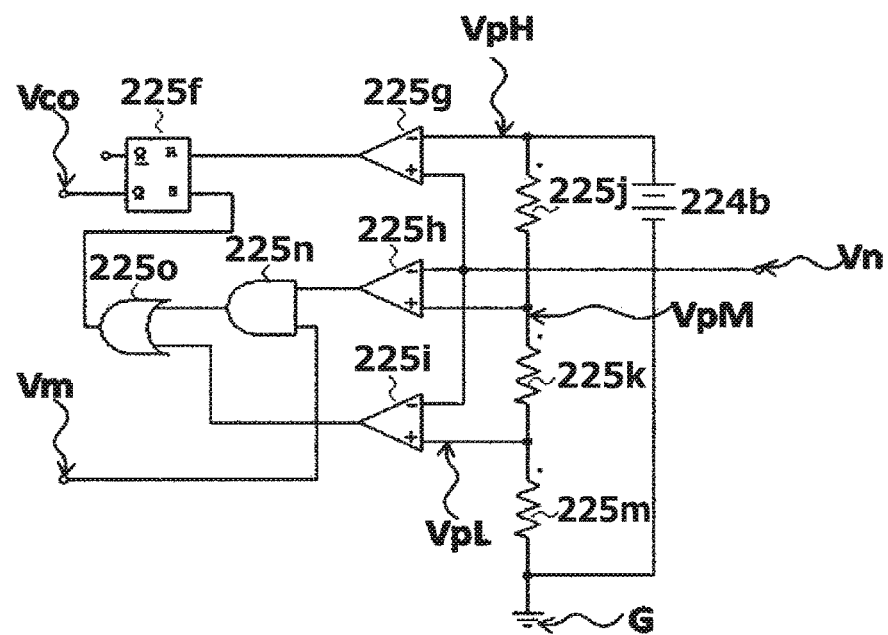

FIGS. 27A and 27B show embodiments of a so-called hysteresis comparator in which a reference voltage Vp is brought to a first high voltage VpH when an output VcoH of the comparator 225a takes a first high level VcoH and to a second low voltage VpL when the output Vco of the comparator 225a takes a second low voltage VcoL, and to a third intermediate voltage VpM with a signal Vm from the OFF period detection circuit when the second low level of the output Vco of the comparator 225a continues for a long time. For the hysteresis comparator circuit scheme, a first specific example is shown in FIG. 27A, while a second specific example is shown in FIG. 27B.

The first specific example of the hysteresis comparator circuit scheme includes a comparator 225a; a resistor 225b which connects between the non-inverting input terminal and the output terminal of the comparator 225a; a constant voltage source 224 of a voltage V24 and a resistor 225c that connects serially between the common ground G and the non-inverting terminal; and a resistor 225d which connects between the non-inverting input terminal and the OFF period detection circuit.

The reference voltage Vp when Vco is at the high level and Vm is at the low level is brought to the high VpH, the reference voltage Vp when Vco is at the low level VcoL and Vm is at the low level is brought to the low VpL, and the reference voltage Vp when Vco is at the low level and Vm is at the high level is brought to the intermediate VpM.

The inverting input terminal voltage Vn of the comparator 225a is compared with a high VpH to determine whether Vco is changed from VcoH to VcoL in the period in which the output Vco of the comparator 225a is at the first high level VcoH and the inverting input terminal voltage Vn of the comparator 225a is compared with a low VpL to determine whether Vco is changed from VcoL to VcoH in the period in which the output Vco of the comparator 225a is at the second low level VcoL, so that the output Vco of the comparator 225a is not changed and maintained to the first high level VcoH or the second low level VcoL when Vn takes an intermediate value of VpH and VpL. Vm is brought to the high level only in a period in which Vco is at the low level continues for a long time to cause the OFF period detection circuit 250 to operate to cause the input signal Vn to the comparator 225a to be compared with VpM to determine whether to change Vco from VcoL to VcoH.

A second specific example shown in FIG. 27B is a so-called window comparator which may realize a function equivalent to that of the hysteresis comparator according to the first specific example. The second specific example includes a comparator 225g, a comparator 225h, a comparator 225i, a constant voltage source 224b of a voltage VpH, a resistor 225j which voltage-divides the constant voltage source 224b, a resistor 225k, a resistor 225m, an AND gate 225n, an OR gate 225o, and an SR flip-flop 225f. The input signal Vn to the window comparator is input to the non-inverting input terminal of the comparator 225g, the inverting input terminal of the comparator 225h, and the inverting input terminal of the comparator 225i; and the voltage VpH of the constant voltage source 224b is input to the inverting input terminal of the comparator 225g. The voltage VpH of the constant voltage source 224b is voltage-divided by the resistor 225j, the resistor 225k, and the resistor 225m. The voltage VpM is input to the non-inverting input terminal of the comparator 225h, and the voltage VpL is input to the non-inverting input terminal of the comparator 225i.

The output of the comparator 225i is brought to a high level to cause the SR flip-flop 225f to be set to cause the output Vco of the SR flip-flop 225f to be brought to the first high level VcoH, while the output of the comparator 225g is brought to a high level to reset the SR flip-flop 225f to be reset to bring the output Vco of the SR flip-flop 225f to the second low level VcoL. In this way, in the period in which the output Vco of the SR flip-flop 225f is at the first high level VcoH, the input signal Vn into the window comparator is compared with the high VpH to determine whether to change Vco from VcoH to VcoL, and, in the period in which the output Vco of the SR flip-flop 225f is at the second low level VcoL, the input signal Vn into the window comparator is compared with the low VpL to determine whether to change Vco from VcoL to VcoH, so that, when Vn takes an intermediate value of VpH and VpL, Vco does not change and is maintained to the first high level VcoH or the second low level VcoL. Only when the period in which Vco is at the low level continues for a long time to cause the OFF period detection circuit to operate, Vm is brought to the high level to cause the input signal Vn into the window comparator to be compared with VpM to determine whether to change Vco from VcoL to VcoH.

Therefore, the window comparator shown in FIG. 27B may realize the function of the input signal Vn and the input signal Vm and the output signal Vco that are equivalent to the hysteresis comparator shown in FIG. 27A.

While a control circuit and a switching power supply device according to embodiments of the present invention have been described in the foregoing, they are not limited to descriptions of the above-described embodiments, so that various types of variations are possible.

For example, functions equivalent to the hysteresis comparator and the window comparator according to the embodiments of the present invention may be embedded in integrated circuits, so that they are not limited to the above-described embodiments.

Moreover, while the OFF period detection circuit 250 according to the present invention opens the switch element 226 and, at the same time, brings the reference voltage Vp to the third voltage VpM when the period in which the second level VcoL of the output Vco of the comparator 225a continues longer than a period, timings of opening the switch element 226 and, at the same time, causing the reference voltage Vp to be brought to the third voltage VpM does not have be completely simultaneous due to a delay in the circuit. The opening of the switch element 226 may be prior to the timing at which the reference voltage Vp is caused to be brought from the second voltage VpL to the third voltage VpM, while closing the switch element again may be after the timing at which the reference voltage Vp is caused to be brought back from the third voltage VpM to VpL or VpH.

Moreover, the switch element 226 may be a bipolar transistor or an FET, for example, wherein a parasite diode may be included inside the switch element 226. When the OFF period detection circuit 250 opens the switch element 226 to cause the capacitive element 223 to be separated from the third resistor 221 in a case in which the second level VcoL of the output Vco of the comparator 225a continues longer than a period, the switch element 226 may have a function of blocking a discharge current which flows from the negative terminal to the positive terminal (with a dot) and may have a parasite diode of the switch element 226 in the direction of passing a charge current which flows from the positive terminal to the negative terminal of the capacitive element 223.

Eleventh Embodiment

Figure 29:
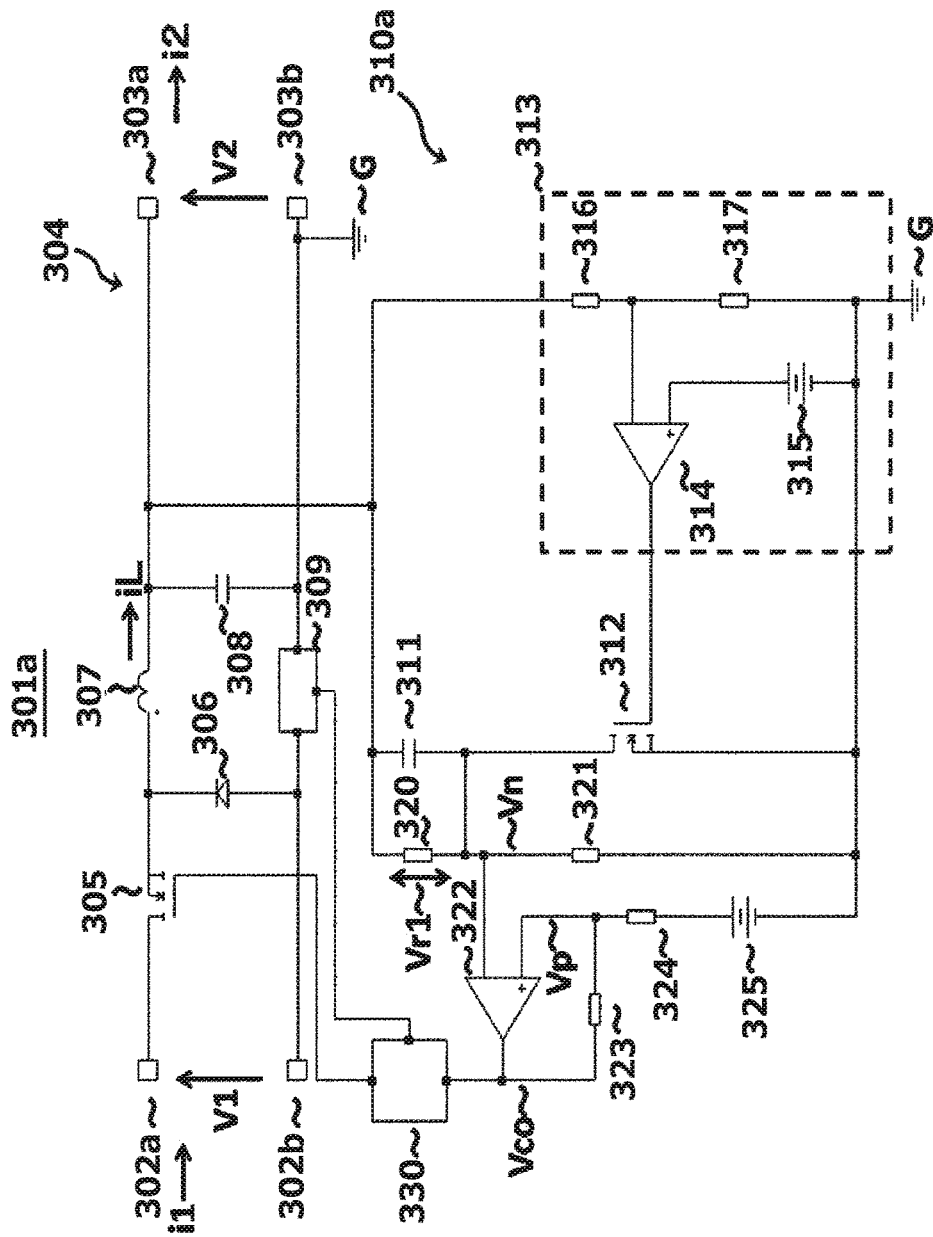
FIG. 29 is a circuit diagram illustrating the configuration of the switching power supply according to an eleventh embodiment of the present invention.

FIG. 29 is a circuit diagram illustrating the configuration of the switching power supply according to an eleventh embodiment of the present invention. As one example, the switching power supply 301a shown in FIG. 29 includes a pair of input terminals 302a and 302b (also called "an input terminal 302" when not specifically distinguishing therebetween); a pair of output terminals 303a and 303b (also called "an output terminal 303" when not specifically distinguishing between); a main circuit 304; and a control circuit 310a, and converts an input voltage (DC voltage) V1 input to the input terminal 302 to an output voltage (DC voltage) V2 to output the converted result from the output terminal 303 and controls the output voltage V2 to be at a predetermined target voltage. The switching power supply 301a inputs an input voltage V1 and an input current i1 to the input terminal 302 to output the output voltage V2 and a load current i2 from the output terminal 303.

The main circuit 304a includes a switching transistor 305, a diode 306, a choke coil 307, and an output capacitor 308. The switching power supply 301a, which is configured with a back converter circuit scheme as one example, outputs an input voltage V1 input from the input terminal 302 to the output voltage V2 to output the converted result to the output terminal 303.

The control circuit 310a includes a third resistor 320 and a fourth resistor 321 that voltage-divides the output voltage V2 of the switching power supply 301a; a comparator 322 in which a voltage-divided voltage Vn is input to a first inverting input terminal thereof and a reference voltage Vp is input to a second non-inverting input terminal thereof; a current detection circuit 309 which detects a current iL which flows through the choke coil 307; and a controller 330 which controls a switching transistor 305 based on a current value detected by the current detection circuit 309 and an output signal Vco. The control circuit 310a includes the third resistor 320, which is connected between a positive terminal 303a of an output terminal and a first inverting input terminal of the comparator 322; and a capacitive element 311 which is connected in parallel with the third resistor 320. A common ground G of the control circuit 310a is connected to a negative terminal 303b of the output terminal. A voltage of each of signal voltages Vn, Vp, and Vco is set to be a voltage with the common ground G as the reference.

Moreover, a reference voltage Vp is brought to be a first high voltage VpH when an output Vco of the comparator 322 takes a first high level and to be a second low voltage VpL when an output Vco of the comparator 322 takes a second low level. The comparator 322 is a so-called hysteresis comparator and, as an example of a circuit configuration which uses the hysteresis comparator, includes the comparator 322; a resistor 323 which connects between a non-inverting input terminal and an output terminal of the comparator 322; and a constant voltage source 325 and a resistor 324 that are serially connected between the non-inverting input terminal and the common ground G.

Next, an operation of the control circuit 310a is described. When the voltage Vn in which the output voltage V2 is resistance-divided decreases below the second voltage VpL, the comparator output Vco is brought to a first high level to cause the controller 330 to start driving the switching transistor 305, so that the reference voltage is brought to be the first voltage VpH. During the drive period of the switching transistor 305, the current of the choke coil 307 increases to cause a current iL which is larger than a load current i2 to be supplied from the choke coil 307 to the output capacitor 308, causing the output capacitor 308 to be charged to raise the output voltage V2. When the voltage Vn in which the voltage V2 is resistance-divided is brought to be higher than the first voltage VpH, the comparator output Vco is brought to a second low level to cause the drive period to be completed and to be transitioned to a stop period. At this time, the reference voltage is brought to be the second voltage VpL. In the stop period, the load current i2 is brought to be larger than the current iL from the choke coil 307 to cause discharging from the output capacitor 308 to cause the output voltage V2 to decrease. When the voltage Vn in which the output voltage V2 is resistance-divided is again brought to be lower than the second voltage VpL, the drive period is started again to cause the reference voltage to be brought to the first voltage VpH. Such an operation is repeated to cause the drive period and the stop period to be controlled such that the resistance-divided voltage Vn is brought to be a value between the first voltage VpH and the second voltage VpL to cause the output voltage V2 to be controlled to the predetermined target voltage.

Moreover, the capacitive element 311 is connected to the third resistor 320 to stabilize the voltage across the third resistor 320 to almost a constant value Vr1. This causes the voltage ripple of Vn of the inverting input terminal of the comparator 322 to be a value in which a Vr1 is subtracted from the output voltage V2, so that the voltage ripple of Vn is brought to be equal to the voltage ripple of the output voltage V2. The control circuit 310a controls the drive period and the stop period for Vn to take a value between VpL and VpH to control an output voltage V2 to a specified target voltage. Thus, the voltage ripple of Vn is brought to be equal to the difference between the first voltage and the second voltage VpH−VpL to also cause the magnitude of the voltage ripple of the output voltage V2 to be VpH−VpL.

Furthermore, the static capacitance of the capacitive element 311 may be set sufficiently large to cause Vr1 to be further stabilized and also the static load fluctuation of the output voltage V2 to also decrease.

However, when the static capacitance of the capacitive element 311 is increased, it takes time for the voltage Vr1 thereacross to be charged from 0V at the time of activation to a steady value. Assuming that the resistance value of the third resistor 320 is R1 and the resistance of the fourth resistor 321 is R2, Vr1=V2×R1/(R1+R2). Then, the output voltage V2 is controlled to be the target value Vp×(R1+R2)/R2 such as to cause Vn=V2−Vr1 to be equal to Vp. The period in which Vr1 at the time of activation is lower than the steady value is also controlled such as to cause Vn=V2−Vr1 to be equal to Vp, causing V2 to be lower than the target value. When the period in which Vr1 is lower than the steady value continues for a long time, the period in which the output voltage does not reach the target value continues for a long time.

Charging of the capacitive element 311 at the time of activation is performed along a route which pass through the capacitive element 311 and the fourth resistor 321 from the positive terminal 303a of the output terminal and the larger the static capacitance of the capacitive element 311 and the larger the resistance value R2 of the fourth resistor 321, the more time it takes for the charging. The output voltage V2 is voltage-divided by the third resistor 320 and the fourth resistor 321, so that, when the output voltage V2 is high, R1 and R2 need to be set with large resistance values to suppress the power consumption.

Then, for charging of the capacitive element 311 at the time of activation, a switch element 312 which is connected to parallel with the fourth resistor 321, and an output voltage detection circuit 313 are provided. The output voltage detection circuit 313 is configured with a comparator 314 which is a second comparator, a second reference voltage source 315 from which a reference voltage is input to the comparator 314, a resistor 316 or a fifth resistor and a resistor 317 or a sixth resistor that voltage-divides the output voltage V2, wherein an input is made from the voltage source 315 to the non-inverting input terminal of the comparator 314 and a voltage in which the output voltage V2 is voltage-divided into the resistor 316 and the resistor 317 is input to the inverting input terminal of the comparator 314. The output terminal of the comparator 314 drives the switch element 312. The output voltage V2 of the switching power supply 301a is compared with a predetermined value which is determined from the voltage source 315 and the voltage-dividing ratio of the resistor 316 and the resistor 317 to close the switch element 312 to cause the capacitive element 311 to be charged when the output voltage V2 is low and to open the switch element 312 when the output voltage V2 is high.

Moreover, during a period in which the switch element 312 is closed to charge the capacitive element 311 rapidly, the output Vco of the comparator 322 is brought to a first high level, so that the controller 330 controls the switching transistor 305 to bring the current value detected by the current detection circuit 309 to a set maximum value.

In this way, at the time of activation at which the output voltage V2 is lower than a predetermined value, the capacitive element 311 may be charged along a route which passes through the capacitive element 311 and the switch element 312 from the positive terminal 303a of the output terminal to rapidly perform charging even when the static capacitance of the capacitive element 311 is large, making it possible to shorten the time until the output voltage V2 reaches the target value at the time of activation.

Twelfth Embodiment

Figure 30:
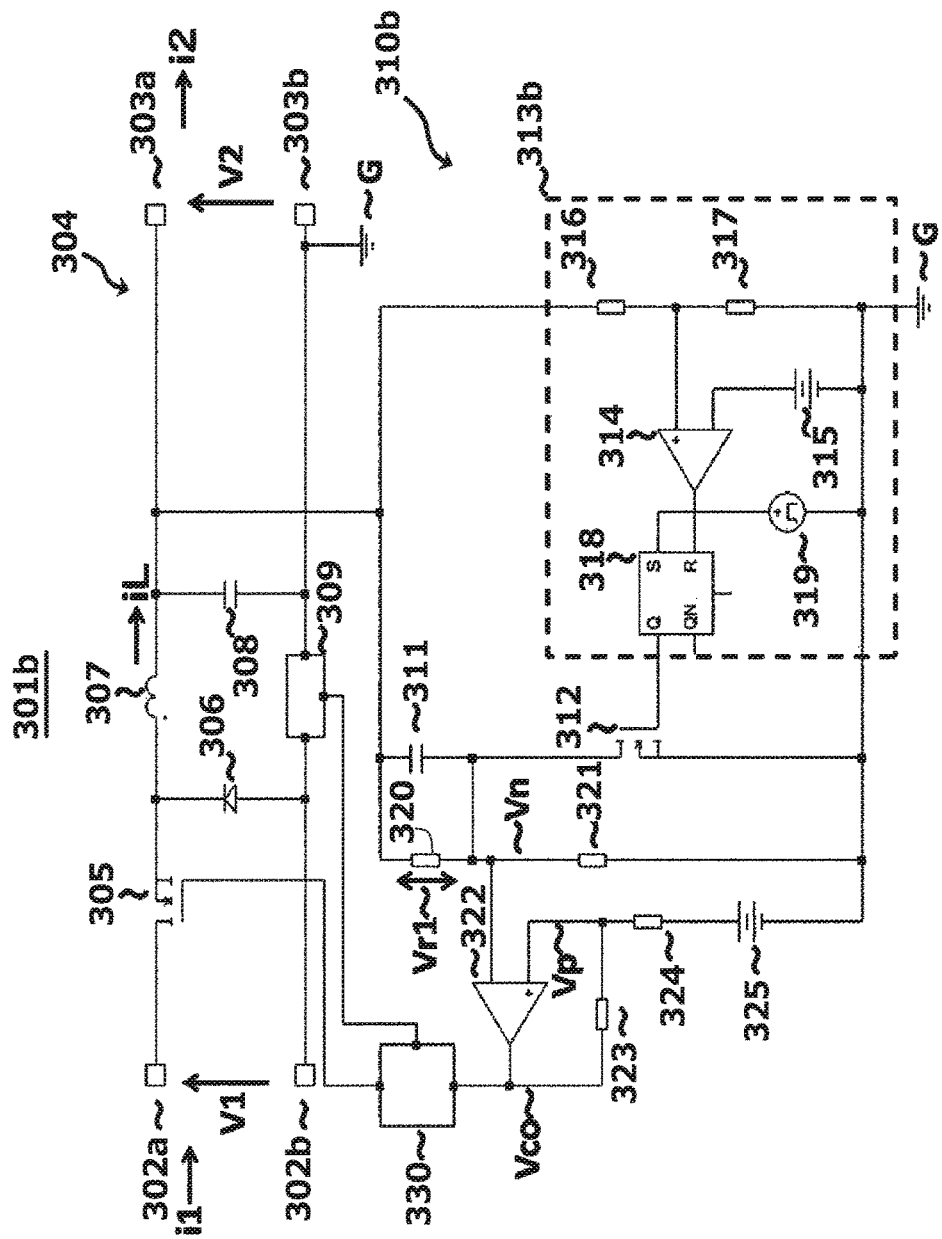
FIG. 30 is a circuit diagram illustrating the configuration of the switching power supply according to a twelfth embodiment of the present invention.

FIG. 30 is a circuit diagram illustrating the configuration of the switching power supply 301b according to a twelfth embodiment of the present invention. The switching power supply 301b shown in FIG. 30 is different in that the configuration of the output voltage detection circuit 313 is different from the switching power supply 301a according to the eleventh embodiment of FIG. 29. The output voltage detection circuit 313b is configured with a comparator 314, a voltage source 315, a resistor 316 and a resistor 317 that voltage-divide the output voltage V2, an RS flip-flop 318, and a signal source 319. The voltage in which the output voltage V2 is voltage-divided by the resistor 316 and the resistor 317 is input to a non-inverting input terminal of the comparator 314, the voltage source 315 is input to the non-inverting input terminal of the comparator 314, and an output of the comparator 314 is input to a reset input terminal of the RS flip-flop 318. The signal source 319 is input to a reset input terminal of the RS flip-flop 318 and an output of the RS flip-flop 318 drives the switch element 312. The signal source 319 becomes a high level only in a short period immediately after activation to cause an output of the RS flip-flop 318 to drive the switch element 312. Therefore, the switch element 312 is closed at the time of activation, so that the capacitance element 311 is charged rapidly in a manner similar to the eleventh embodiment of FIG. 29.

The output voltage V2 is low at the time of activation, so that a voltage in which the output voltage V2 is voltage-divided by the resistor 316 and 317 is lower than the voltage source 315, and an output of the comparator 314 takes a low level. When the output voltage V2 reaches a predetermined voltage, a voltage in which the output voltage V2 is voltage-divided by the resistor 316 and 317 is higher than the voltage source 315 and an output of the comparator 314 becomes a high level to reset an output of the RS flip flop 318 to the low level and open the switch element 312.

In this way, at the time of activation in which the output voltage V2 is lower than a predetermined value, charging of the capacitive element 311 is performed over a route which goes through the capacitive element 311 and the switch element 312 from the output terminal positive terminal 303a to make it possible to rapidly charge even when the static capacitance of the capacitive element 311 is large, making it possible to shorten the time until the output voltage V2 reaches a target value at the time of activation.

Moreover, when the activation period is completed, the closing of the switch element 312 does not occur, so that closing of the switch element 312 to cause an increase of an output voltage ripple due to an increase in the output voltage V2 at the time of steady operation never occurs. Therefore, a predetermined value which compares the output voltage Vr1 may be brought to a value which is close to the output voltage when the capacitor voltage Vr1 becomes a steady value to make it possible to shorten the time for the output voltage V2 to reach the target value at the time of activation.

Thirteenth Embodiment

Figure 31:
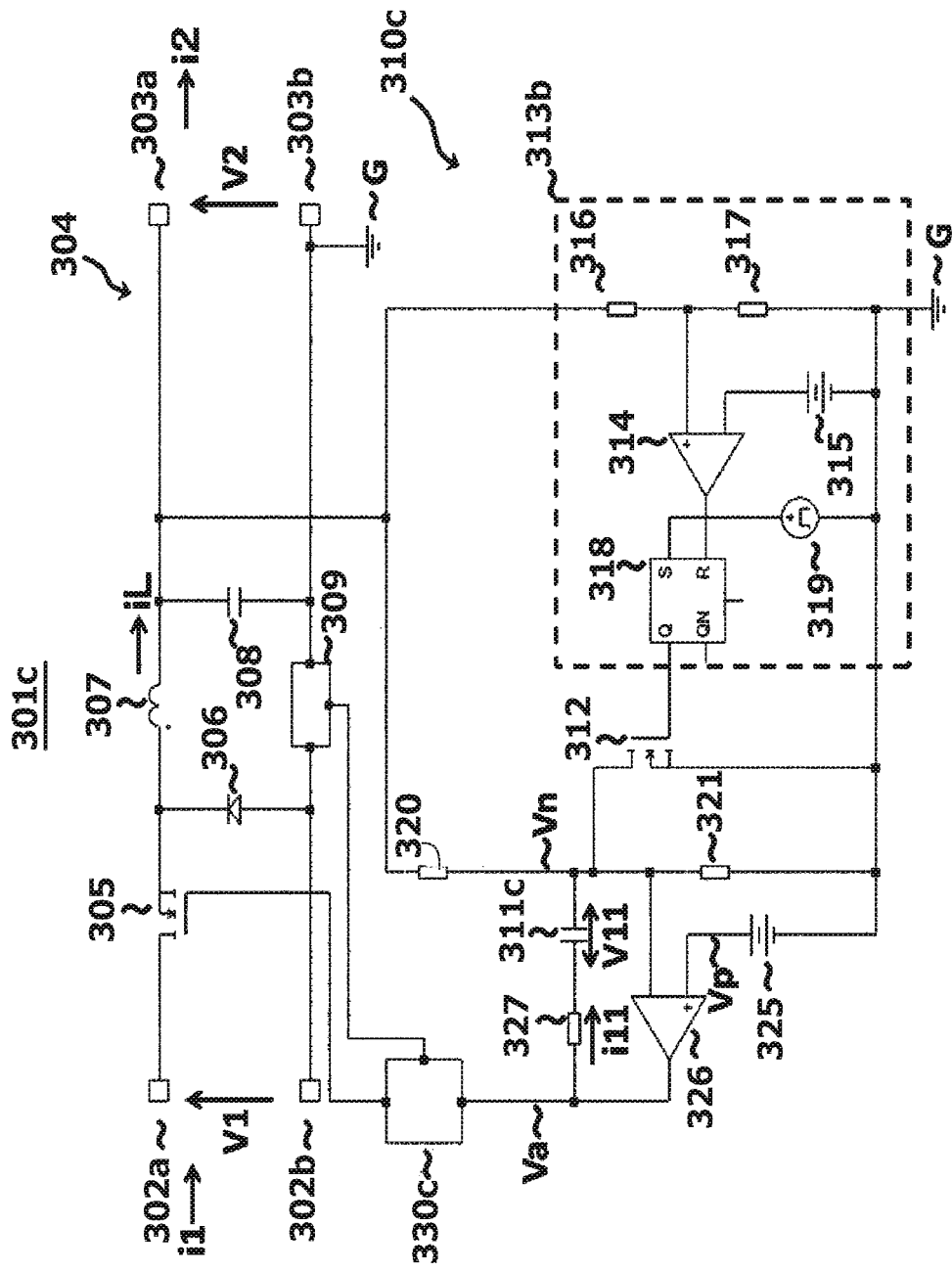
FIG. 31 is a circuit diagram illustrating the configuration of the switching power supply according to a thirteenth embodiment of the present invention.

FIG. 31 is a circuit diagram illustrating the configuration of the switching power supply 301c according to a thirteenth embodiment of the present invention. The switching power supply 301c shown in FIG. 31 is different from the switching power supply 301b according to the twelfth embodiment of the present invention in FIG. 30 in the configuration of the control circuit 310c. The control circuit 310c is configured with a third resistor 320 and a fourth resistor 321 that voltage-divide the output voltage V2 of the switching power supply 301c, an error amplifier 326, a voltage source 325, a resistor 327, a capacitive element 311c, a current detection circuit 309, a controller 330c, a switch element 312, and an output voltage detection circuit 313b which is the same as in FIG. 30.

A voltage which is voltage-divided by the third resistor 320 and the fourth resistor 321 is input to a first input terminal, which is a non-inverting input terminal, of the error amplifier 326, an input is made from the voltage source 325 to the first input terminal, which is the non-inverting input terminal, and the controller 330c controls the switching transistor 305 based on a current value which is detected by the current detection circuit 309 and an output voltage level Va of the error amplifier 326.

The resistor 327 and the capacitive element 311c that are connected between the output terminal and the inverting input terminal of the error amplifier 326 cause an error between the output voltage V2 and the target voltage to be integrated. When a large time constant is integrated, the static capacitance of the capacitive element 311c increases.

However, when the static capacitance of the capacitance element 311c increases, it takes time for the voltage V1 thereacross to be charged from 0V at the time of activation to the steady value. The steady value of V11 is Va0−Vap, which is a value in which the non-inverting input terminal voltage Vp of the error amplifier 326 is subtracted from the output voltage level Va0 of the error amplifier 326 when the output voltage V2 stabilizes at the target voltage, and the charge current i11 of the capacitive element 311c then is 0. Then, assuming the resistance value of the first resistor 320 as R1, the resistance value of the second resistor 321 as R2, and the resistance value of the resistor 327 as R3, the output voltage V2 is controlled to the target Vp×(R1+R2)/R2 such as to cause Vn to be equal to Vp.

In the period in which V11 at the time of activation is lower than the steady value, V2 is brought to be lower than the target value. As V11 is lower than the steady value, a current of i11=(Va−Vp−V11)/R3 flows as a charge current i11 of the capacitive element 311c and this current also flow through the second resistor 321, so that the output voltage V2 is brought to be lower than the target value which is determined by the voltage-dividing ratio by R1*i11=(Va−Vp−V11)R1/R3. The static capacitance of the capacitive element 311c is large, so that, when a period in which V11 is lower than the steady value at the time of activation continues for a long time, a period in which the output voltage V2 does not reach the target value at the time of activation continues for a long time.

Then, to shorten the charging period of the capacitive element 311c at the time of activation, the switch element 312 and the output voltage detection circuit 313b that are connected in parallel with the second resistor 321 are provided. In the same manner as the twelfth embodiment in FIG. 30, the output voltage detection circuit 313b closes the switch element 312 to cause the capacitive element 311c to be charged at the time of activation and the output voltage V2 is brought to be higher than the predetermined voltage to open the switch element 312.

Moreover, in the period in which the switch element 312 is closed to cause the capacitive element 311c to be charged rapidly, the controller 330c controls the switching transistor 305 such that the output Va of the error amplifier 326 is brought to be at a high voltage level to cause the current value detected by the current detection circuit 309 to be brought to the set maximum value.

In this way, at the time of activation in which the output voltage V2 is lower than a predetermined value, the capacitive element 311c is charged along a route which passes through the capacitive element 311c and the switch element 312 from an output terminal of the error amplifier 326 and may be charged rapidly even when the static capacitance of the capacitive element 311c is large to cause the time for the output voltage V2 to reach the target value at activation to be shortened.

While it has been described that the output voltage detection circuit 313b according to the thirteenth embodiment has the same configuration as the output voltage detection circuit 313b according to the twelfth embodiment, it may be set to have the same configuration as the output voltage detection circuit 313 according to the eleventh embodiment.

While control circuits and switching power supplies according to embodiments of the present invention have been described in the foregoing, they are not limited to the above description of the embodiments, so that various types of variations are possible.

For example, while the switching power supplies are described with a back converter shown as an example, they are not limited thereto, so that they may be applied to various types of switching power supplies such as a forward converter, a push-pull converter, etc.

A control circuit according to one aspect of the present invention is configured to control a switching element of a switching power supply, the control circuit including: a comparator having a first input terminal configured to receive an output voltage of the switching power supply, the comparator having a second input terminal that is connectable to a positive terminal of a reference voltage source, the comparator having an output, the output brings the reference voltage to a first voltage while the output signal takes a first voltage level, the output brings the reference voltage to a second voltage while the output signal takes a second voltage level; and a constant voltage source having a positive terminal connected to a negative terminal of the reference voltage source and a ground of the comparator. This makes it possible to suppress an output voltage ripple to a width between the first voltage and the second voltage.

Moreover, the control circuit may further include a level shift circuit configured to be between the output of the comparator and an input of a controller, the level shift circuit being configured to change the first voltage level or the second voltage level that is transmitted from the output of the comparator, the level shift circuit configured to supply the controller with the first voltage level changed or the second voltage changed, wherein the controller is configured to control the switching element based on the output from the level shift circuit. This makes it possible to suppress the output voltage ripple to the width between the first voltage and the second voltage and perform shifting to a voltage level which drives the control circuit.

Furthermore, the level-shift circuit may include a Zener diode configured to be between a Zener diode between the output of the comparator and the input of the controller, and a first resistor configured to be between the input of the controller and a common ground. In this way, shifting to a voltage level which drives the control circuit may be made with a simple circuit.

Moreover, the constant voltage source may include a capacitor. This makes it possible to suppress the voltage ripple of the constant voltage source with the capacitor.

Furthermore, the controller may be configured perform switching a plurality of times in a period in which the output of the comparator is at the first voltage level and stop switching in a period in which the output of the comparator is at the second voltage level. In this way, an on-off period of the switching element is sufficiently shorter than a burst period which is a period of on/off of the comparator output. Therefore, the output voltage rises when the comparator output becomes the first level, and the output voltage falls immediately when the comparator output reaches the second level to cause the output voltage to fall, making it possible to suppress the output voltage ripple to the width between the first voltage and the second voltage.

Moreover, the controller may be configured to turn the switching element off when a current which flows through the switching power supply becomes at least a predetermined value. In this way, the output voltage ripple may be suppressed to a width between the first voltage and the second voltage.

Furthermore, the switching power supply may include a resonant converter. In this way, the switching frequency may be raised while suppressing the loss, making it possible to decrease energy accumulated in the inductor and capacitor used in the resonant converter. Thus, in addition to the output ripple, output voltage fluctuations to rapid load changes to be suppressed to the hysteresis width.

Moreover, according to another aspect of the present invention, a control circuit is configured to control a switching element of a switching power supply having an output terminal connected to a positive terminal of a constant voltage source, the control circuit including: a comparator having a first input terminal that is connectable to a negative terminal of the constant voltage source and the comparator having a second input terminal that is connectable to a reference voltage source, the comparator having an output, the output brings the reference voltage to a first voltage while the output signal takes a first voltage level, the output brings the reference voltage to a second voltage while the output signal takes a second voltage level; and, and a controller configured to control the switching element based on the output of the comparator.

Furthermore, the constant voltage source may include a Zener diode that is connectable between the output terminal of the switching power supply and the first input terminal of the comparator, and a second resistor that is connectable between the first input terminal of the comparator and the common ground. In this way, a simple constant voltage source with the small number of components may be made.

Moreover, the constant voltage source may include a shunt regulator configured to adjust a setting voltage. This may secure an accurate constant voltage source to suppress the output voltage ripple to a width between a first voltage and a second voltage.

According to a further aspect of the present invention, a control circuit configured to control a switching transistor of a switching power supply is provided, the control circuit including: a third resistor and a fourth resistor that are connected to each other to voltage-divide an output voltage of the switching power supply; a comparator having a first input terminal configured to receive the output voltage voltage-divided by the third resistor and the fourth resistor, the comparator having a second input terminal configured to receive a reference voltage; and a controller configured to control the switching transistor based on an output signal of the comparator, wherein the control circuit is configured to bring the reference voltage to a first voltage while the output signal of the comparator takes a first voltage level and the control circuit is configured to bring the reference voltage to a second voltage while the output signal of the comparator takes a second voltage level, and the third resistor is connectable between a positive terminal of an output terminal of the switching power supply and the first input terminal of the comparator; the control circuit further including: a capacitive element that is connectable to the third resistor in parallel with each other; and, wherein, where a resistance value of the first resistance is set to R1, a resistance value of the fourth resistor is set to R2, a minimum switching frequency of the switching transistor is set to Fmin, and a static capacitance of the capacitive element is set to C1, Equation (1)

$$C1 \geq \frac{R1 + R2}{2\pi F_{min} R2^2} \quad (1)$$

is met.

In this way, static load fluctuations of the output voltage when the load current decrease to bring the minimum switching frequency Fmin to around the difference between the first voltage and the second voltage.

The control circuit according to a still further aspect of the present invention may include a controller configured to switch the switching transistor a plurality of times when the output of the comparator is at the first voltage level. In this way, as the period of on/off of the switching transistor is sufficiently shorter than the period of the on/off period of the comparator output, the output voltage rises immediately after the comparator output becomes a first level and the output voltage drops immediately after the comparator output becomes a second level, so that the output voltage ripple may be suppressed to around the difference between the first voltage and the second voltage.

Moreover, in the control circuit, the controller may be configured to turn the switching transistor off when a current which flows through the switching power supply becomes a predetermined value. In this way, a current which flows through the switching power supply becomes a value when the output of the comparator is at the first level to turn the switching transistor off in the period, making it possible to switch a plurality of times when the output of the comparator is at the first level. Thus, an output capacitor of the switching power supply may be charged with a current which is larger than the load current while the comparator output takes a first voltage level, so that the output voltage linearly increases simultaneously with the beginning of the first level. While the comparator output takes a second voltage level, the output capacitor of the switching power supply apparatus is charged by only the load current, so that the output voltage decreases linearly with the beginning of the second level. In this way, the output voltage ripple may be suppressed to around the difference between the first voltage and the second voltage.

Furthermore, the switching power supply according to a yet further aspect of the present invention may be a resonant converter. In this way, the switching frequency may be increased while suppressing the switching loss to decrease energy accumulated in the inductor and capacitor used for the resonance converter. Thus, dynamic load fluctuations of the output voltage, static load fluctuations, and output voltage ripples may be suppressed to around the difference between the first voltage and the second voltage.

Furthermore, the control circuit according to a still further aspect of the present invention may include a charging circuit configured to charge the capacitive element when the switching power supply is activated. In this way, the capacitive element may be rapidly charged to prevent activation from delaying.

According to a further aspect of the present invention, a control circuit configured to control a switching transistor of a switching power supply is provided, the control circuit including: a third resistor and a fourth resistor that are connected to each other to voltage-divide an output voltage of the switching power supply; a comparator having a first input terminal configured to receive the output voltage voltage-divided by the third resistor and the fourth resistor, the comparator having a second input terminal configured to receive a reference voltage; and a controller configured to control the switching transistor based on an output signal of the comparator, wherein the control circuit is configured to bring the reference voltage to a first voltage while the output signal of the comparator takes a first voltage level and the control circuit is configured to bring the reference voltage to a second voltage while the output signal of the comparator takes a second voltage level, and the third resistor is connectable between a positive terminal of an output terminal of the switching power supply and the first input terminal of the comparator; the control circuit further including: a capacitive element and a switch element that are connected in parallel with the third resistor and are mutually connected in series; and an OFF period detection circuit configured to detect that the output of the comparator continually takes the second voltage level in a period which is longer than a predetermined period, wherein the OFF period detection circuit is configured to open the switch element and bring the reference voltage to a third voltage when the OFF period detection circuit detects that the output of the comparator continually takes the second voltage level in the period which is longer than the predetermined period.

The OFF period detection circuit according to a still further aspect of the present invention may be configured to close the switch element and bring the reference voltage to the first voltage when the OFF period detection circuit detects that the output of the comparator takes the first voltage level.

In this way, when determining the timing at which an output of the comparator again becomes a second level after the output of the comparator becomes the first level as a result of the output voltage voltage-divided at the first input terminal and a third voltage of the second input terminal with the OFF period detection circuit functioning, returning to a normal operation when the OFF period detection circuit is not functioning is made possible.

Moreover, in the OFF period detection circuit according to a further aspect of the present invention, the OFF period detection circuit is configured to open the switch element in the period which is shorter than the predetermined period and bring the reference voltage to the third voltage when the OFF period detection circuit detects that the output of the comparator continually takes the second voltage level in the period which is longer than the predetermined period; and, after the period which is shorter than the predetermined period, to close the switch element, and bring the reference voltage to the first voltage when the output of the comparator is at the first voltage level and to the second voltage when the output of the comparator is at the second voltage level.

In this way, when the difference between the output voltage voltage-divided at the first input terminal and the third voltage at the second input terminal is small, a comparison period may be shortened to prevent error operation due to noise.

Moreover, the control circuit according to a further aspect of the present invention may include a controller which is configured to switch the switching transistor a plurality of times when the output of the comparator is at the first voltage level. In this way, when the period of the on/off of the switching transistor is sufficiently shorter than the period of on/off of the comparator output, an output voltage increase immediately when the comparator output reaches the first level and an output voltage decreases immediately when the comparator output reaches the second level, making it possible to suppress the output voltage ripple to around the difference between the first voltage and the second voltage.

Furthermore, the controller may be configured to turn the switching transistor off when a current which flows through the switching power supply becomes the predetermined value. In this way, a process is repeated in which the current which flows through the switching power supply becomes the value while the comparator output is at the first level to turn off the switching transistor for a period, making it possible to perform switching a plurality of times while the comparator output is at the first level. Therefore, the output capacitor of the switching power supply may be charged with a current which is larger than a load current when a comparator output takes a first level, so that the output voltage linearly rises simultaneously with the start of the first level. The comparator output is at the second level, the output capacitor of the switching power supply is discharged with only the load current, so that the output voltage linearly decreases simultaneously with the start of the period when the output voltage is at the second level. In this way, the output voltage ripple may be suppressed to around the difference between the first voltage and the second voltage. Therefore, the dynamic load fluctuations of the output voltage, static load fluctuations, and the output voltage ripple may be suppressed to around the difference between the first voltage and the second voltage.

Furthermore, the control circuit according to a further aspect of the present invention may include a charging circuit configured to charge the capacitive element when the switching power supply is activated. In this way, the capacitance element may be rapidly charged to prevent activation from being delayed.

A control circuit according to a further aspect of the present invention may include a capacitive element; a switch element that is connectable to the capacitive element; and an output voltage detection circuit configured to compare an output voltage of the switching power supply with a predetermined value, close the switch element to charge the capacitive element when the output voltage is lower than the predetermined value, and open the switch element when the output voltage is higher than the predetermined value.

In this way, when a capacitor of a large capacitance is used for a control circuit of a switching power supply, charging is performed in a short time by the switch element from 0V to the steady value at the time of activation, no time is taken to the output voltage reaching the target value at the time of activation.

A control circuit according to a further embodiment of the present invention includes a capacitive element; a switch element that is connectable to the capacitive element; and an output voltage detection circuit configured to close the switch element to charge the capacitive element when the switching power supply is activated, and compare an output voltage of the switching power supply with a predetermined value to open the switch element when the output voltage is higher than the predetermined value.

In this way, for using a capacitor with a large static capacitance for the control circuit of the switching power supply, charging is performed in a short time by the switching element from 0V to the steady value at the time of activation, so that no time is taken for the output voltage to reach the target value at the time of activation. Moreover, when the activation period is completed, closing of the switch element does not occur again, so that, at the time of steady operation, the output voltage is decreased to close the switch element, so that the output voltage ripple does not increase. Therefore, a predetermined value with which to compare the output voltage may be set high, making it possible to make the value close to an output voltage when the capacitor voltage becomes a steady value to shorten the time until the output voltage reaches the target value at the time of activation.

The control circuit according to a further aspect of the present invention may have a capacitive element connectable to an output terminal of the switching power supply. This makes it possible to stabilize the output voltage of the switching power supply by the capacitive element.

The control circuit according to a further embodiment of the present invention may be provided, further including a third resistor and a fourth resistor that are connected to voltage-divide an output voltage of the switching power supply; a comparator having a first input terminal configured to receive the output voltage voltage-divided by the third resistor and the fourth resistor, the comparator having a second input terminal configured to receive a reference voltage; and a controller configured to control a switching transistor based on an output signal of the comparator, wherein the reference voltage input to the second terminal of the comparator becomes a first voltage when an output of the comparator takes a first voltage level and a second voltage when the output of the comparator takes a second voltage level, and the third resistor is connectable between a positive terminal of the output terminal of the switching power supply and the first input terminal of the comparator, and the control circuit has the capacitive element connected in parallel with the third resistor.

In this way, the capacitive element connected in parallel with the voltage-dividing resistance may be rapidly charged at the time of activation to shorten the time for the output voltage to reach the target value at the time of activation.

The control circuit according to a further embodiment of the present invention may be provided, further including a third resistor and a fourth resistor that are configured to voltage-divide an output voltage of the switching power supply; an error amplifier having a first input terminal configured to receive the output voltage voltage-divided by the third resistor and the fourth resistor, the error amplifier having a second input terminal configured to receive a reference voltage; and a controller configured to control a switching transistor based on an output voltage of the error amplifier, wherein the capacitive element is insertable between an output terminal of the error amplifier and the first input terminal of the error amplifier.

This makes it possible for a capacitance element for integration in which an output of the error amplifier is fed back to an input to shorten the time for the output voltage to reach the target value at the time of activation.

In a control circuit according to a further aspect of the present invention, the output voltage detection circuit may include an output voltage detection circuit which may include a fifth resistor and a sixth resistor configured to voltage-divide an output voltage of the switching power supply; a second comparator; and a reference voltage source configured to supply the second comparator with the reference voltage.

This makes it possible to shorten the time for the output voltage to reach the target value at the time of activation to configure the output voltage detection circuit with a simple configuration.

A control circuit according to a further embodiment of the present invention may further include a flip-flop circuit and a signal source that is connectable to the flip-flop circuit.

This makes it possible to shorten the time for the output voltage to reach the target value at the time of activation to configure the output voltage detection circuit with a simple configuration.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A control circuit configured to be connected to a first switching element connected to a first output terminal and a second output terminal, the first output terminal being higher in voltage level than the second output terminal, the control circuit comprising:
 a first reference voltage source having a reference voltage;
 a first resistor and a second resistor that are connected in series to each other to voltage-divide an output voltage between the first output terminal and the second output terminal;
 a first comparator having a first input terminal, a second input terminal, and a first comparator output terminal, the first input terminal being connected between the first resistor and the second resistor and configured to receive the voltage-divided output voltage, and the second input terminal being connected to the first reference voltage source and configured to receive the reference voltage;
 a capacitor connected in parallel to the first resistor, the capacitor and the first resistor being connected in parallel between the first output terminal and the second resistor; and
 a controller configured to be connected between the first comparator output terminal and the first switching element, the controller being configured to control the first switching element based on an output of the first comparator,
 wherein the reference voltage has a first voltage value in a case that the output of the first comparator is at a first voltage level,
 the reference voltage has a second voltage value in a case that the output of the first comparator is at a second voltage level different from the first voltage level,
 the second voltage value is different from the first voltage value, $$C1 \geq \frac{R1 + R2}{2\pi F_{min} R2^2}$$

is met,
 C1 is a static capacitance of the capacitor,
 R1 is a first resistance value of the first resistor,
 R2 is a second resistance value of the second resistor, and
 $F_{min}$ is a minimum switching frequency of the first switching element.

2. The control circuit as claimed in claim 1, wherein the controller is configured to control the first switching element so as to
 perform switching a plurality of times in a case that the output of the first comparator is at the first voltage level, and
 stop switching in a case that the output of the first comparator is at the second voltage level.

3. The control circuit as claimed in claim 1, wherein the first switching element comprises a resonant converter.

4. The control circuit as claimed in claim 1, wherein the control circuit comprises a charging circuit configured to charge the capacitor when the first switching element is activated.

5. The control circuit as claimed in claim 1, further comprising:
 a second switching element connected in series to the capacitor, the second switching element and the capacitor being connected in parallel to the first resistor between the first output terminal and the second resistor; and
 a first detection circuit configured to, in a first case that the output of the first comparator has been at the second voltage level for a first time period, open the second switching element so that the reference voltage comes to have a third voltage value.

6. The control circuit according to claim 5, wherein
 the first detection circuit is configured to, when the output of the first comparator becomes at the first voltage level, close the second switching element so that the reference voltage comes to have the first voltage.

7. The control circuit as claimed in claim 5, wherein
 the first detection circuit is configured to, in the first case,
 open the second switching element for a second time period shorter than the first time period, so that the reference voltage comes to have the third voltage value, and
 after the second time period, close the second switching element so that the reference voltage comes to have the first voltage value when the output of the first comparator is at the first voltage level, and the reference voltage comes to have the second voltage value when the output of the first comparator is at the second voltage level.

8. The control circuit as claimed in claim 5, wherein the controller is configured to switch the first switching element a plurality of times when the output of the first comparator is at the first voltage level.

9. The control circuit as claimed in claim 5, wherein the controller is configured to turn off the first switching element for a third time period when a current flowing through the first switching element becomes a first threshold value.

10. The control circuit as claimed in claim 5, wherein the first switching element comprises a resonant converter.

11. The control circuit as claimed in claim 5, further comprising:
 a charging circuit configured to charge the capacitor when the first switching element is activated.

12. The control circuit as claimed in claim 1, further comprising:
 a second switching element connected in series to the capacitor, the second switching element and the capacitor being connected in parallel to the first resistor and the second resistor; and a second detection circuit connected to the first output terminal and the second switching element,
wherein the second detection circuit is configured to
close the second switching element to charge the capacitor in a case that the output voltage is lower in level than a first threshold value, and
open the second switching element in a case that the output voltage is higher in level than the first threshold value.

13. The control circuit as claimed in claim 12, wherein the second detection circuit is configured to close the second switching element to charge the capacitor in a case that the first switching element is activated.

14. The control circuit as claimed in claim 12 wherein the second detection circuit comprises:
a third resistor and a fourth resistor connected in series to voltage-divide the output voltage;
a second comparator having a third input terminal, a fourth input terminal, and a second comparator output terminal, the third input terminal being connected between the third resistor and the fourth resistor, and the second comparator output terminal being connected to the second switching element; and
a second reference voltage source connected to the second input terminal of the second comparator.

15. The control circuit as claimed in claim 14, wherein the second detection circuit further comprises:
a flip-flop circuit connected between the second switching element and the second comparator output terminal, the flip-flop circuit being configured to drive the second switching element.

16. A switching power supply device comprising:
a first switching element connected to a first output terminal and a second output terminal, the first output terminal being higher in voltage level than the second output terminal; and
a control circuit connected to the first switching element and configured to control the first switching element, the control circuit comprising:
a first reference voltage source having a reference voltage;
a first resistor and a second resistor that are connected to each other to voltage-divide an output voltage between the first output terminal and the second output terminal;
a first comparator having a first input terminal, a second input terminal, and a first comparator output terminal, the first input terminal being connected between the first resistor and the second resistor and configured to receive the output voltage voltage-divided, and the second input terminal being connected to the first reference voltage source and configured to receive the reference voltage;
a capacitor connected in parallel to the first resistor, the capacitor and the first resistor being connected in parallel between the first output terminal and the second resistor; and
a controller configured to be connected between the first comparator output terminal and the first switching element, the controller being configured to control the first switching element based on an output of the first comparator,
wherein the reference voltage has a first voltage value in a case that the output of the first comparator is at a first voltage level,
the reference voltage has a second voltage value in a case that the output of the first comparator is at a second voltage level different from the first voltage level, and
the second voltage value is different from the first voltage value,
wherein $$C1 \geq \frac{R1 + R2}{2\pi F_{min} R2^2}$$

is met,
C1 is a static capacitance of the capacitor,
R1 is a first resistance value of the first resistor,
R2 is a second resistance value of the second resistor, and
$F_{min}$ is a minimum switching frequency of the first switching element.

17. The switching power supply device according to claim 16, further comprising:
a second switching element connected in series to the capacitor, the second switching element and the capacitor being connected in parallel to the first resistor between the first output terminal and the second resistor; and
a first detection circuit configured to, in a first case that the output of the first comparator has been at the second voltage level for a first time period, open the second switching element so that the reference voltage comes to have a third voltage value.

18. The switching power supply device as claimed in claim 16, wherein the control circuit further comprises:
a second switching element connected in series to the capacitor, the second switching element and the capacitor being connected in parallel to the first resistor and the second resistor; and
a second detection circuit connected to the first output terminal and the second switching element,
the second detection circuit is configured to
close the second switching element to charge the capacitor in a case that the output voltage is lower in level than a first threshold value, and
open the second switching element in a case that the output voltage is higher in level than the first threshold value.

* * * * *